United States Patent
Guo et al.

(10) Patent No.: US 10,405,353 B2
(45) Date of Patent: Sep. 3, 2019

(54) METHOD AND APPARATUS FOR RANDOM ACCESS IN WIRELESS SYSTEMS

(71) Applicant: Samsung Electronics Co., Ltd., Suwon-si (KR)

(72) Inventors: Li Guo, Allen, TX (US); Young-Han Nam, Plano, TX (US); Namjeong Lee, Suwon-si (KR); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/708,940

(22) Filed: Sep. 19, 2017

(65) Prior Publication Data

US 2018/0092129 A1 Mar. 29, 2018

Related U.S. Application Data

(60) Provisional application No. 62/441,124, filed on Dec. 30, 2016, provisional application No. 62/413,781, (Continued)

(51) Int. Cl.
  *H04W 74/08* (2009.01)
  *H04W 56/00* (2009.01)
  (Continued)

(52) U.S. Cl.
  CPC ...... *H04W 74/0833* (2013.01); *H04B 7/0695* (2013.01); *H04B 7/0697* (2013.01);
  (Continued)

(58) Field of Classification Search
  None
  See application file for complete search history.

(56) References Cited

U.S. PATENT DOCUMENTS

2016/0157267 A1* 6/2016 Frenne .................. H04B 7/086
370/329
2017/0026962 A1* 1/2017 Liu ........................ H04W 52/10
(Continued)

FOREIGN PATENT DOCUMENTS

| KR | 10-1563469 B1 | 10/2015 |
| WO | 2011087274 A2 | 7/2011 |
| WO | 2014189286 A1 | 11/2014 |

OTHER PUBLICATIONS

International Search Report dated Feb. 2, 2018 in connection with International Patent Application No. PCT/KR2017/010424.
Nokia et al., "Basic Principles for Initial Access and Mobility", 3GPP TSG-RAN WG1 #86, Aug. 22-26, 2016, 4 pages, R1-167294.
NTT DoCoMo, Inc., "Design for RACH Procedure for NR", 3GPP TSG RAN WG1 Meeting #86, Aug. 22-26, 2016, 4 pages, R1-167378.
NTT DoCoMo et al., "WF on RACH procedure for NR", 3GPP TSG RAN WG1 Meeting #86, Aug. 22-26, 2016, 3 pages, R1-168124.
(Continued)

*Primary Examiner* — Lonnie V Sweet

(57) ABSTRACT

A user equipment (UE) for random access operation in a wireless communication system. The UE comprises at least one transceiver configured to receive, from a base station (BS), RACH configuration information including an RACH structure corresponding to a first beam identification (ID), beam sweeping operation and mapping between downlink signals and RACH chunks and/or RACH preamble subsets. The UE comprises at least one processor configured to determine an RACH preamble based on the RACH structure configuration received from the BS. The UE comprises the transceiver further configured to transmit, to the BS, the RACH preamble over a first beam associated with the first beam ID and receive, from the BS, an RACH response corresponding to the RACH preamble over a second beam, wherein the first beam is different than the second beam.

19 Claims, 34 Drawing Sheets

Related U.S. Application Data filed on Oct. 27, 2016, provisional application No. 62/402,624, filed on Sep. 30, 2016, provisional application No. 62/398,891, filed on Sep. 23, 2016.

(51) Int. Cl.
*H04W 72/04* (2009.01)
*H04W 88/02* (2009.01)
*H04W 88/08* (2009.01)
*H04L 5/00* (2006.01)
*H04B 7/06* (2006.01)

(52) U.S. Cl.
CPC .......... *H04L 5/0048* (2013.01); *H04L 5/0053* (2013.01); *H04W 56/001* (2013.01); *H04W 72/046* (2013.01); *H04W 88/02* (2013.01); *H04W 88/08* (2013.01)

(56) References Cited

U.S. PATENT DOCUMENTS

2017/0048826 A1* 2/2017 Kishiyama ............ H04W 16/28
2017/0201974 A1* 7/2017 Sohn ................. H04W 72/0413

OTHER PUBLICATIONS

LG Electronics, "Discussion on PRACH preamble design and RACH procedure for NR", 3GPP TSG RAN WG1 Meeting #86, 7 pages, R1-166911.
"ETSI Technical Specification; LTE; Evolved Universal Terrestrial Radio Access (E-UTRA); Physical Channels and Modulation, (3GPP TS 36.211 Version 13.0.0 Release 13)," ETSI TS 136 211, V13.0.0, Jan. 2016, 143 pages.
"3rd Generation Partnership Project; Technical Specification Group Radio Access Network; Evolved Universal Terrestrial Radio Access (E-UTRA); Multiplexing and Channel Coding (Release 13)," 3GPP TS 36.212, V13.2.0, Dec. 2015, 121 pages.
"ETSI Technical Specification; LTE; Evolved Universal Terrestrial Radio Access (E-UTRA); Physical Layer Procedures, (3GPP TS 36.213 Version 13.0.0 Release 13)," ETSI TS 136 213, V13.0.0, May 2016, 328 pages.
"ETSI Technical Specification; LTE; Evolved Universal Terrestrial Radio Access (E-UTRA); Radio Resource Control (RRC) Protocol Specification, (3GPP TS 36.331 Version 13.0.0 Release 13)," ETSI TS 136 331, V13.0.0, Jan. 2016, 670 pages.
Extended European Search Report regarding Application No. 17853444.2, dated Jun. 24, 2019, 7 pages.

* cited by examiner

METHOD AND APPARATUS FOR RANDOM ACCESS IN WIRELESS SYSTEMS

CROSS-REFERENCE TO RELATED APPLICATIONS AND CLAIM OF PRIORITY

The present application claims priority to U.S. Provisional Patent Application Ser. No. 62/398,891, filed on Sep. 23, 2016; U.S. Provisional Patent Application Ser. No. 62/402,624, filed on Sep. 30, 2016; U.S. Provisional Patent Application Ser. No. 62/413,781, filed on Oct. 27, 2016; and U.S. Provisional Patent Application Ser. No. 62/441,124, filed on Dec. 30, 2016. The content of the above-identified patent document is incorporated herein by reference.

TECHNICAL FIELD

The present application relates generally to random access operation in wireless communication systems. More specifically, this disclosure relates to random access channel structure of multi-beam operation in wireless communication systems.

BACKGROUND

5th generation (5G) mobile communications, initial commercialization of which is expected around 2020, is recently gathering increased momentum with all the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3×, support for up to 500 kilometer per hour (km/h) mobility, 1 millisecond (ms) latency, a connection density of 106 devices/km2, a network energy efficiency improvement of 100× and an area traffic capacity of 10 Mb/s/m2. While all the requirements need not be met simultaneously, the design of 5G networks may provide flexibility to support various applications meeting part of the above requirements on a use case basis.

SUMMARY

The present disclosure relates to a pre-5th-Generation (5G) or 5G communication system to be provided for supporting higher data rates beyond 4th-Generation (4G) communication system such as long term evolution (LTE). Embodiments of the present disclosure provide multiple services in advanced communication systems.

In one embodiment, a base station (BS) for a random access operation in a wireless communication system is provided. The BS includes a transceiver configured to transmit, to a user equipment (UE), RACH configuration information including an RACH structure corresponding to a first beam identification (ID) and receive, from the UE over a first beam associated with the first beam ID, an RACH preamble configured based on the RACH structure. The BS further includes at least one processor is configured to configure an RACH response corresponding to the RACH preamble. The BS includes the transceiver further configured to transmit, to the UE, the RACH response over a second beam, wherein the first beam is different than the second beam.

In another embodiment, a user equipment (UE) for random access operation in a wireless communication system. The UE includes at least one transceiver configured to receive, from a base station (BS), RACH configuration information including an RACH structure corresponding to a first beam identification (ID). The UE further includes at least one processor configured to determine an RACH preamble and RACH resource based on the RACH structure received from the BS. The UE includes the transceiver further configured to transmit, to the BS, the RACH preamble sent over a first beam associated with the first beam ID and receive, from the BS, an RACH response corresponding to the RACH preamble over a second beam, wherein the first beam is different than the second beam.

In yet another embodiment, a method of a base station (BS) for random access operation in a wireless communication system is provided. The method comprises transmitting, to a user equipment (UE), RACH configuration information including an RACH structure corresponding to a first beam identification (ID), receiving, from the UE, an RACH preamble configured based on the RACH structure over a first beam associated with the first beam ID, configuring an RACH response corresponding to the RACH preamble, and transmitting, to the UE, the RACH response over a second beam, wherein the first beam is different than the second beam.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C"

includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v13.0.0, "E-UTRA, Physical channels and modulation;" 3GPP TS 36.212 v13.0.0, "E-UTRA, Multiplexing and Channel coding;" 3GPP TS 36.213 v13.0.0, "E-UTRA, Physical Layer Procedures; and" 3GPP TS 36.331 v13.0.0, "Radio Resource Control (RRC) Protocol Specification."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
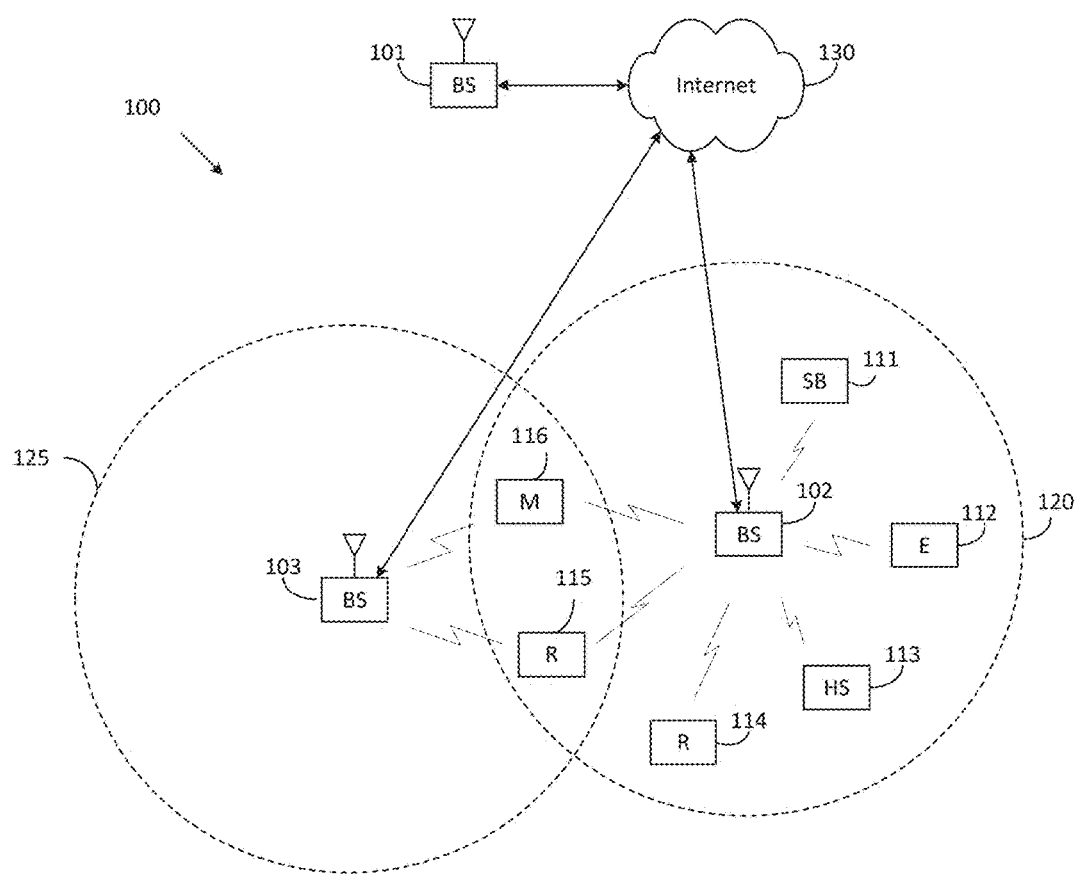
FIG. 1 illustrates an example wireless network according to embodiments of the present disclosure.
Figure 2:
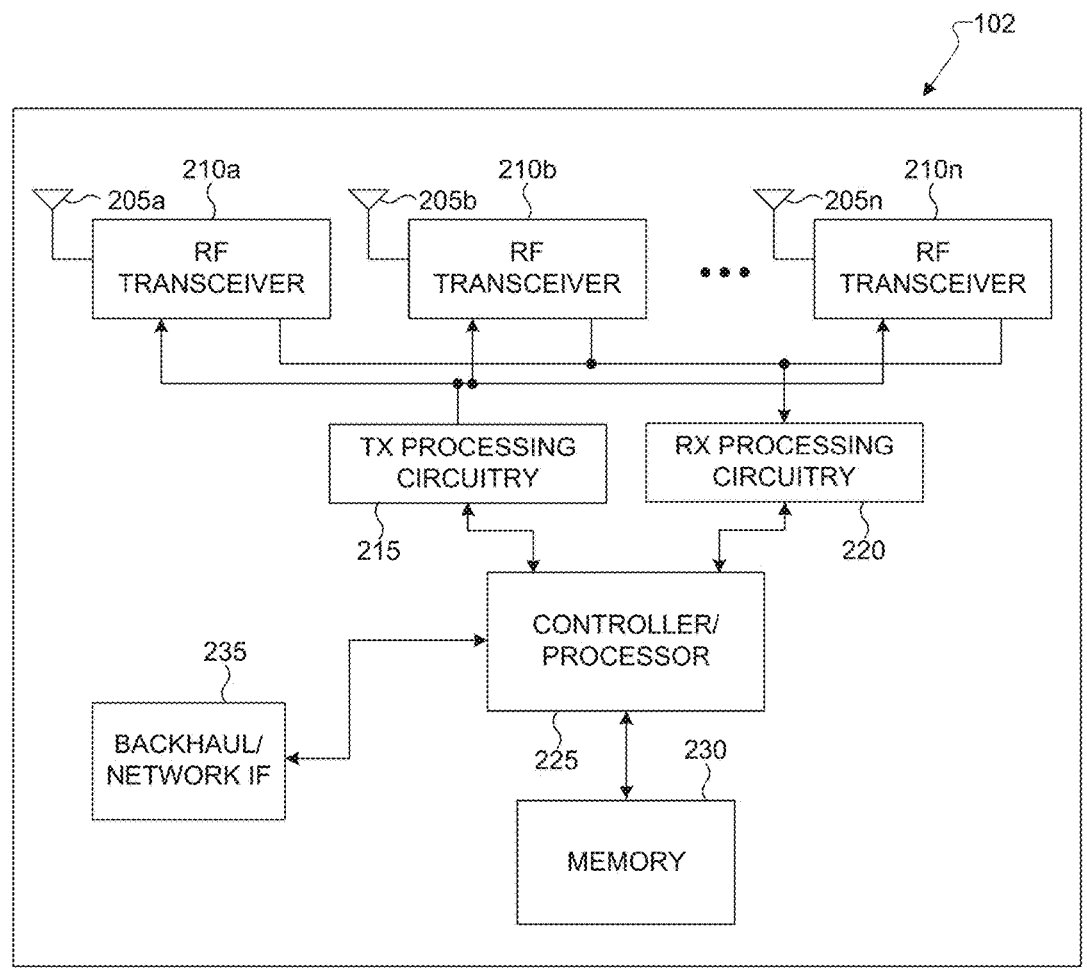
FIG. 2 illustrates an example eNB according to embodiments of the present disclosure.
Figure 3:
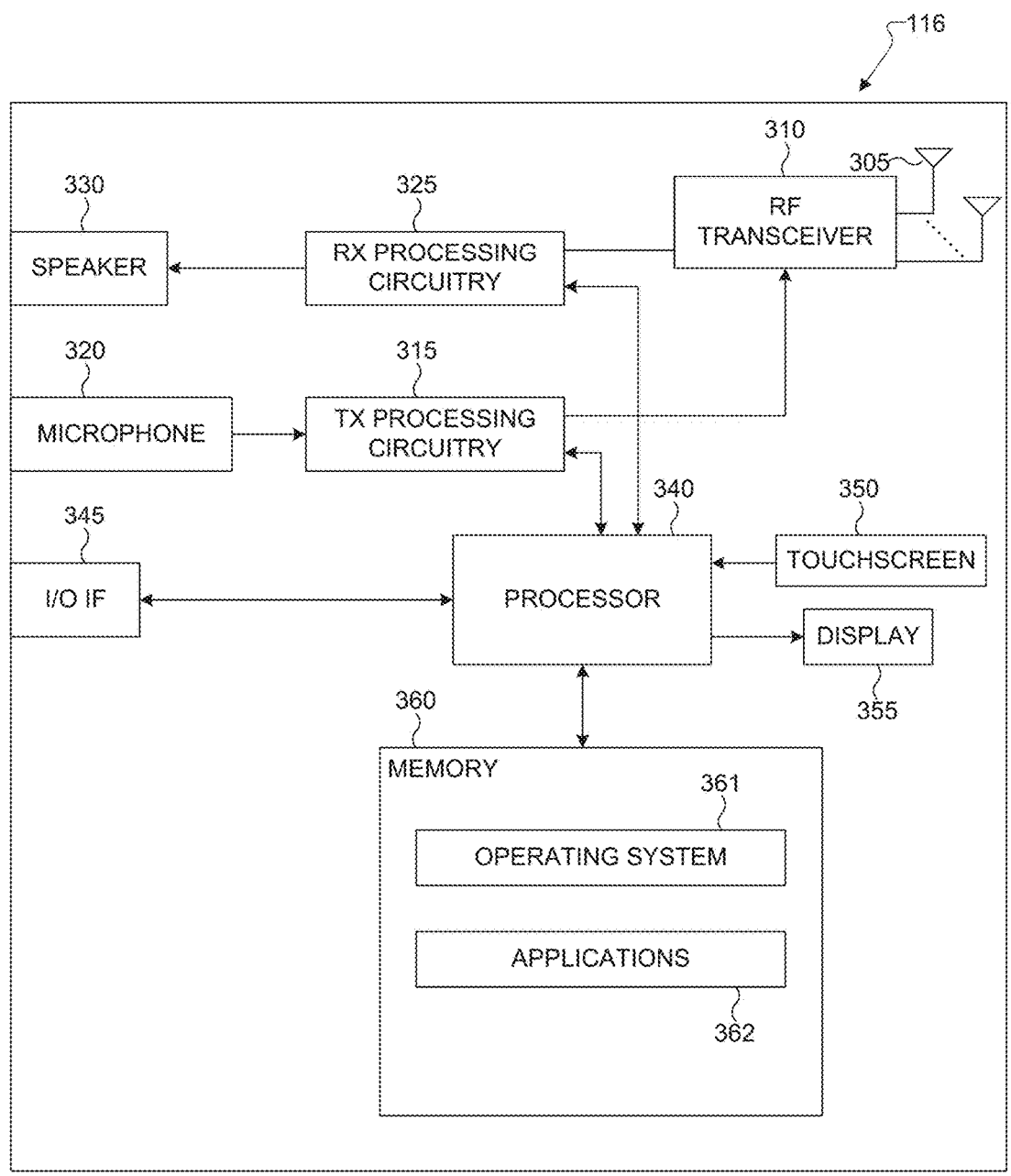
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient CSI reporting on PUCCH in an advanced wireless communication system. In certain embodiments, and one or more of the eNBs 101-103 includes circuitry, programming, or a combination thereof, for receiving efficient CSI reporting on PUCCH in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiments, the RF transceiver 210a-201n is capable of transmitting an RACH configuration information including an RACH structure corresponding to a first beam identification (ID) and receiving an RACH preamble configured based on the RACH structure over a first beam associated with the first beam ID.

In some embodiments, the RF transceiver 210a-201n is capable of receiving the RACH preamble using the first beam that is transmitted on the dedicated resources and receiving the RACH preamble using the first beam that is swept over RACH symbols in an RACH chunk.

In some embodiments, the RF transceiver 210a-201n is capable of receiving the RACH preamble including the first beam ID using an RACH chunk from the RACH chunks and receiving the RACH preamble including the first beam ID using an RACH preamble sequence from the subset of RACH preamble sequences.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

In some embodiments, the controller/processor 225 is capable of configuring an RACH response corresponding to the RACH preamble and configuring the RACH structure including an RACH occasion that includes RACH chunks each of which includes RACH symbols.

In some embodiments, the controller/processor 225 is capable of identifying dedicated resources to receive the first beam and mapping, based on the RACH configuration information, downlink signal symbols to RACH chunks, and mapping, based on the RACH configuration information, downlink signal symbols to a subset of RACH preamble sequences.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving an RACH configuration information including an RACH structure corresponding to a first beam identification (ID), transmitting an RACH preamble configured based on the RACH structure over a first beam associated with the first beam ID, and receiving the RACH response over a second beam, wherein the first beam is different than the second beam.

In some embodiments, the RF transceiver 310 is capable of transmitting the RACH preamble using the first beam that is transmitted on the dedicated resources and transmitting the RACH preamble using the first beam that is swept over RACH symbols in an RACH chunk.

In some embodiments, the RF transceiver 310 is capable of transmitting the RACH preamble including the first beam ID using an RACH chunk from the RACH chunks and receiving the RACH preamble including the first beam ID using an RACH preamble sequence from the subset of RACH preamble sequences.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

In some embodiments, the processor 340 is capable of determining an RACH preamble based on the RACH structure received from the BS.

In some embodiments, the processor 340 is capable of configuring an RACH occasion including RACH chunks each of which includes RACH symbols based on the RACH configuration information and identifying dedicated resources to transmit the first beam.

In some embodiments, the processor 340 is capable of mapping, based on the RACH configuration information, downlink signal symbols to RACH chunks and mapping, based on the RACH configuration information, downlink signal symbols to a subset of RACH preamble sequences.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
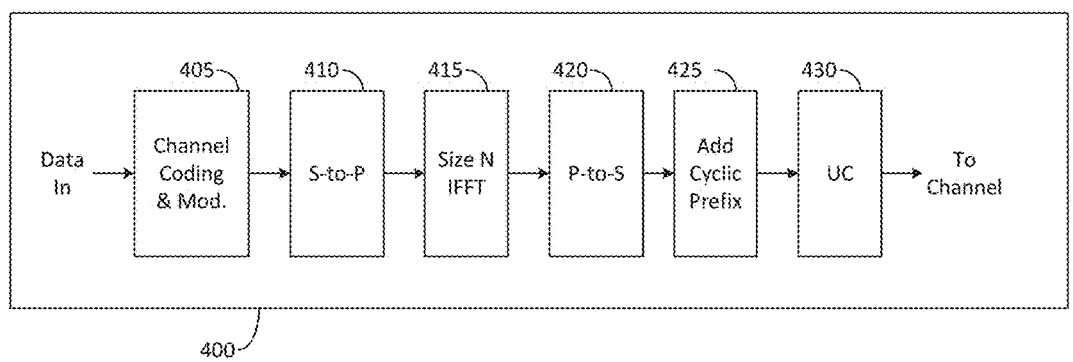
FIG. 4A illustrates an example high-level diagram of an orthogonal frequency division multiple access transmit path according to embodiments of the present disclosure.
Figure 4B:
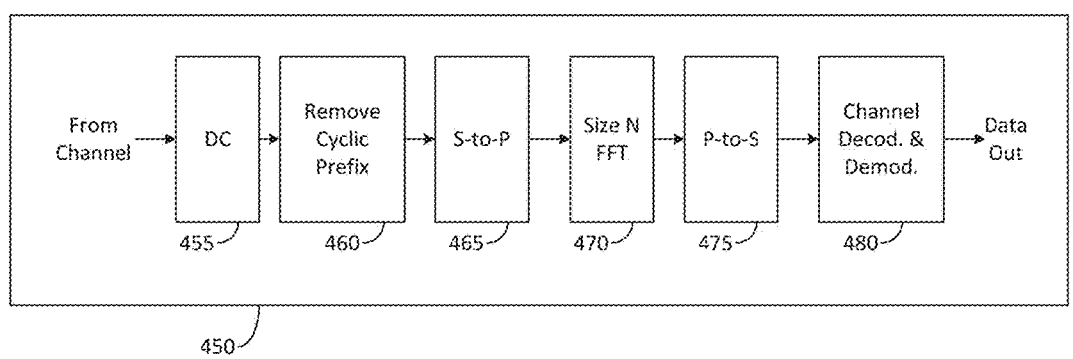
FIG. 4B illustrates an example high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

In LTE technologies, a time interval X which can contain one or more of the DL transmission part, guard, UL transmission part, and a combination of thereof regardless of they are indicated dynamically and/or semi-statically. Furthermore, in one example, the DL transmission part of time interval X contains downlink control information and/or downlink data transmissions and/or reference signals. In another example, the UL transmission part of time interval X contains uplink control information and/or uplink data transmissions and/or reference signals. In addition, the usage of DL and UL does not preclude other deployment scenarios e.g., sidelink, backhaul, relay). In some embodiments of the current disclosure, "a subframe" is another name to refer to "a time interval X," or vice versa. In order for the 5G network to support these diverse services are called network slicing.

In some embodiments, "a subframe" and "a time slot" can be used interchangeably. In some embodiments, "a subframe" refers to a transmit time interval (TTI), which may comprise an aggregation of "time slots" for UE"s data transmission/reception.

Figure 5:
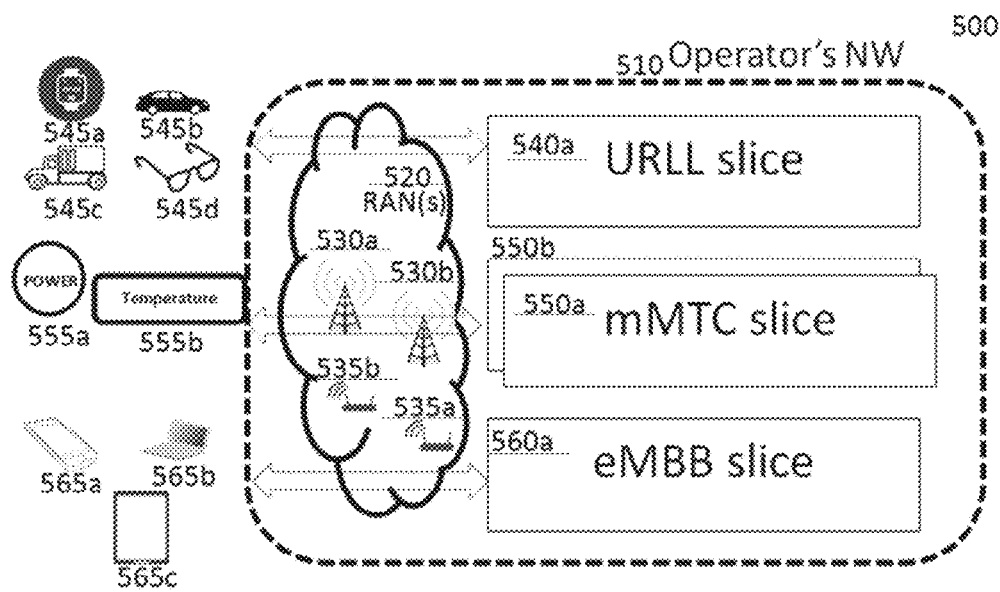
FIG. 5 illustrates an example network slicing according to embodiments of the present disclosure.

FIG. 5 illustrates a network slicing 500 according to embodiments of the present disclosure. An embodiment of the network slicing 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

As shown in FIG. 5, the network slicing 500 comprises an operator's network 510, a plurality of RANS 520, a plurality of eNBs 530a, 530b, a plurality of small cell base stations 535a, 535b, a URLL slice 540a, a smart watch 545a, a car 545b, a, truck 545c, a smart glasses 545d, a power 555a, a temperature 555b, an mMTC slice 550a, an eMBB slice 560a, a smart phone (e.g., cell phones) 565a, a laptop 565b, and a tablet 565c (e.g., tablet PCs).

The operator's network 510 includes a number of radio access network(s) 520—RAN(s)—that are associated with network devices, e.g., eNBs 530a and 530b, small cell base stations (femto/pico eNBs or Wi-Fi access points) 535a and 535b, etc. The operator's network 510 can support various services relying on the slice concept. In one example, four slices, 540a, 550a, 550b and 560a, are supported by the network. The URLL slice 540a to serve UEs requiring URLL services, e.g., cars 545b, trucks 545c, smart watches 545a, smart glasses 545d, etc. Two mMTC slices 550a and 550b serve UEs requiring mMTC services such as power meters and temperature control (e.g., 555b), and one eMBB slice 560a requiring eMBB serves such as cells phones 565a, laptops 565b, tablets 565c.

In short, network slicing is a method to cope with various different qualities of services (QoS) in the network level. For supporting these various QoS efficiently, slice-specific PHY optimization may also be necessary. Devices 545a/b/c/d, 555a/b are 565a/b/c examples of user equipment (UE) of different types. The different types of user equipment (UE) shown in FIG. 5 are not necessarily associated with particular types of slices. For example, the cell phone 565a, the laptop 565b and the tablet 565c are associated with the eMBB slice 560a, but this is just for illustration and these devices can be associated with any types of slices.

In some embodiments, one device is configured with more than one slice. In one embodiment, the UE, (e.g., 565a/b/c) is associated with two slices, the URLL slice 540a and the eMBB slice 560a. This can be useful for supporting online gaming application, in which graphical information are transmitted through the eMBB slice 560a, and user interaction related information are exchanged through the URLL slice 540a.

In the current LTE standard, no slice-level PHY is available, and most of the PHY functions are utilized slice-agnostic. A UE is typically configured with a single set of PHY parameters (including transmit time interval (TTI) length, OFDM symbol length, subcarrier spacing, etc.), which is likely to prevent the network from (1) fast adapting to dynamically changing QoS; and (2) supporting various QoS simultaneously.

In some embodiments, corresponding PHY designs to cope with different QoS with network slicing concept are disclosed. It is noted that "slice" is a terminology introduced just for convenience to refer to a logical entity that is associated with common features, for example, numerology, an upper-layer (including medium access control/radio resource control (MAC/RRC)), and shared UL/DL time-frequency resources. Alternative names for "slice" include virtual cells, hyper cells, cells, etc.

Figure 6:
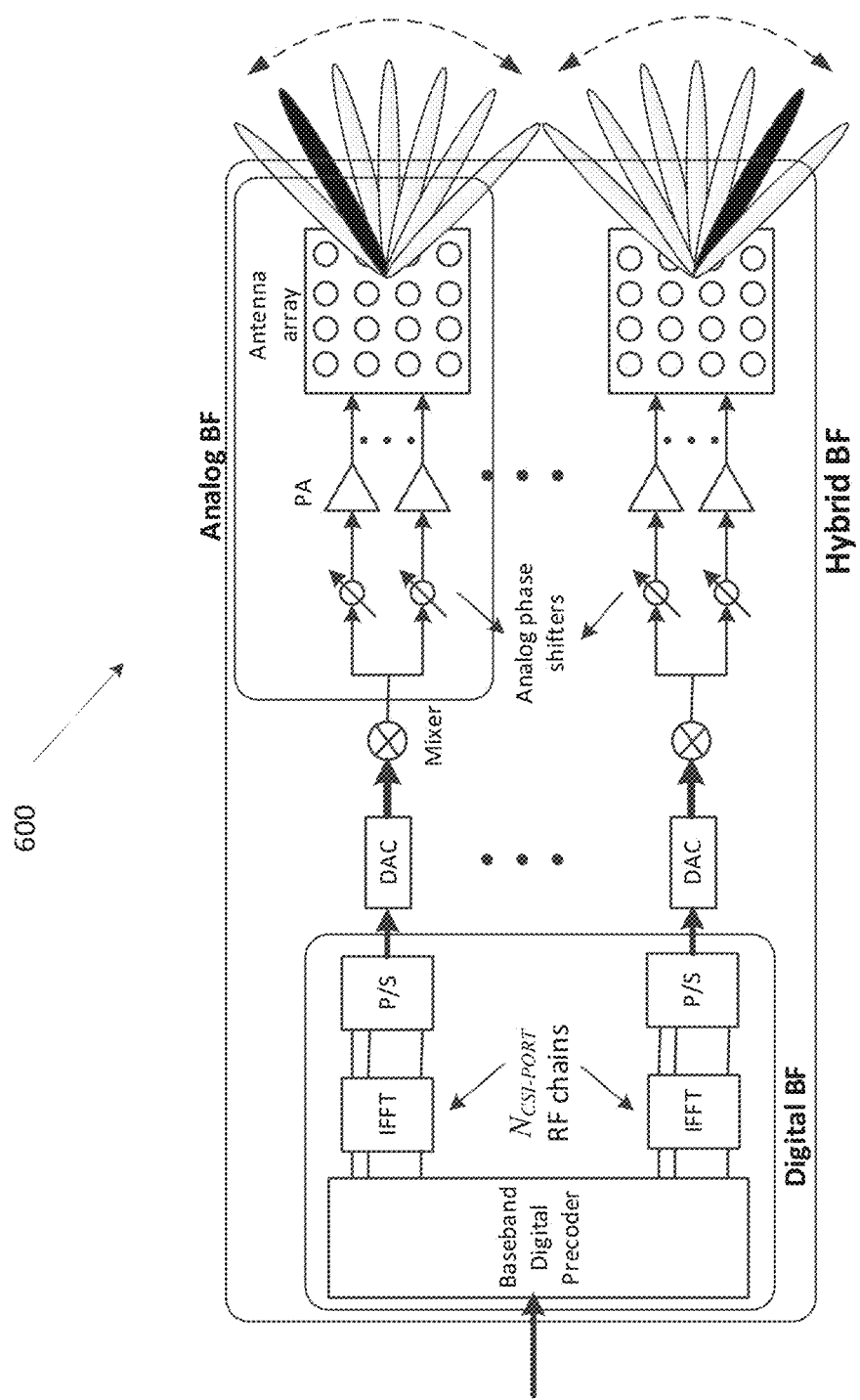
FIG. 6 illustrates an example number of digital chains according to embodiments of the present disclosure.

FIG. 6 illustrates an example number of digital chains 600 according to embodiments of the present disclosure. An embodiment of the number of digital chains 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

LTE specification supports up to 32 channel state information-reference signal (CSI-RS) antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 6. In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes. The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase precoding gain. While analog beams are wideband (hence not frequency-selective), digital precoding can be varied across frequency sub-bands or resource blocks.

Figure 7:
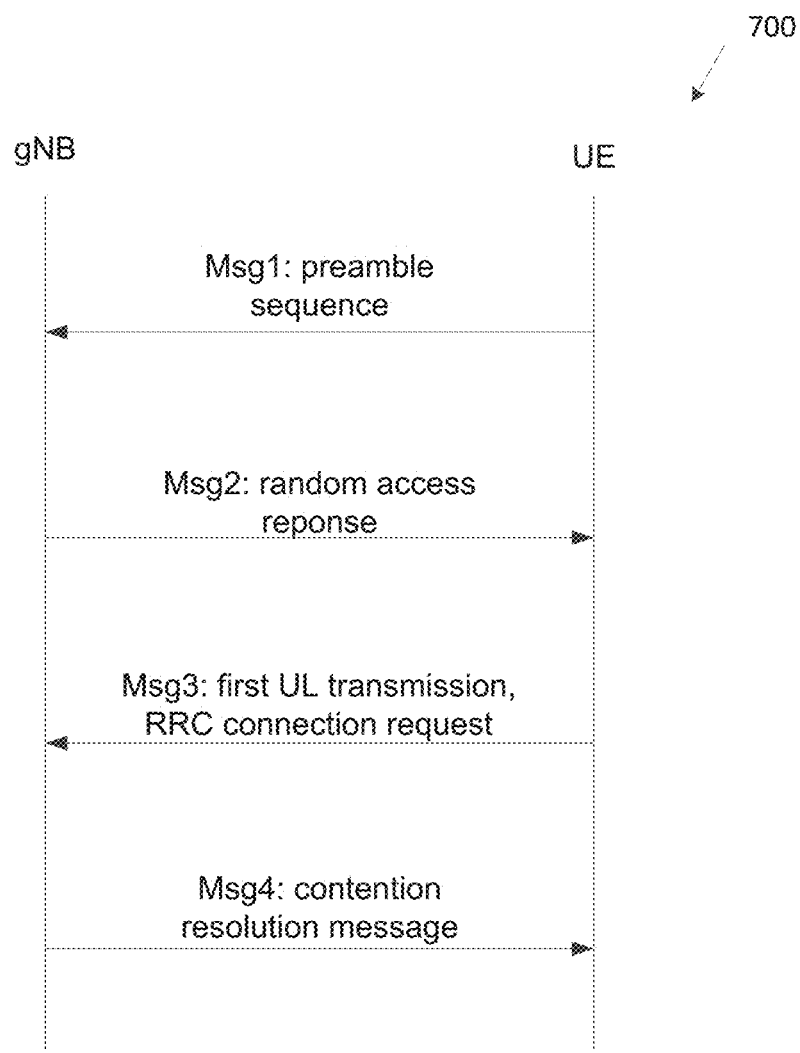
FIG. 7 illustrates an example random access procedures according to embodiments of the present disclosure.

FIG. 7 illustrates an example random access procedure 700 according to embodiments of the present disclosure. An embodiment of the random access procedure 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

Before a UE can receive or transmit data to a gNB, the UE first needs to do the uplink random access procedure: to establish uplink synchronization between UE and gNB, such as timing advance; and to obtain the resource for RRC connection request.

In LTE specification, contention based random access procedure consists of four steps: a UE selects one of N RACH preamble sequences. UE selects one RACH time-slot based on the RACH configuration to transmit the preamble sequence. If UE does not receive RACH response from the gNB with some timer, UE increases the transmit power with a configured step size and re-send the RACH preamble; a gNB sends random access response (RAR) to UE for one detected preamble sequence. The RAR message conveys the information of a temporary C-RNTI, a timing advance value and an uplink resource grant for msg 3; after receiving the RAR, the UE sends msg3 RRC connection request message to gNB; and a gNB sends msg4 in response to the received msg3.

To cover different cell size, few preamble formats with different length of cyclic prefix (CP) and sequence are defined, as shown in TABLE 1.

TABLE 1

Preamble Formats

| Preamble Format | Length of CP (ms) | Length of sequence (ms) | Guard time (ms) |
| --- | --- | --- | --- |
| 0 | 0.103 | 0.8 | 0.097 |
| 1 | 0.684 | 0.8 | 0.516 |
| 2 | 0.203 | 1.6 | 0.197 |
| 3 | 0.684 | 1.6 | 0.716 |
| 4 | 0.015 | 0.133 | |

The random access design for new communication system such 5G has a few new challenges. In one example, a gNB needs to use multiple receive beams to cover the whole cell area in the uplink. In the design of RACH, the multi-beam based operation of the gNB may be considered for the coverage of RACH. In another example, the gNB might or might not have beam reciprocity between Tx and Rx beams. The design of random access may consider both cases. When the gNB does not have beam reciprocity, the UE is not able to identify the best gNB Rx beam for random access based on the downlink initial access signal the UE can measure; special design is needed to ensure the preamble sent from the UE is detected by the gNB successfully.

In yet another example, the UE might also have different level of beam reciprocity between UE's Tx and Rx beams. If UE has beam reciprocity, the UE is able to figure out which is the best beam for sending random access based on the downlink initial access signal measurement. However, if UE has no beam reciprocity, the UE might not be able to figure out the best transmit beam. In the design of random access, one needs to consider the beam reciprocity capability of UEs.

In some embodiments, the delay of random access, if the number of beams is large, the delay of random access might be large due to the multi-beam operation. How to minimize the random access delay is an important consideration in the design.

In some embodiments, one random access occasion consists of one or more RACH chunks and each RACH chunk consists of one or more RACH symbols. The number of RACH chunks in one random access occasion is Q>=1 and the number of RACH symbol in each RACH chunk is P>=1.

Figure 8A:
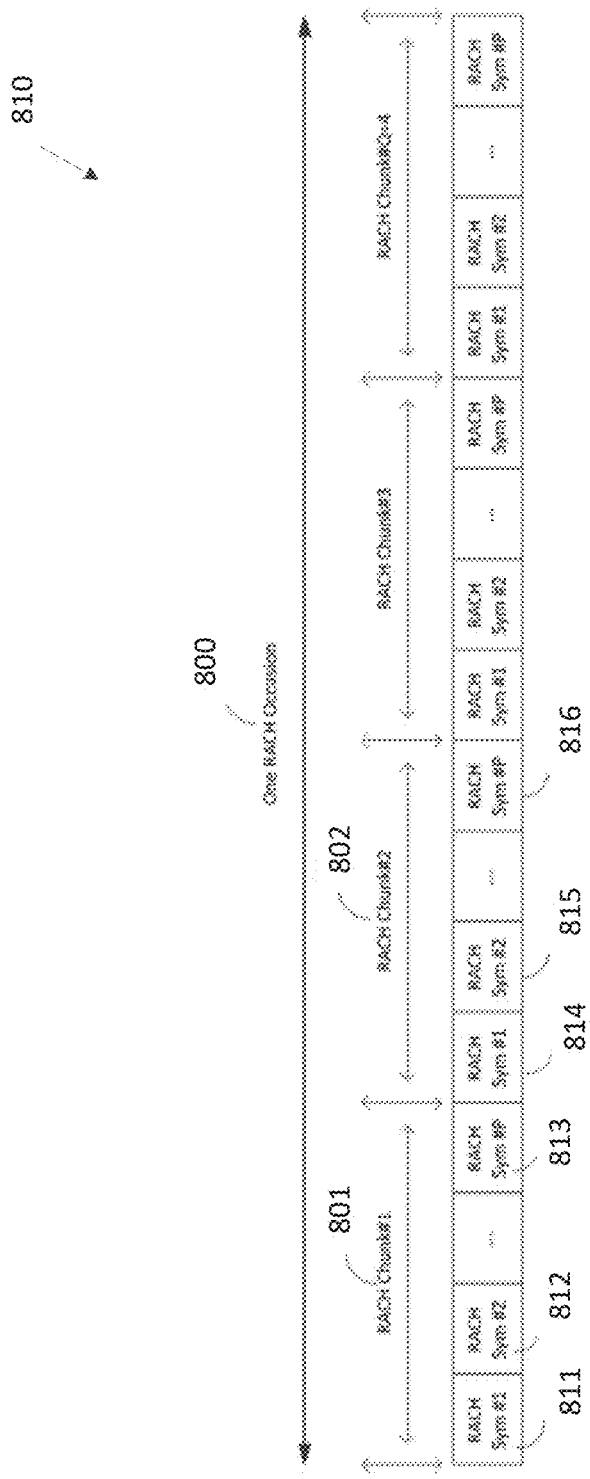
FIG. 8A illustrates an example RACH occasion according to embodiments of the present disclosure.

FIG. 8A illustrates an example RACH occasion 810 according to embodiments of the present disclosure. An embodiment of the RACH occasion 810 shown in FIG. 8A is for illustration only. One or more of the components illustrated in FIG. 8A can be implemented in specialized circuitry configured to perform the noted functions or one or more of the components can be implemented by one or more processors executing instructions to perform the noted functions. Other embodiments are used without departing from the scope of the present disclosure.

In one example, the RACH symbols in one RACH chunk are contiguous. An example is shown FIG. 8A. As illustrated in FIG. 8A, one RACH occasion 800 has Q=4 RACH chunks. Each RACH chunk has P contiguous RACH symbols. RACH chunk #1 801 has contiguous RACH symbols, RACH symbol #1 811, RACH symbol #2 812 and to RACH symbol #P 813. RACH chunk #2 802 has contiguous RACH symbols, RACH symbol #1 814, RACH symbol #2 815, and to RACH symbol #P 816.

Figure 8B:
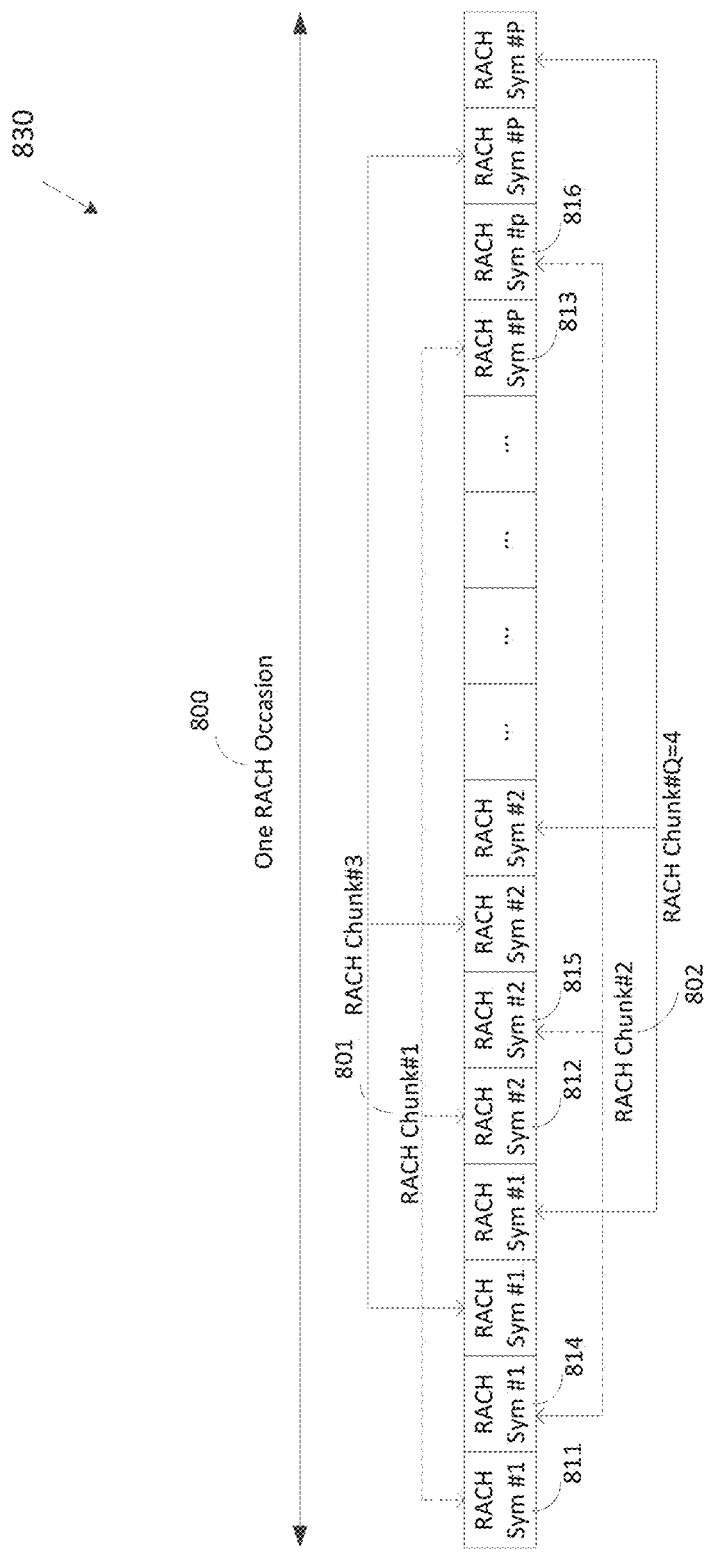
FIG. 8B illustrates another example RACH occasion according to embodiments of the present disclosure.

FIG. 8B illustrates another example RACH occasion 830 according to embodiments of the present disclosure. An embodiment of the RACH occasion 830 shown in FIG. 8B is for illustration only. One or more of the components illustrated in FIG. 8B can be implemented in specialized circuitry configured to perform the noted functions or one or more of the components can be implemented by one or more processors executing instructions to perform the noted functions. Other embodiments are used without departing from the scope of the present disclosure.

In one example, the RACH symbols in one RACH chunk are scattered. An example is shown in FIG. 8B. As illustrated in FIG. 8B, one RACH occasion 800 has Q=4 RACH chunks. Each RACH chunk has P scattered RACH symbols. RACH chunk #1 801 has scattered RACH symbols, RACH symbol #1 811, RACH symbol #2 812 and to RACH symbol #P 813. RACH chunk #2 802 has scattered RACH symbols, RACH symbol #1 814, RACH symbol #2 815, and to RACH symbol #P 816.

In some embodiments, the gNB utilizes the same receive beam on all the RACH symbols belonging to the same RACH chunk and the gNB could utilize different receive beams on different RACH chunks. In one embodiment, the gNB could sweep Rx beams over the RACH symbols within one RACH chunk.

Figure 8C:
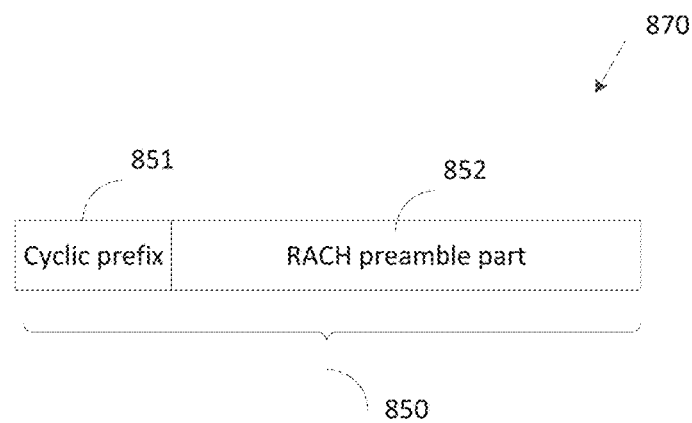
FIG. 8C illustrates an example RACH symbols according to embodiments of the present disclosure.

FIG. 8C illustrates example RACH symbols 870 according to embodiments of the present disclosure. An embodiment of the RACH symbols 870 shown in FIG. 8C is for illustration only. One or more of the components illustrated in FIG. 8C can be implemented in specialized circuitry configured to perform the noted functions or one or more of the components can be implemented by one or more processors executing instructions to perform the noted functions. Other embodiments are used without departing from the scope of the present disclosure.

In some embodiments, one RACH symbols is comprised by a cyclic prefix part and preamble sequence part, as illustrated in FIG. 8C. One RACH symbol 850 contains a cyclic prefix part 851 and a RACH preamble part 852. The length of cyclic prefix part 851 may be long enough to accommodate variation of round trip delay and propagation delay of all UEs in one cell.

In some embodiments, the UE is configured to select one RACH chunk for the uplink preamble transmission based on the measurement of downlink initial access signal. For example, the UE is configured to pick the RACH chunk index based on the index of OFDM symbol where the UE measures the strongest RSRP of initial synchronization signals. For example, the UE is configured to pick the RACH chunk index based on the index of OFDM symbol where the UE measures the strongest RSRP of beam reference signal. For example, the UE is configured to pick the RACH chunk index based on the beam ID witch which the UE measures the strongest RSRP of the beams.

In some embodiments, the UE is configured to transmit the same preamble sequence in the RACH symbols in the one selected RACH chunks.

Figure 9A:
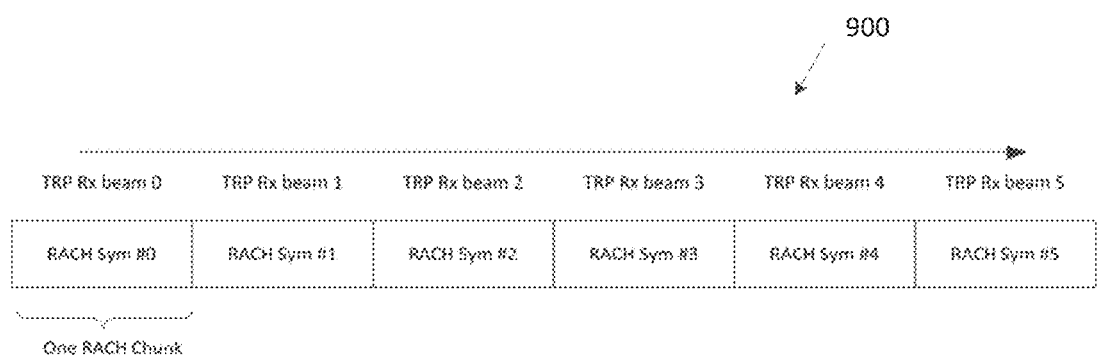
FIG. 9A illustrates an example RACH channel structure according to embodiments of the present disclosure.

FIG. 9A illustrates an example RACH channel structure 900 according to embodiments of the present disclosure. An embodiment of the RACH channel structure 900 shown in FIG. 9A is for illustration only. One or more of the components illustrated in FIG. 9A can be implemented in specialized circuitry configured to perform the noted functions or one or more of the components can be implemented by one or more processors executing instructions to perform the noted functions. Other embodiments are used without departing from the scope of the present disclosure.

As shown in FIG. 9A, one RACH occasion has Q=6 RACH chunks and each RACH chunk has P=1 RACH symbols. The TRP has 6 receive beams and the TRP sweeps the receive beams over these 6 RACH symbols. The UE is configured to transmit preamble on one of these RACH symbol. The configuration of this example is applicable to the scenario in which the TRP has beam reciprocity between Tx and Rx beams. The UE is capable to calculate the best receive beam of TRP for uplink preamble and thus is capable to pick the best RACH symbol.

Figure 9B:
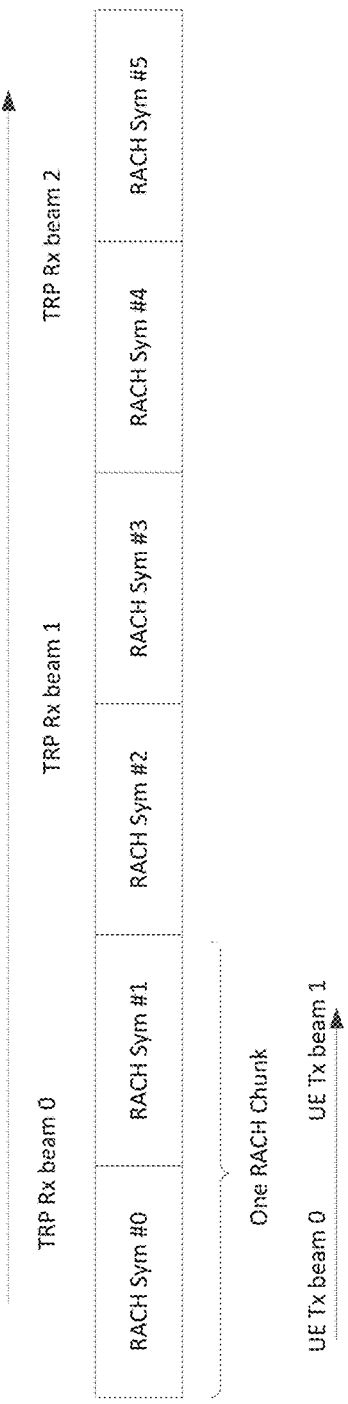
FIG. 9B illustrates another example RACH channel structure according to embodiments of the present disclosure.

FIG. 9B illustrates another example RACH channel structure 920 according to embodiments of the present disclosure. An embodiment of the RACH channel structure 920 shown in FIG. 9B is for illustration only. One or more of the components illustrated in FIG. 9B can be implemented in specialized circuitry configured to perform the noted functions or one or more of the components can be implemented by one or more processors executing instructions to perform the noted functions. Other embodiments are used without departing from the scope of the present disclosure.

As shown in FIG. 9B, one RACH occasion has Q=3 RACH chunks and each RACH chunk has P=2 RACH symbols. The symbols in one RACH chunk are contiguous. The TRP has 3 receive beams and the TRP sweeps the receive beams over these 3 RACH symbols. The TRP utilizes Rx beam #0 on both RACH symbols in RACH chunk #1; the TRP utilizes Rx beam #1 on both RACH symbols in RACH chunk #2; and the TRP utilizes Rx beam #2 on both RACH symbols in RACH chunk #3. The UE is configured to transmit preamble on one of these RACH chunk and repeat the same preamble sequence of two RACH symbols in the selected RACH chunk. The configuration as shown in FIG. 9B allows the UE to use Tx beam sweeping method to transmit uplink preamble sequence. That is applicable to the scenario in which the UE does not have beam reciprocity between Tx and Rx beams. The UE is capable to sweep Tx beams on preamble sequence to improve the uplink reliability.

Figure 9C:
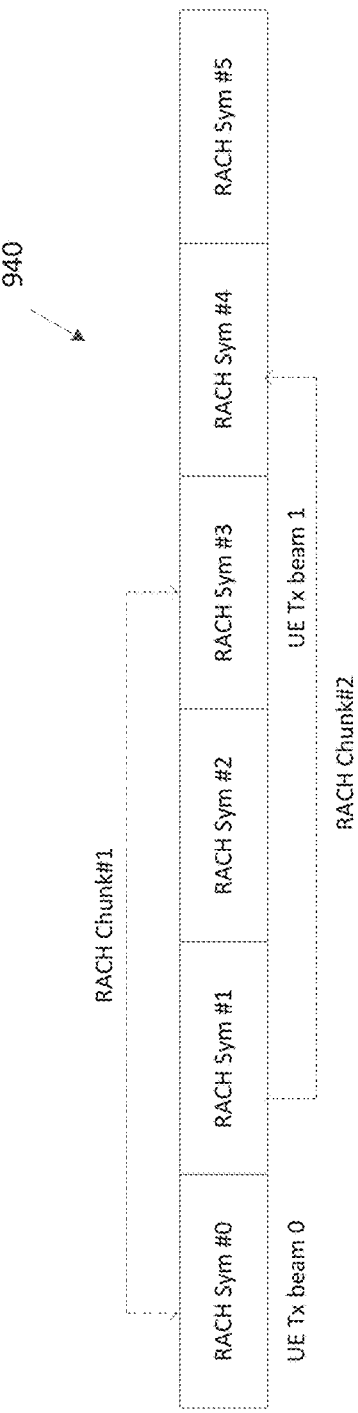
FIG. 9C illustrates yet another example RACH channel structure according to embodiments of the present disclosure.

FIG. 9C illustrates yet another example RACH channel structure 940 according to embodiments of the present disclosure. An embodiment of the RACH channel structure 940 shown in FIG. 9C is for illustration only. One or more of the components illustrated in FIG. 9C can be implemented in specialized circuitry configured to perform the noted functions or one or more of the components can be implemented by one or more processors executing instructions to perform the noted functions. Other embodiments are used without departing from the scope of the present disclosure.

An example of RACH channel configuration with scattered symbols is shown in FIG. 9C. As shown in FIG. 9C, one RACH occasion has Q=3 RACH chunks and each RACH chunk has P=2 RACH symbols. The symbols in one RACH chunk are scattered. Similar to the aforementioned embodiments, one UE is configured to transmit the same preamble sequence in two RACH symbols with different Tx beams. The scattered RACH symbols give more channel diversity to improve the reliability of uplink preamble transmission.

In some embodiment, one RACH occasion could occupy one or more uplink subframes. The RACH occasion is periodic. In some embodiment, the UE is configured to receive the RACH configuration from system information message, for example, MIB and SIB.

In some embodiment, the RACH configuration comprises one or more of components. In one example, the RACH configuration comprises a preamble format that defines the format of one RACH symbol. In one example, one preamble format defines the length of cyclic prefix and the length of RACH symbol. In another example, the RACH configuration comprises a preamble type that defines if a Tx beam ID is conveyed in the preamble sequence or not. In one example, if the preamble type is 0, the preamble sequence does not convey the information of Tx beam ID and if the preamble type is 1, the preamble sequence coveys the information of Tx beam ID. If a UE is configured with preamble type 1, the preamble sequences are divided into M exclusive groups and each preamble group corresponds to a TRP Tx beam ID. The UE is configured to select from preamble sequence from the group that is mapped to the TRP Tx beam the UE selects.

In yet another example, the RACH configuration comprise a number of RACH Chunk in one RACH occasion, Q>=1. In another example, the RACH configuration comprises a number of RACH symbol in one RACH chunk, P>=1. In another example, the RACH configuration comprises a type of RACH chunk: the RACH chunk could have two methods of the RACH symbols. One method is the RACH symbols are contiguous in one RACH chunk, as shown in FIG. 8A. Another method is that RACH symbols are scattered as shown in FIG. 8B.

In yet another example, the RACH configuration comprises a method of selecting RACH chunk for preamble retransmission: one RACH occasion could have multiple RACH chunk and the TRP could apply different uplink Rx beams over those RACH chunks. If the TRP does not have reciprocity between Tx and Rx beams, the UE may be not able to figure out which Rx beam (i.e., RACH chunk) is the best for preamble transmission. So if a preamble transmission is failed, the UE could be configured to re-select the RACH chunk for the preamble re-transmission. Multiple modes could be defined. In one example, one mode is that the UE is configured to use the same RACH chunk. In one example, the UE is configured to select the next RACH chunk index based on the previous RACH chunk index by following some equation. In one example, the UE is configured to select the RACH chunk index based on a pseudorandom sequence. The pseudorandom sequence could be generated from the initialization based on the identity of the UE.

In yet another example, the RACH configuration comprises the subframe configuration of RACH occasions comprising the information indices of subframe where RACH occasions are mapped and the periodicity of RACH occasions. In yet another example, the RACH configuration comprises the RAR type: there could be type of methods to transmit RAR. One method is to transmit with one Tx beam. Another method is to transmit RAR through a Tx beam sweeping. In one example, if the RAR type is 0, the RAR is sent as a PDSCH indicated by a DCI with RA-RNTI. If the RAR type is 1, the RAR is sent through Tx beam sweeping and the configuration of RAR occasion is conveyed in system information channel.

In some embodiments, the RACH configuration could be configured by RACH configuration index and the RACH configuration index is signaled in system information channel, e.g., MIB and/or SIB. The UE is configured to calculate the RACH configuration information, for example, the detailed information listed above, based on the received RACH configuration index. One example of the RACH configuration index is shown in TABLE 2.

TABLE 2

| RACH configuration index | | | | | | | |
|---|---|---|---|---|---|---|---|
| RACH configuration index | Preamble format | Preamble type | Number of RACH chunk (Q) | Number of RACH symbols per Chunk (P) | Method of selecting RACH chunk for re-transmission | RACH Chunk Type | RAR type |
| 0 | 0 | 0 | 7 | 1 | 0 | 0 | 0 |
| 1 | 0 | 0 | 7 | 4 | 0 | 0 | 0 |
| 2 | 0 | 1 | 7 | 1 | 1 | 0 | 0 |
| 3 | 0 | 1 | 7 | 4 | 1 | 0 | 0 |
| 4 | 0 | 0 | 7 | 4 | 1 | 1 | 1 |
| 5 | 0 | 0 | 7 | 4 | 2 | 1 | 1 |
| 6 | 1 | 0 | 7 | 1 | 0 | 0 | 1 |
| 7 | 1 | 0 | 7 | 1 | 0 | 1 | 1 |

As shown in TABLE 2, one example of RACH configuration index 0 defines: preamble format is 0; preamble type is 0, i.e., the preamble sequence does not convey Tx beam ID; each RACH occasion has Q=7 RACH chunk and each RACH chunk has P=1 RACH symbol; and the RACH symbols are contiguous in each RACH chunk.

As shown in TABLE 2, one example of RACH configuration index 3 defines: preamble format is 0; preamble type is 1. The preamble sequence may convey one Tx beam ID; each RACH occasion has Q=7 RACH chunks and each RACH chunk has P=4 RACH symbols; and the RACH symbols are contiguous in each RACH chunk.

In some embodiments, the UE is configured to select the preamble sequence based on the preamble type indicated by the RACH configuration. In one embodiment, the preamble type is indicated by a RACH configuration index that is signaled in system information message.

In some embodiments, assume the UE is configured with L available preamble sequence for random access. The UE is also configured with number of Tx beams used for DL initial access signals, $N_B$. If the UE is configured with preamble type 0, the UE is configured to randomly select one sequence from those L preamble sequence. If the UE is configured with preamble type 1, the UE is configured to select the preamble sequence through the following procedure. In step 1, the UE calculates the best Tx beam ID that corresponds to the strongest RSRP of DL initial signals. In one example, the initial synchronization signals are transmitted over multiple OFDM symbol through Tx beam sweeping. The best Tx beam ID is the OFDM symbol index where the UE detects the strongest RSRP of initial synchronization signals. In another example, the best Tx beam ID is the beam ID with the strongest RSRP measured from beam reference signals.

In step 2, assume the Tx beam ID selected by the UE is $n \in [0, 1, \ldots, N_B-1]$. In this step, in one embodiment, the UE to select the preamble sequence from preamble ID set $[0, \ldots, L-1]$ is given as follows. In one example for the case of $\mod(L,N_B)>0$, if the Tx beam ID is $n \in [0, \ldots, \mod(L, N_B)-1]$, the UE uniformly and randomly selects one preamble sequence from sequence ID set:

$$\left[0, 1, \ldots, \left\lfloor \frac{L}{N_B} \right\rfloor \right] + n \times \left( \left\lfloor \frac{L}{N_B} \right\rfloor + 1 \right).$$

If the Tx beam ID is $n \in [\mod(L,N_B), \ldots, N_B-1]$, the UE uniformly and randomly selects one preamble sequence from sequence ID set:

$$\left[0, 1, \ldots, \left\lfloor \frac{L}{N_B} \right\rfloor - 1 \right] + (n - \mod(L, N_B)) \times \left( \left\lfloor \frac{L}{N_B} \right\rfloor \right) + \left\lfloor \frac{L}{N_B} \right\rfloor \times (\mod(L, N_B) + 1).$$

In another example for the case of $\mod(L,N_B)==0$, For the Tx beam ID: $n \in [0, \ldots, N_B-1]$, the UE uniformly and randomly selects one preamble sequence from sequence ID set $$\left[0, 1, \ldots, \left\lfloor \frac{L}{N_B} \right\rfloor - 1 \right] + n \times \left\lfloor \frac{L}{N_B} \right\rfloor.$$

In another embodiment, the UE to select the preamble sequence from preamble ID set $[0, \ldots, L-1]$ is given as follows. In one example for the Tx beam ID: $n \in [0, \ldots, N_B-1]$, the UE selects one preamble sequence from preamble sequence IDs that satisfy the condition: $l = n + N_B \times i$; with $i = 0, 1, 2, \ldots$, $l \geq 0$ and $l \leq L$.

In one embodiment, the preamble ID set is $[L_0, L_0+1, \ldots, L_0+L-1]$, the preamble sequence ID the UE selects would be $\hat{L} = L_0 + \tilde{L}$, where $\tilde{L}$ is the preamble ID calculated using the aforementioned embodiments.

In some embodiment, the UE is configured to repeat the selected preamble sequence in multiple RACH symbols in one RACH chunk. In some embodiment, a UE is configured with a method of switching RACH chunk. The method defines the procedure on how the UE selects the RACH chunk for the random access preamble sequence re-transmission when one preamble sequence transmission is failed. In some embodiment, the method of switching RACH chunk is signaled through RACH configuration index.

Assume there are totally $Q>=1$ RACH Chunks in one RACH occasion and the RACH chunk index is $[0, 1, \ldots, Q-1]$. Assume the RACH chunk index selected first transmission of preamble is $q_0$. In one embodiment, the index of RACH chunk for first preamble retransmission is $(q_0+1) \pmod Q$ and the index of RACH chunk for n-th preamble retransmission is $(q_0+n) \pmod Q$. In another embodiment, the index of RACH chunk for first preamble retransmission is $(q_0-1) \pmod Q$ and the index of RACH chunk for n-th preamble retransmission is $(q_0-n) \pmod Q$. In yet another embodiment, the index of RACH chunk for first preamble retransmission is $(q_0-1) \pmod Q$ and the index of RACH chunk for second preamble retransmission is $(q_0+1) \pmod Q$.

Figure 10A:
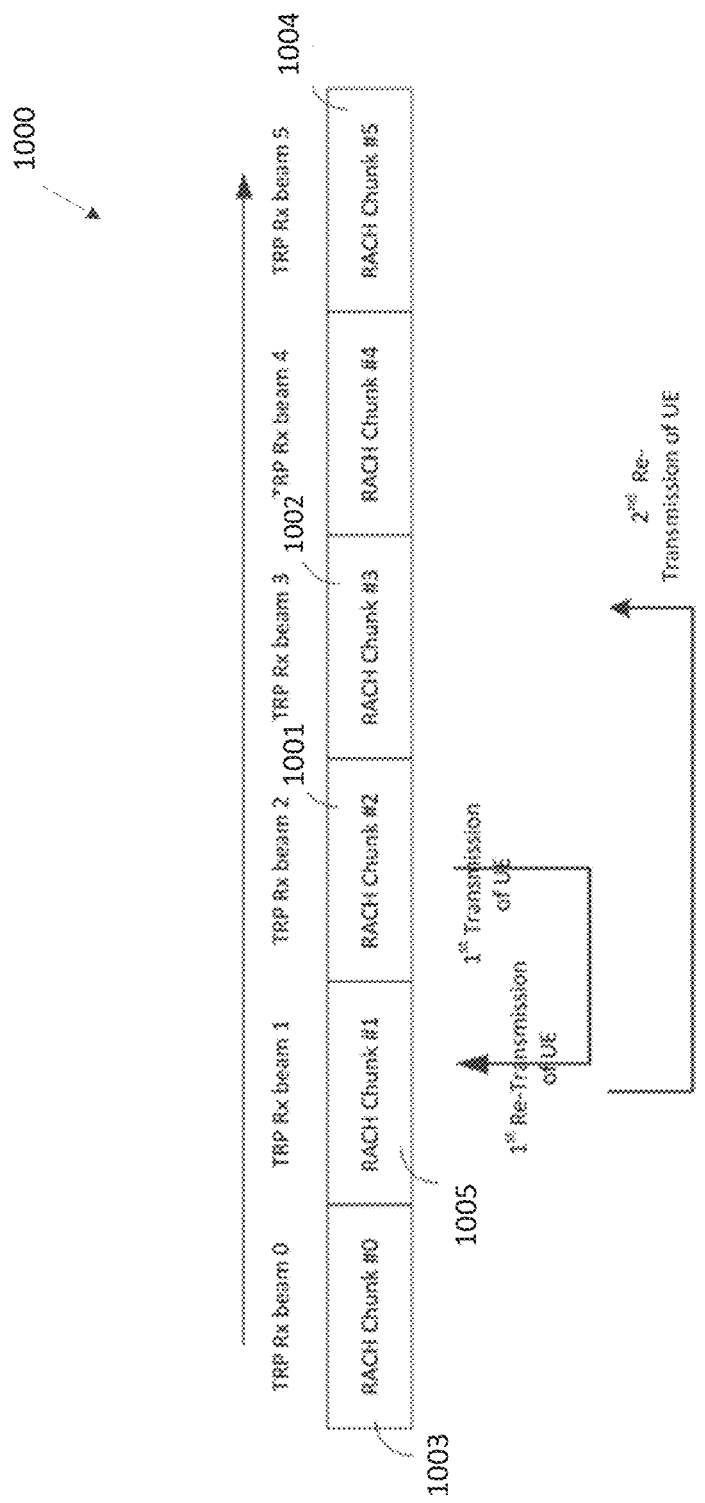
FIG. 10A illustrates an example RACH chunk according to embodiments of the present disclosure.

FIG. 10A illustrates an example RACH chunk 1000 according to embodiments of the present disclosure. An embodiment of the RACH chunk 1000 shown in FIG. 10A is for illustration only. One or more of the components illustrated in FIG. 10A can be implemented in specialized circuitry configured to perform the noted functions or one or more of the components can be implemented by one or more processors executing instructions to perform the noted functions. Other embodiments are used without departing from the scope of the present disclosure.

The index of RACH chunk for n-th preamble retransmission is $$\left(q_0 + (-1)^n \left\lceil \frac{n-1}{2} \right\rceil \right) (\mod Q),$$

for $n=1, 2, \ldots$ An example for this method is shown in FIG. 10A. As illustrated in FIG. 10A, here are Q=6 RACH chunks. The UE selects RACH chunk #2 1001 for the initial preamble transmission. Then the index of RACH chunk for first retransmission is $(2-1) \pmod 6 = 1$, that is RACH chunk #1 1005. The index of RACH chunk for second retransmission is $$\left(2 + (-1)^{-2} \left\lceil \frac{2-1}{2} \right\rceil \right) (\mod 6) = 3,$$

which is RACH chunk #3, 1002.

In one embodiment, the index of RACH chunk for first preamble retransmission is $(q_0+1) \pmod Q$ and the index of RACH chunk for second preamble retransmission is $(q_0-1)$ (mod Q). The index of RACH chunk for n-th preamble retransmission is $$\left(q_0 - (-1)^n \left\lceil \frac{n-1}{2} \right\rceil\right) (\text{mod } Q),$$

for n=1, 2, . . . .

Figure 10B:
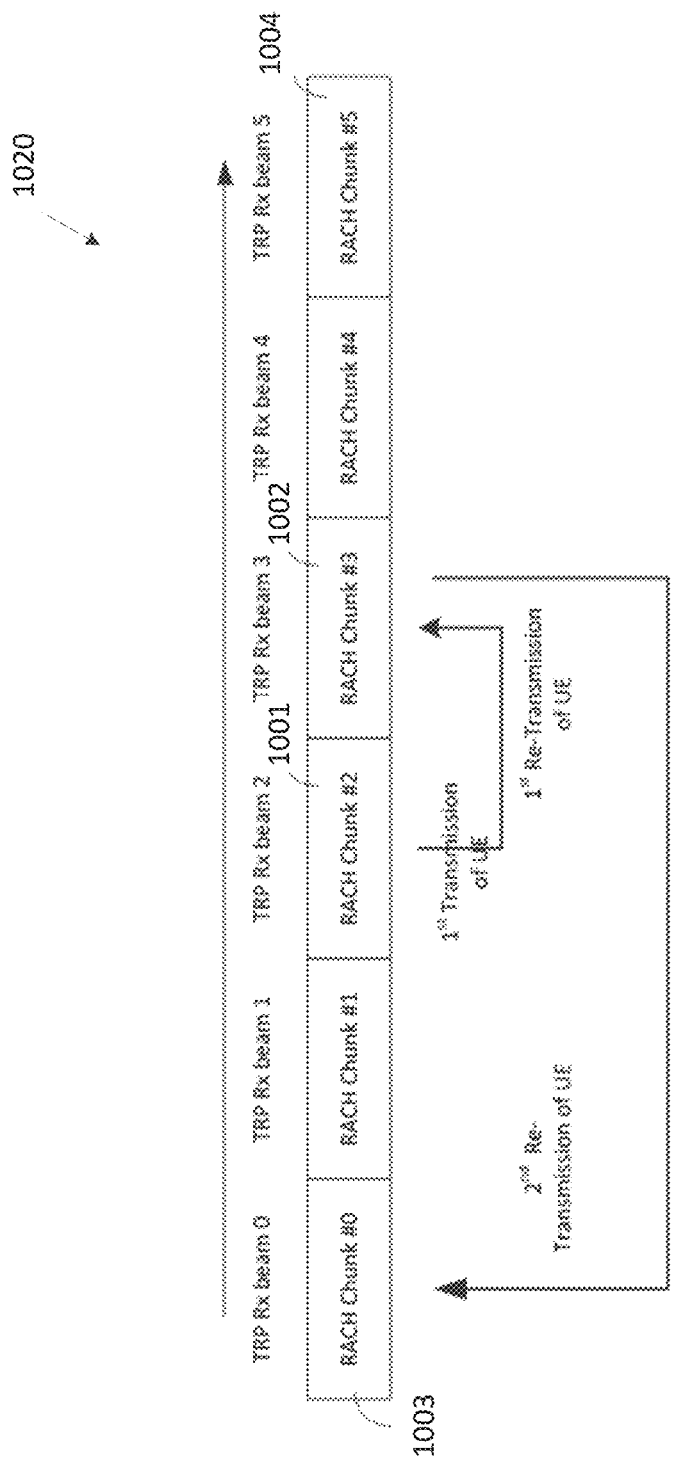
FIG. 10B illustrates another example RACH chunk according to embodiments of the present disclosure.

FIG. 10B illustrates another example RACH chunk 1020 according to embodiments of the present disclosure. An embodiment of the RACH chunk 1020 shown in FIG. 10B is for illustration only. One or more of the components illustrated in FIG. 10B can be implemented in specialized circuitry configured to perform the noted functions or one or more of the components can be implemented by one or more processors executing instructions to perform the noted functions. Other embodiments are used without departing from the scope of the present disclosure.

In some embodiments, the index of RACH chunk for first preamble retransmission is $(q_0+1)$ (mod Q) and the index of RACH chunk for second preamble retransmission is $(q_0-2)$ (mod Q). The index of RACH chunk for n-th preamble retransmission is $(q_0-(-1)^n \times n)$ (mod Q), for n=1, 2, . . . . An example for this method is shown in FIG. 10B. As illustrated in FIG. 10B, there are Q=6 RACH chunks. The UE selects RACH chunk #2 1001 for the initial preamble transmission. Then the index of RACH chunk for first retransmission is (2+1) (mod 6)=3, that is RACH chunk#2 1001. The index of RACH chunk for second retransmission is (2−2) (mod 6)=0, which is RACH chunk #0, 1003.

In one embodiment, the index of RACH chunk for first preamble retransmission is $(q_0-1)$ (mod Q) and the index of RACH chunk for second preamble retransmission is $(q_0+2)$ (mod Q). The index of RACH chunk for n-th preamble retransmission is $(q_0+(-1)^n \times n)$ (mod Q), for n=1, 2, . . . .

In some embodiments, the indices of RACH chunk for the first transmission and retransmissions ($\{q_0, q_1, q_2, \ldots\}$) are generated from pseudo-random sequence. The pseudo-random sequence is generated based on initialization with UE's ID or the Tx beam ID of which the UE measures the strongest RSRP of SS and/or BRS.

In some embodiments, the indices of RACH chunk for the retransmission is $\{q_0+\Delta_0, q_0+\Delta_1, q_0+\Delta_2, \ldots\}$, where $q_0$ is the RACH chunk index the UE selects for the initial transmission of preamble and $\{\Delta_0, \Delta_1, \Delta_2 \ldots\}$ are the offset the UE used to calculate the RACH chunk index for first, second, third, . . . , preamble retransmission. The $\{\Delta_0, \Delta_1, \Delta_2, \ldots\}$ is generated from pseudo-random sequence. The pseudo-random sequence is generated based on initialization with UE's ID or the Tx beam ID of which the UE measures the strongest RSRP of SS and/or BRS.

In some embodiments, a UE is configured with a method of transmitting RAR. The method of transmitting RAR can be configured through RACH configuration index.

Figure 11:
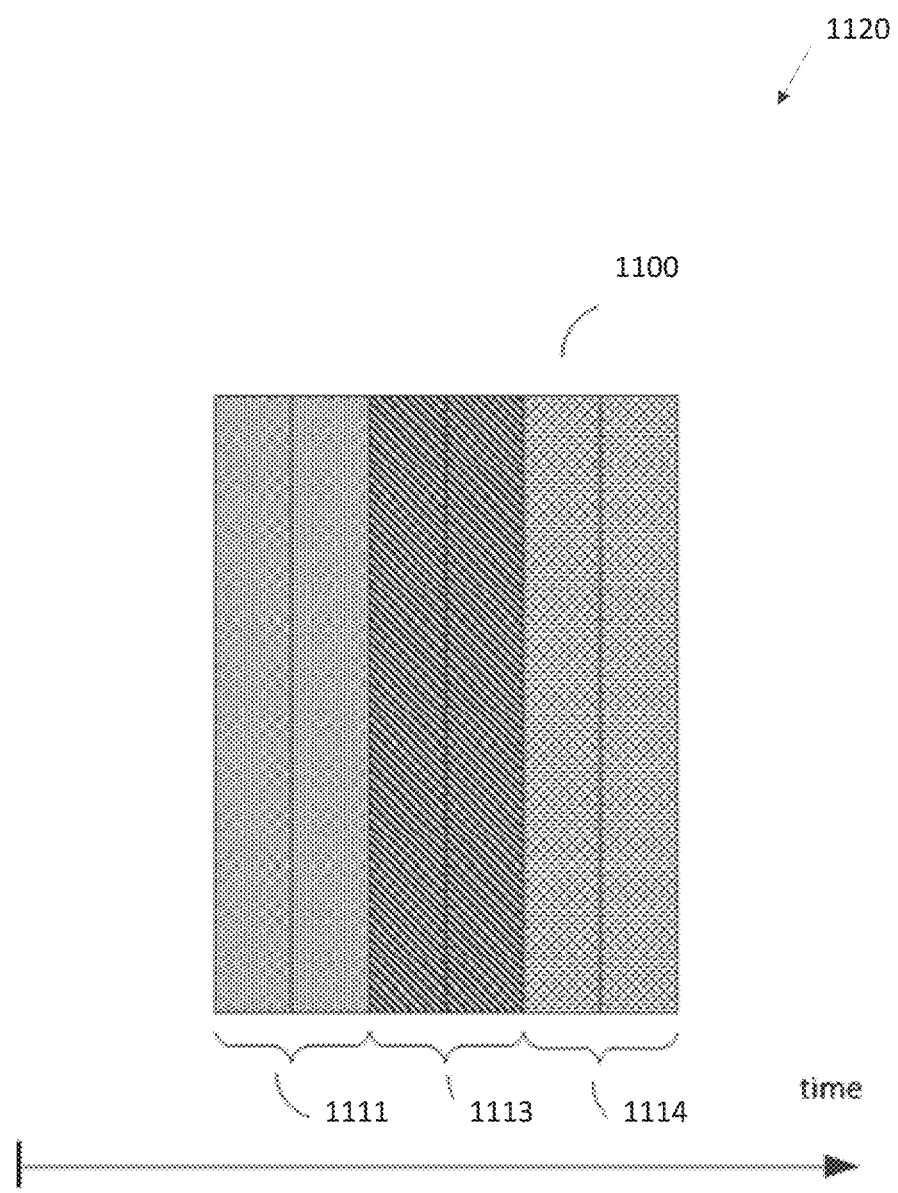
FIG. 11 illustrates an example RAR occasion according to embodiments of the present disclosure.

FIG. 11 illustrates an example RAR occasion 1120 according to embodiments of the present disclosure. An embodiment of the RAR occasion 1120 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

In some embodiments, the random access response (RAR) is sent through a Tx beam sweeping methods. In each RAR occasion, there are S×H OFDM symbols and each S contiguous OFDM symbols is one RAR chance. One or more RAR could be transmitted within one RAR chance. The gNB utilizes same Tx beam on each RAR chance and sweeps the Tx beams over multiple RAR chance. An example of RAR occasion is shown in FIG. 11.

As illustrated in FIG. 11, one RAR occasion 1100 contains three RAR chances 1111, 1112, and 1113. Each RAR chance is comprised of two contiguous OFDM symbols. The gNB utilizes same Tx beam on two OFDM symbols within on RAR chance and sweeps the Tx beams over RACH chances 1111, 1112, and 1113.

In some embodiments, the RAR occasion is transmitted periodically with periodicity $T_{RAR}$. In some embodiments, a UE is configured with one or more of the following about RAR occasion transmission by the system information channel: the periodicity $T_{RAR}$ in terms of, for example, subframes, ms. The indices of subframes or time interval wherein RAR occasion may occur; number of OFDM symbols per RAR chance; number of RAR chances per RAR occasion; and the indices of OFDM symbols used for RAR, in the subframe or time interval where the RAR occasion is transmitted.

In some embodiments, the UE is configured of the information of RAR configuration through a RAR configuration index. The UE is configured to calculate the RAR configuration based on the value of RAR configuration index.

TABLE 3

| RAR configuration | | | | |
|---|---|---|---|---|
| RAR configuration index | Indices of subframes wherein RAR is mapped | OFDM symbol indices used for RAR | Number of RAR chances | Number of OFDM symbol in one RAR chance |
| 0 | Subset 0 of subframes | $k_0$ | $H_0$ | $S_0$ |
| 1 | Subset 1 of subframe | $k_1$ | $H_1$ | $S_1$ |

In some embodiments, the UE is configured to receive the UE-specific configuration of reference signal for the beam measurement in RACH msg4. The reference signal can be called CSI-RS, BRS (beam RS), MRS (measurement/mobility RS). The term BRS may be used for the reference signal, which does not exclude that the reference signal could be called by other terms.

The UE-specific configuration of BRS for the beam measurement transmitted in RACH msg4 includes one or more of the followings. In one example, the UE-specific configuration comprises number of OFDM symbols and number of antenna ports in the BRS. In such example, the number of OFDM symbols to map the BRS is explicitly indicated in the configuration. The number of antenna port is explicitly indicated in the configuration. In one instance, a 2-bit field is used to indicate the number of OFDM symbols. Four values of the 2-bit field indicate four different values of the number of OFDM symbols. In one instance, a 2-bit field is used to indicate the number of antenna ports. Four values of the 2-bit field indicate four different values of the number of antenna ports.

In another example, the UE-specific configuration comprises the beam ID configuration. In such example, the allocation of beam IDs to the OFDM symbols and/or antenna ports of the BRS are configured here. In one example, one beam ID is allocated to per antenna port per OFDM symbol. In one instance, one beam ID is allocated per OFDM symbol.

In yet another example, the UE-specific configuration comprises the beam grouping configuration for constrained measurement. In such example, the gNB configures the beam IDs into $N_g$ beam groups and the UE is configured to make a constrained measurement on the beams. In such example, the beam grouping is configured through OFDM symbol index. In one instance, the beam grouping is configured through BRS antenna port index. In one instance, the beam grouping is configured through OFDM symbol index and antenna port index.

In yet another example, the UE-specific configuration comprises beam cluster configuration. In such example, the gNB could configure $N_c$ beam clusters and the UE is configured to measure beam-cluster-specific RSRP. In one instance, the beam cluster configuration is in terms of reference signal OFDM symbol index. In one instance, the beam cluster configuration is in terms of antenna ports. In one example, the beam cluster configuration is in terms of BRS resource.

In yet another example, the UE-specific configuration comprises an RSRP calculation method. In such example, the UE is configured to measure beam-specific RSRP and cell-specific RSRP. In one instance, a 2-bit is used to indicate which RSRP(s) may be measured by the UE. In one instance, a 2-bit is used to indicate the method of calculating the cell-specific RSRP.

In some embodiments, procedure of the initial random access procedure is as following. In step 1, the UE receives the RACH configuration from the system information channel. In step 2, based on the preamble type configuration in RACH configuration, the UE selects one preamble sequence: if preamble type is 0, the UE selects the preamble sequence without conveying Tx beam ID; and if preamble type is 1, the UE is configured to obtain the configuration information of mapping Tx beam ID to preamble sequence ID and then select one preamble sequence ID based on this configuration and the Tx beam ID that corresponding to the strongest RSRP of downlink SS and/or BRS signal.

In step 3, the UE selects one RACH chunk based on the RACH configuration. One example is that RACH configuration defines a mapping between RACH chunk and downlink OFDM symbols wherein the SS/PBCH/BRS are mapped, and the UE selects RACH chunk corresponding to the downlink OFDM symbol where the UE measures the strongest RSRP of SS and/or BRS.

In step 4, the UE transmits the preamble sequence on the selected RACH chunk. Based on the RACH configuration, the UE could do Tx beam sweeping on the RACH symbols in the selected RACH chunk.

In step 5, if the preamble transmission is failed, the UE select the RACH chunk for the retransmission based on the RACH configuration as follows. The UE re-transmit the preamble sequence on the selected RACH chunk with Tx power being increased with a configured step-size. In one example, if the mode of switch RACH chunk is to use the same RACH chunk, the UE use the same RACH chunk and increase the Tx power to retransmit the preamble sequence. In another example, if the mode of switching RACH chunk is to calculate next RACH chunk index based on previous RACH chunk index, the UE calculates the RACH chunk index based on the configured calculation method and previous RACH chunk index. In yet another example, if the mode of switching RACH chunk is pseudo-random sequence, the UE generates pseudo-random sequence as configured and then calculate the RACH chunk index for preamble retransmission.

In step 6, the UE is configured to detect the RAR based on the RACH configuration. In one example, if the RAR type is 0, i.e., RAR is sent in PDSCH indicated by a DCI with RA-RNTI, the UE is configured to detect DCI with RA-RNTI and then decode the scheduled PDSCH. In another example, if the RAR type is 1, i.e. RAR is sent by Tx beam sweeping, the UE is configured to obtain the RAR Tx beam sweeping configuration from the system information channel and then the UE is configured to decode the RAR from each RAR chance.

In step 7, the UE is configured to transmit msg3 according to the scheduling information delivered in RAR. In one example, if the UE is configured to include a Tx beam ID in msg3, the UE include a Tx beam ID with the best RSRP in msg3.

In step 8, the UE is configured to receive the msg4.

In some embodiments, the present disclosure describes cellular DL communications. However, the same/similar principles and related signaling methods and configurations can also be used for cellular UL and sidelink (SL) communications.

The initial access signals are the first signals to be detected by the UE. The initial access signals are supposed to be received by all UEs. When transmitting initial access signals, there does not exist any beam alignment between the TRP and the UE. So the initial access signals are transmitted through multiple Tx beams and one method is that those Tx beams sweep over multiple OFDM symbols. The TRP beams used for initial access signals are generally wide beam and their number are not large in order to reduce the overhead. From the detection of initial access signals, the UE could obtain the best TRP Tx beam. However, there is no uplink transmission chance so the UE is not able to report the Tx beam ID to the TRP. During the RACH procedure, the TRP and the UE could build a coarse beam alignment over the beams used for initial access signals. The beams of coarse beam alignment can be used by the TRP to transmit unicast transmission to the UE, for example to deliver the system information SIBs.

The following DL L1/L2 beam management procedures are supported within one or multiple TRPs. In one example of P-1, a UE is enabled to perform measurement on different TRP Tx beams to support selection of TRP Tx beams/UE Rx beam(s). In such example, for beamforming at TRP, it typically includes an intra/inter-TRP Tx beam sweep from a set of different beams. In such example, for beamforming at UE, it typically includes a UE Rx beam sweep from a set of different beams. In such example, TRP Tx beam and UE Rx beam can be determined jointly or sequentially.

In another example of P-2, a UE is enabled to perform measurement on different TRP Tx beams to possibly change inter/intra-TRP Tx beam(s) from a possibly smaller set of beams for beam refinement than in P-1. Specifically, the P-2 can be a special case of P-1.

In another example of P-3, a UE is enabled to perform measurement on the same TRP Tx beam to change UE Rx beam in the case UE uses beamforming. In such example, the same procedure design can be considered for intra-TRP and inter-TRP beam management. In one instance, the UE may not know whether the TRP is an intra-TRP or an inter TRP beam.

In the aforementioned examples, the P-2 and P-3 can be performed jointly and/or multiple times to achieve e.g. TRP Tx/UE Rx beam change simultaneously. In the aforementioned examples, procedures of the P-3 may or may not have physical layer procedure impact. In the aforementioned example, managing multiple Tx/Rx beam pairs for a UE is supported. In the aforementioned example, assistance information from another carrier can be considered in beam management procedures. In the aforementioned examples, any frequency band may be applied. In the aforementioned examples, single and/or multiple beam(s) per TRP can be considered. In the aforementioned example, multi/single beam based initial access and mobility may be treated within a separate RAN1 agenda item The first beam management procedure for RRC connected UE may be procedure P-1 as illustrated above. Cell-specific and periodic configuration of beam management procedure P-1 can be beneficial for attaining fast initial fine beam alignment. This is because beam-width difference between the coarse and fine beams is expected to be large. Fine beam alignment of narrow beams is achieved in P-1. The earlier the TRP configures the P-1 procedure, the earlier that the TRP and the UE can build a fine beam alignment.

After the beam management procedure P-1, the TRP can configure beam management procedure P-2 and P-3. P-2 and P-3 can be configured jointly. In P-2, the UE could do beam refinement on small number of TRP Tx beams and in P-3, the UE could do Rx beam sweeping to select the best Rx beam. The procedure P-2 and P-3 may be UE-specific and aperiodic.

Figure 12:
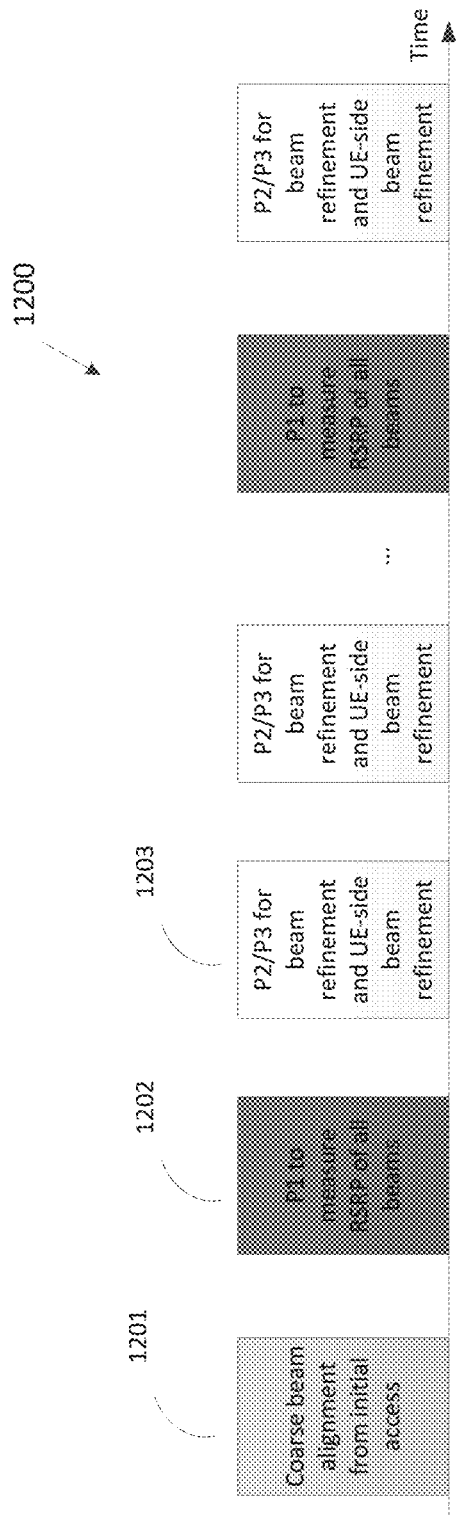
FIG. 12 illustrates an example beam alignment procedure according to embodiments of the present disclosure.

FIG. 12 illustrates an example beam alignment procedure 1200 according to embodiments of the present disclosure. An embodiment of the beam alignment procedure 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

A high level procedure of general beam alignment procedure starting from initial access is shown in FIG. 12. As shown in FIG. 12, the UE first obtains coarse beam alignment during the initial access procedure in 1201. The coarse beam alignment can be used to send system information and the configuration of beam management procedure P-1 1202. During beam management procedure P-1, the UE measures the RSRP of all beams of one cell and reports the best N beam IDs. The TRP and the UE can achieve a fine beam alignment. The P-1 is cell-specific and periodic. Between P-1 procedures, the TRP could configure UE-specific P-2/P-3 procedure to allow the UE to do TRP beam refinement and UE Rx beam training in 1203.

As previously explained, for scenarios such as above-6 GHz deployments with a large number of (fine) beams per cell, cell-specific and periodic configuration of beam management procedure P-1 can be beneficial. In such configuration, one solution to configure the P-1 is to use the PBCH or SIBs during the initial access. This is the earliest place where the TRP can configure the beam management procedure P-1. The benefit of this method is that the beam reference signal used in procedure P-1 can also be used by the IDEL UEs to do RRM measurement for cell selection/reselection. Another solution to configure the P-1 is using the RACH message (RAR or msg4 in RACH procedure). The benefit of the first two methods is that the fine beam alignment could be achieved immediately after the RACH procedure. Another method is to send the configuration of P-1 in PDSCH after RACH procedure. In such method, the PDSCH transmission may use the beam(s) of coarse beam alignment which is achieved during the initial access.

For the scenarios described above, beam reference signal (BRS) may be used in procedure P-1. The beam reference signal is cell-specific and the transmission is periodic. The beam reference signal conveys all the TRP Tx beams and may support very large number of TRP Tx beam IDs. The configuration of beam reference signal is cell-specific.

The UE may measure the beam-specific RSRP of all the beams conveyed in the beam reference signals. If the UE has Rx beam sweeping capability, the UE could apply different Rx beams on different transmission occasions of beam reference signal to measure the RSRP of different combination of TRP beams and UE beams. The UE reports the information of best N TRP beam IDs with the strongest beam-specific RSRP. The information the UE reports could be: N pairs of {TRP Tx beam ID, beam-specific RSRP}; or N sets of {TRP Tx beam ID, UE Rx beam ID, beam-specific RSRP}.

In one embodiment, the beam management procedure could be configured in cell-specific way. The cell specific configuration could be sent by one of the following alternatives. In one example, the cell specific configuration is delivered though the initial synchronization signals, like nrPSS, nrSSS. In another example, the cell specific configuration is delivered through the physical cell ID. In yet another example, in system information message such as PBCH and SIB, the cell specific configuration is transmitted during initial access procedure.

In yet another example of the random access response, RAR, the RAR could be sent through Tx beam sweeping and broadcast. The RAR could be sent in unicast PDSCH that is scheduled by special DCI for RAR. In multi-beam based system, the Tx beam used for RAR could be coarse beam alignment built during initial access procedure.

In yet another example of the msg4 of random access, the cell specific configuration is transmitted by the contention resolution message.

In one embodiment, the UE could report one TRP Tx beam ID based on the measurement of beam management procedure P-1 by one of the following alternatives. In one example, the UE could report on TRP Tx beam ID through the random access preamble ID. In the configuration of P-1, the preamble IDs are divided into K subset and each subset corresponds to one TRP Tx beam ID. The UE first measure the beam-specific RSRP based on the configuration and obtain the Tx beam ID with the strongest beam-specific RSRP. Then the UE calculates the preamble ID based on the Tx beam ID and transmit the selected the preamble sequence. In another example, the UE utilizes the RACH msg3 to report one TRP Tx beam ID selected through the beam management procedure P-1. In yet another example, the UE a PUSCH or PUCCH to report one or more TRP Tx beam IDs selected through the beam management procedure P-1.

In one embodiment, the beam management procedure could be configured in UE-specific way. The TRP could configure the UE to measure all the TRP Tx beams carried in the BRS. The TRP could configure the UE to measure a subset of all the TRP Tx beams. The information Tx beam subset in sent in UE-specific configuration. In one example, the information of Tx beam subset could be a list of OFDM symbol index within the BRS transmission occasion{$l_1$, $l_2$, . . . }. The UE is configured to measure all the Tx beam ID carried on the listed OFDM indices.

In another example, the information of Tx beam subset could be a bitmap to indicate the OFDM symbol index within the BRS transmission occasion $[b_1b_2b_3 \ldots b_N]$. Each bit in the bitmap corresponds to one OFDM symbol in the BRS transmission occasion. For example the value of one bit being 1 indicates the UE is configured to measure all the Tx beam IDs carried on this OFDM while the value of one bit being 0 indicates the UE is configured to not measure the Tx beam IDs carried on this OFDM symbol. The UE is configured to calculate the OFDM symbol indices based on the bitmap in the UE-specific configuration and then measure the Tx beam IDs carried on those OFDM symbols.

In yet another example, In another example, the information of Tx beam subset could be one OFDM symbol index $k_0$. The UE is configured to the measure the Tx beam IDs carried by the OFDM symbols starting from the first OFDM symbol to OFDM symbol $k_0$. The UE is configured to the measure the Tx beam IDs carried by the OFDM symbols starting OFDM symbol $k_0$ to the last OFDM symbol in the BRS transmission occasion.

In yet another example, the information of Tx beam subset could be two OFDM symbol index $k_1$ and $k_2$ to define the OFDM symbol range. The UE is configured to measure the Tx beam IDs carried by OFDM symbols starting from $k_1$ to $k_2$.

In yet another example, the information of Tx beam subset could be a list of port indices within the BRS transmission occasion $\{p, p_2, \ldots\}$. The UE is configured to measure all the Tx beam ID carried on the listed port indices on all the OFDM symbols of BRS.

In yet another example, the information of Tx beam subset could be a bitmap to indicate the port index within the BRS transmission occasion $[c_1c_2c_3 \ldots c_N]$. Each bit in the bitmap corresponds to one port index in the BRS transmission occasion. For example the value of one bit being 1 indicates the UE is configured to measure all the Tx beam IDs carried on this port on all OFDM symbols of BRS while the value of one bit being 0 indicates the UE is configured to not measure the Tx beam IDs carried on this port index. The UE is configured to calculate the port indices based on the bitmap in the UE-specific configuration and then measure the Tx beam IDs carried on those ports.

In yet another example, the information of Tx beam subset could be one port index $p_0$. The UE is configured to the measure the Tx beam IDs carried by the ports starting from the first port to port $p_0$ on all the OFDM symbols of BRS. The UE is configured to the measure the Tx beam IDs carried by the ports starting port $p_0$ to the last port on all OFDM symbols in the BRS transmission occasion.

In yet another example, the information of Tx beam subset could be two port index $p_1$ and $p_2$ to define the port range. The UE is configured to measure the Tx beam IDs carried by ports starting from $p_1$ to $p_2$ on all OFDM symbols in BRS transmission occasion.

In yet another example, the information of Tx beam subset could be signaling the information of both OFDM indices and port indices by using the combination of the above methods. The UE is configured to measure the Tx beam IDs carried by the port indices and OFDM symbol indices.

The beam management procedure P-2 and P-3 may be UE-specific and aperiodic. The P-2 and P-3 could be configured jointly or separately. A separate reference signal is defined for procedure P-2 and P-3. The reference signal is UE-specific and the transmission is aperiodic. The MAC-CE or L1 control message are used to trigger the transmission of reference signal and also to trigger the UE to report the information of the best TRP beam, including, for example, the TRP beam ID, beam-specific RSRP and/or the UE Rx beam ID. The reference signal used for P-2 and P-3 could be a second beam reference signal (BRS), or CSI-RS.

The TRP sends the configuration of second BRS to the UE through RRC message. The configuration could be a single second BRS transmission occasion, or time-limited periodic transmission (P>=1 periodic second BRS transmission occasion). The configuration of P-2/P-3 and the reference signal may consider the UE side beamforming capability and the number of beams used by the UE.

For scenarios such as above-6 GHz deployments with a large number of (fine) beams per cell, cell-specific and periodic configuration of beam management procedure P-1 can be beneficial for attaining fast initial fine beam alignment (procedure P-1 as illustrated above). Denoting the RS used for this purpose and scenarios as beam reference signal (BRS), the BRS is proposed to be cell-specific. This BRS may be supported with the following design principles.

In one example, all the TRP Tx beams may be conveyed in the BRS. The number of TRP Tx beams could be very large. So the BRS may be able to support large number of TRP Tx beam IDs. The maximum number of Tx beams is FFS.

In another example, the number of TRP Tx beam IDs conveyed in BRS is cell-specific. Different cells could use different number of beams in the BRS.

In yet another example, to reduce the overhead of BRS conveying potentially large number of beam IDs, consider to use both orthogonal and non-orthogonal mapping of Tx beam IDs to resource elements for BRS. Consider to use TDM, FDM and scrambling sequence ID to multiplex different beam IDs.

In yet another example, the restriction of hybrid beamforming and analog beams may be considered. The beams composed from different analog beams from the same antenna panel cannot be mapped to the same OFDM symbol.

In yet another example, the BRS may be mapped into the same OFDM symbols where the initial access signals are mapped. The hybrid beamforming and analog beams have restriction that analog beams are applied in time domain. The unused resource element of the OFDM symbols where initial access signals are mapped using Tx beam sweeping are generally not useable for normal PDSCH transmission. Using those unused resource elements to transmit the BRS can utilize those OFDM symbols more efficiently.

In yet another example, the reference signal mapping for each beam ID may be wideband so that the RSRP for each beam is wideband.

The configuration of BRS is cell-specific. The configuration of BRS could be send during the initial access, for example, in PBCH or SIBs. The configuration of BRS could be also send in some RACH message. The configuration of BRS can also be sent in system information message. The benefit of configure the BRS at earlier stage is that the TRP and the UE can achieve fine beam alignment earlier. The configuration of P-1 is cell-specific.

The configuration of first BRS may include one or more of the followings: the subframe indices where first BRS is transmitted; the number of OFDM symbols, the number of BRS port on one OFDM symbol and the total number of TRP Tx beam IDs; and the mapping between beam IDs and the BRS port/OFDM symbol index/scrambling sequence ID.

The configuration of P-1 and first BRS could be signaled by one of the following alternatives. In one example of Alt. 1, the configuration of the first BRS is sent in PBCH. This is the earliest place where the configuration of P-1 can be sent. The benefit of this example is that the first BRS could also be used by IDLE UE to do RRM measurement. The disadvantage of this example is that the payload in PBCH is very limited.

In another example of Alt. 2, the configuration of P-1 and first BRS are sent in SIBx which is sent before RACH procedure. The UE can be configured to report the ID of best beam in the msg1 transmission, i.e., through the preamble ID. This is the earliest place when the gNB and the UE can build a fine beam alignment for beam procedure P-1. The UE can also be configured to report the ID of the best beam in RACH msg3, i.e., the first uplink transmission.

In yet another example of Alt. 3, the configuration of P-1 and first BRS are sent in RAR. The UE could report the beam ID of best beam in RACH msg3.

In yet another example Alt. 4, the configuration of P-1 and the first BRS are sent in RACH msg4. The UE may be configured to report the beam IDs in some PUSCH or PUCCH triggered by L1/L2 message. After the RACH msg4, all the transmission may be based on the coarse beam alignment.

In yet another example of Alt. 5, the configuration of P-1 and the first BRS are sent in RRC message after RACH procedure by using the beam of coarse beam alignment obtained during initial access. In such example, the configuration of P-1 and first BRS are sent in PDSCH by using beam(s) of coarse beam alignment. The UE could report Tx beam ID(s) in PUSCH or PUCCH, also by using beams(s) of coarse beam alignment.

The UE may measure the RSRP of each beams contained in first BRS. If the UE has Rx beam sweeping capability, the UE could apply different Rx beams on different transmission of first BRS occasion and the best TRP beams is selected based on the RSRP of all pair {TRP beam, UE Rx beam}, which is up to UE's implementation. Besides TRP beam ID and RSRP, the UE could also report the Rx beam ID. For example, the UE reports the best N pair of {TRP beam ID, UE Rx beam ID, RSRP} with the strongest RSRP.

A second BRS (which may alternatively referred to be CSI-RS) is used in beam management procedure P-2/P3. The configuration of second BRS is UE-specific and the transmission of second BRS is UE-specific and aperiodic. The configuration of P-2/P3 and second BRS could be sent after UE has measured and reported the beam ID based on first BRS.

The gNB sends the configuration of second BRS to the UE through RRC message. The configuration could be a single second BRS transmission occasion, or time-limited periodic transmission (P>=1 periodic second BRS transmission occasion). The configuration includes the information of number of ports multiplexed by FDM, mapping of ports to the frequency domain resource, number of time-domain repetitions and the repetition mode. The configuration could also include the UL resource allocation for reporting the beam measurement results. The gNB could send multiple configurations to the UE. For example, one configuration has multiple ports in frequency domain but no time repetitions and this configuration is for the procedure P-2. One configuration has one port in frequency time and multiple time repetition and this configuration is for the procedure P-3.

The gNB could use L1/L2 control message to schedule a particular second BRS transmission for one configuration to the UE. The UE is configured to measure the RSRP of each pair of (port index, UE Rx beam). The UE reports the (best RSRP with respect to all UE Rx beams, port index) of the best Q>=1 port(s). The UE could include the corresponding Rx beam ID in the report.

A second BRS is designed for the beam procedure P-2 and P-3. The reference signal may be UE-specific and the transmission is aperiodic. The reference signal may be supported with the following design principles. In one example, the reference signal is used by both beam management procedure P-2 and P3. In another example, the reference signal supports the functionality that the UE is able to measure the beam-specific RSRP of small number of TRP Tx beam IDs. In yet another example, the number of TRP Tx beam IDs conveyed in reference signal may be UE-specific. In yet another example, the reference signal supports the functionality that the UE is able to measure beam-specific RSRP for one or multiple different UE Rx beams. One design method is the signal for one TRP Tx beam has multiple time repetitions to allow the UE to do Rx beam sweeping. In yet another example, the capability of allowing UE Rx beam sweeping may be UE-specific. The configuration may consider the beamforming capability of the UE. If the UE does not have beam sweeping capability, the TRP would configure the reference signal without time repetitions. The TRP could also configure the reference signal based on the number of Rx beams the UE can support. In yet another example, the reference signal mapping for each Tx beam ID may be wideband.

Figure 13A:
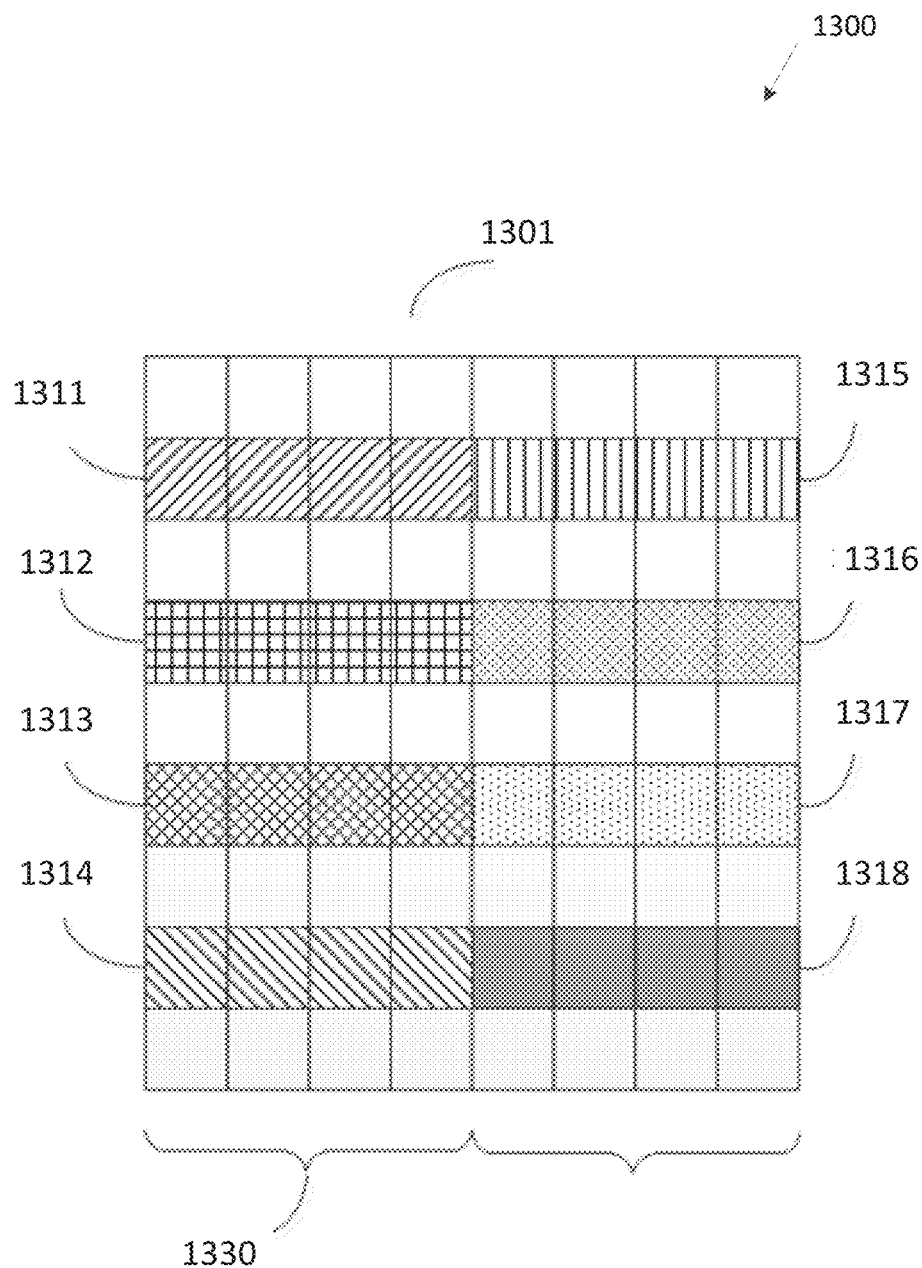
FIG. 13A illustrates an example BRS configuration according to embodiments of the present disclosure.

FIG. 13A illustrates an example BRS configuration 1300 according to embodiments of the present disclosure. An embodiment of the BRS configuration 1300 shown in FIG. 13A is for illustration only. One or more of the components illustrated in FIG. 13A can be implemented in specialized circuitry configured to perform the noted functions or one or more of the components can be implemented by one or more processors executing instructions to perform the noted functions. Other embodiments are used without departing from the scope of the present disclosure.

An example of a second BRS for P-2 and P-3 is illustrated in FIG. 13A. As shown in FIG. 13A, the second BRS has 8 ports 1311~1318 where the TRP can deliver 8 Tx beams and each of the port resource are repeated four time so the UE could sweep with 4 Rx beams. The resource of each port is repeated 4 times contiguously 1330.

Figure 13B:
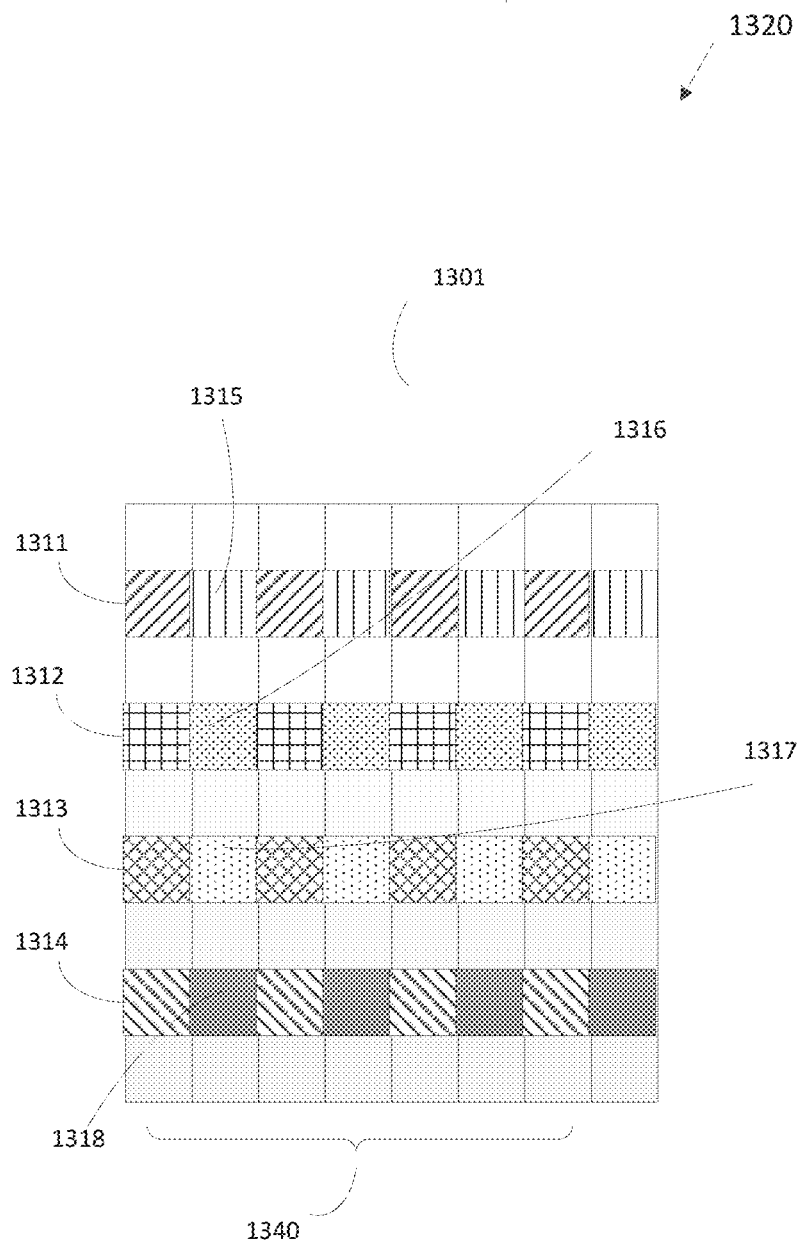
FIG. 13B illustrates another example BRS configuration according to embodiments of the present disclosure.

FIG. 13B illustrates another example BRS configuration 1320 according to embodiments of the present disclosure. An embodiment of the BRS configuration 1320 shown in FIG. 13B is for illustration only. One or more of the components illustrated in FIG. 13B can be implemented in specialized circuitry configured to perform the noted functions or one or more of the components can be implemented by one or more processors executing instructions to perform the noted functions. Other embodiments are used without departing from the scope of the present disclosure.

An example of a second BRS for P-2 and P-3 is illustrated in FIG. 13B. As shown in FIG. 13B, the second BRS has 8 ports 1311~1318 where the TRP can deliver 8 Tx beams and each of the port resource are repeated four time so the UE could sweep with 4 Rx beams. The resource of each port is repeated 4 times in a scattered way 1340.

The configuration of second BRS is UE-specific and one or more than one of the following information may be signaled in the configuration: number of ports or resource on OFDM symbol; number of time repetitions; and the method of repetition.

Based on the measurement report from the UE, the gNB could choose the proper TRP Tx beam ID for the UE. Whether the gNB needs to notify the UE of the selected TRP beam could depend on if the UE use a fixed Rx beam or not. If the UE uses a fixed Rx beam, the gNB does not need to notify the selected TRP Tx beam ID to the UE. However, if the UE has capability of hybrid beamforming, the gNB would need to notify the selected TRP Tx beam ID to the UE so that the UE is able to use the proper Rx beam. The capability of hybrid beamforming of UE can be reported as part of the UE capability so that the gNB can determine whether to notify the TRP beam ID to the UE or not.

There are a few methods to signal the TRP beam ID to one UE. One method is L1 signal, e.g., DCI. Another method is L2 message, MAC-CE. If using DCI to notify the beam ID, the configuration of beam ID to one UE could be semi-static or dynamic. In semi-static method, a beam ID signaled by one DCI may be used until a new beam ID is signaled by DCI. In dynamic method, each DCI scheduling a PDSCH would convey the beam ID used for this PDSCH. The beam ID used for PDCCH and PDSCH to the same UE could be same or different. The beam ID used for PDCCH could be signaled in MAC-CE or DCI through a semi-static method. The beam ID used by PDSCH could be signaled in DCI scheduling the PDSCH dynamically.

Instead of signaling the TRP beam ID to the UE, another option is to signal a UE beam ID. The gNB could choose to signal the UE of a UE beam ID and the UE could use this Rx beam to receive the PDSCH transmission.

The multi-beam approach utilizes multiple narrower beams each of which covers a part of the coverage area. As a single narrow-beam is not able to cover the whole service area, beam sweeping needs to be supported for initial access signals transmission. This operation may be especially useful for coverage limited cases such as 30 GHz case. As it takes longer time to acquire initial access signals from multi-beam swept symbols compared to the single-beam based system, overhead-efficient mapping design is required. In this sense, initial access signals mapping in consecutive OFDM symbols needs to be supported, as it enables fast connection establishment (i.e., fast SSs/SI acquisition and fast RA process) for non-connected UEs who is in IDLE DRX or cell-selection status. For non-connected UEs, it may be also guaranteed that the mapping of SSs and PBCH is cell-specific and periodic.

Figure 14:
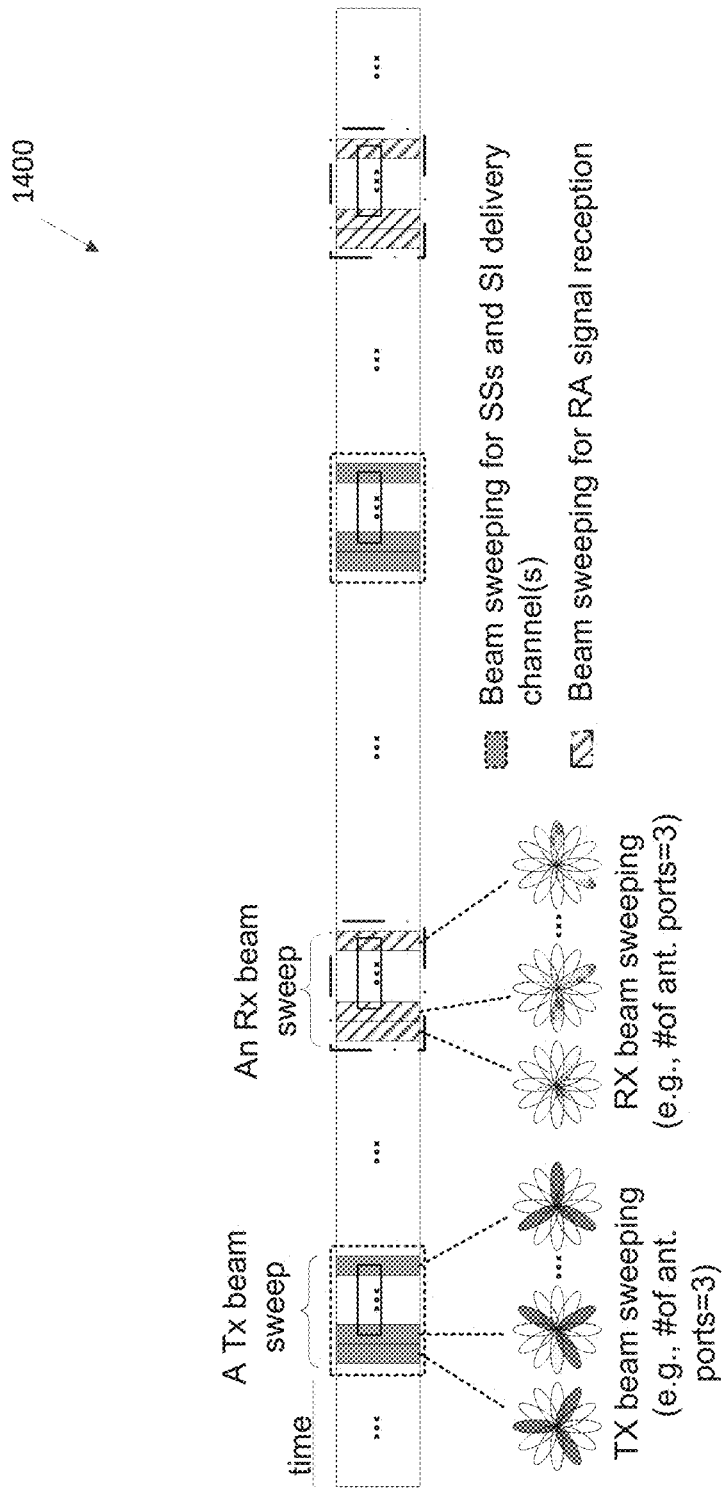
FIG. 14 illustrates an example consecutive mapping of initial access signals according to embodiments of the present disclosure.

FIG. 14 illustrates an example consecutive mapping of initial access signals 1400 according to embodiments of the present disclosure. An embodiment of the consecutive mapping of initial access signals 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

FIG. 14 shows an example of consecutive beam sweeping symbol mapping of multi-beam based system.

Figure 15:
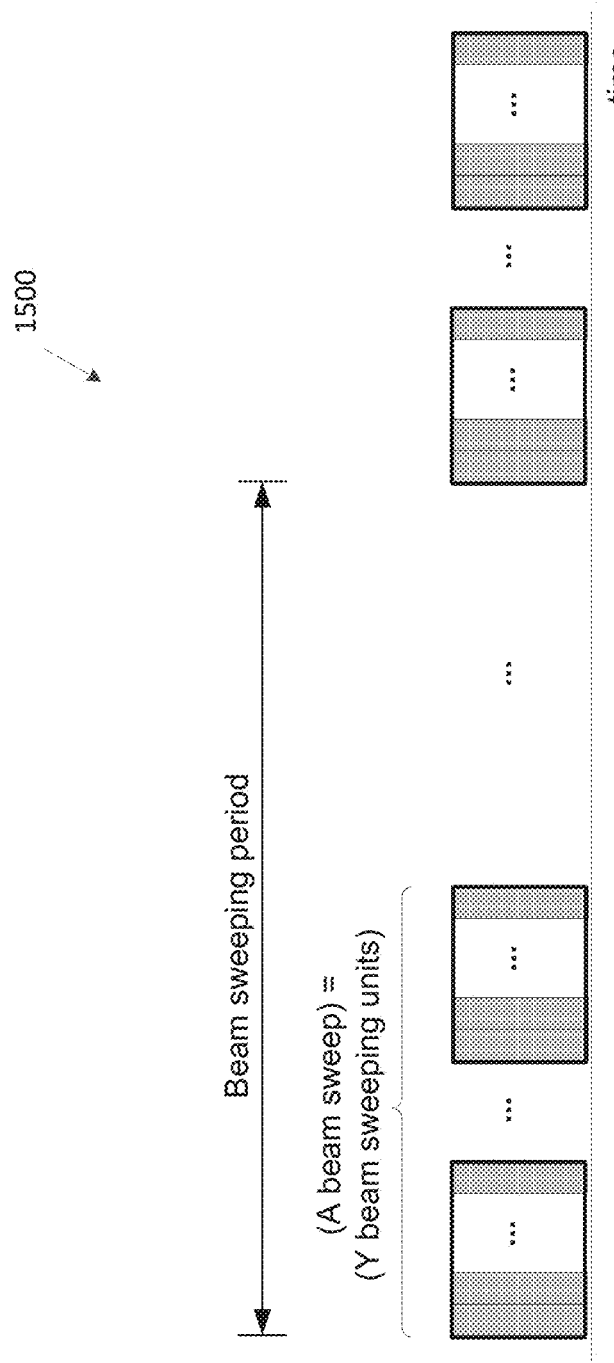
FIG. 15 illustrates an example beam sweeping according to embodiments of the present disclosure.

FIG. 15 illustrates an example beam sweeping 1500 according to embodiments of the present disclosure. An embodiment of the beam sweeping 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

FIG. 15 illustrates implementation of beam sweeping according to some embodiments of the present disclosure. A beam sweep comprises multiple (Y) beam sweeping units, and a beam sweeping unit comprises multiple (X) OFDM symbols. For initial access signals, a beam sweeping unit, which means a unit of time interval used for a beam sweep, is proposed to be defined. For flexible deployments, it is desirable that NR supports network options to map one or multiple beam sweeping units for a beam sweep. Alternative definitions of the beam sweeping unit are listed and compared below. In one example of Alt 1, an integer multiple of the number of OFDM symbols in a subframe/slot, for example, 1 subframe or slot or mini-slot, or 2 subframes or slots or mini-slots. This example provides simpler scheduling with less signaling overhead.

In another example of Alt 2, a number of OFDM symbols being less than or equal to the number of OFDM symbols in a subframe/slot, for example: L OFDM symbols; a number of sweeping OFDM symbols may be more flexibly selected by the network; and a number of OFDM symbols needs to be indicated for data channel rate matching.

In such examples, total number of sweeping OFDM symbols for a beam sweep is equal to an integer multiple of the number of OFDM symbols in a beam sweeping unit. In one example, A beam sweeping unit is one slot (or subframe or mini-slot) comprising X OFDM symbols; in another example, a beam sweeping unit is X OFDM symbols, where X is a positive integer (for example: X=1, 2, 3, 4, 5, 6, 7, etc.). If total number of sweeping OFDM symbol for each beam sweep corresponds to Ybeam sweeping units (for example: Y=1, 2, 3, 4), then the total number is equal to XY.

The number of beam sweeping units (Y) per beam sweep is configurable by the base station. The signaling can be done by: broadcast signaling (MIB or SIB) transmitted before RACH process (option 1); broadcast/multicast/groupcast signaling (SIB) transmitted after RACH process with coarse beam alignment (option 2); in RACH msg 2 or RACH msg 4 (option 3); or UE-specific RRC signaling after data beam alignment (option 4).

Figure 16:
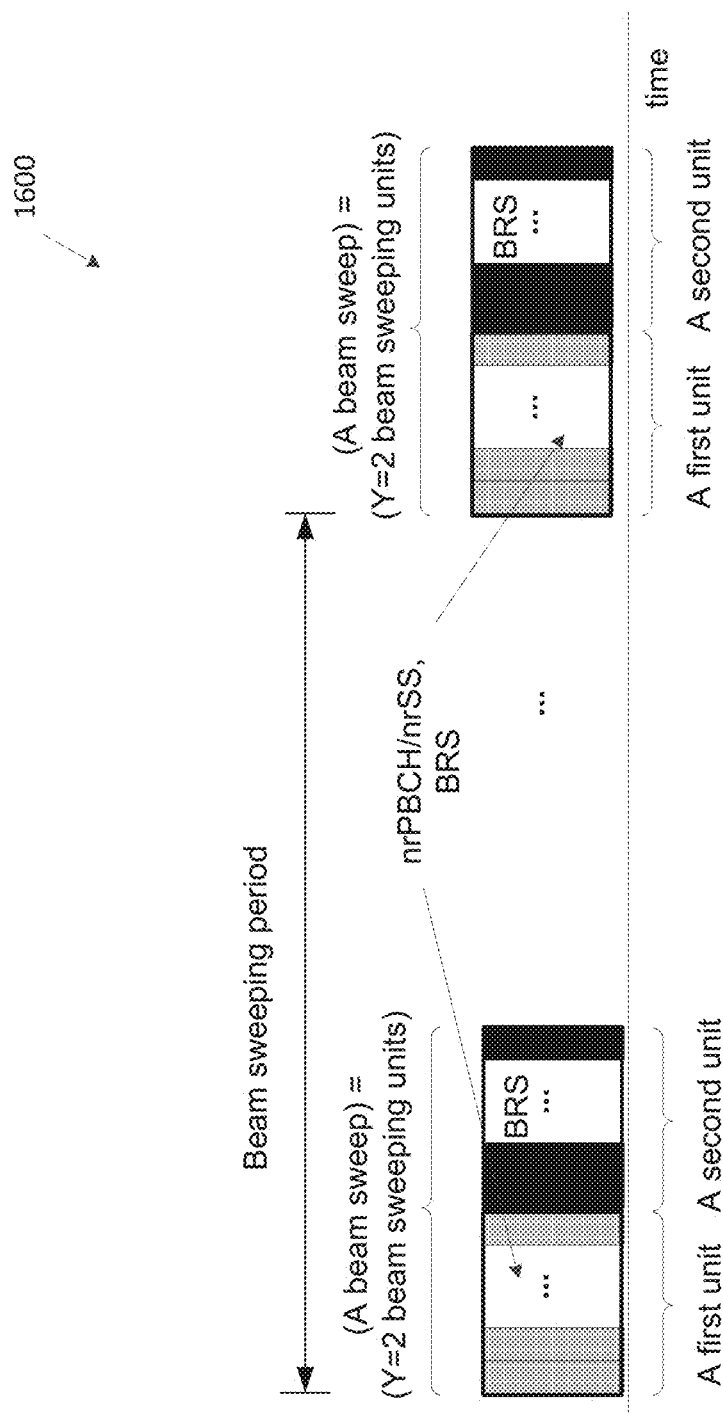
FIG. 16 illustrates an example multiplexing signals on a beam sweep according to embodiments of the present disclosure.

FIG. 16 illustrates an example multiplexing signals 1600 on a beam sweep according to embodiments of the present disclosure. An embodiment of the multiplexing signals 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

FIG. 16 illustrates implementation of beam sweeping and signal multiplexing according to some embodiments of the present disclosure. In some embodiments, among the beam sweeping units comprising a beam sweep, only the first y beam sweeping unit includes both PBCH/SSS and BRS; and the rest of beam sweeping units include only BRS. This is to ensure that PBCH on the X OFDM symbols in the first unit can be coherently combined at UE without the UE knowing the information on Y. In the figure, only the first y=1 beam sweeping unit includes both PBCH/SSS and BRS.

In multi-beam based system, the TRP uses each of those beams to cover one part of the cell. For downlink transmission to a UE, the TRP may choose one proper Tx beam for this UE so that the downlink signal can reach the UE with strong power. For uplink transmission, the TRP also may choose one proper Rx beam for this UE. The UE could also utilize multi-beam technique to improve the link quality. Similarly, the UE may choose proper Rx beam to receive the downlink transmission and proper Tx beam to send the uplink transmission.

From the initial access to RRC connected state, there could exist different level of beam alignment between the TRP and the UE.

The system information is supposed to be received by all the UEs. Some system information is supposed to be received by a UE during initial access, for example the configuration of RACH. Some system information can be received by a UE after initial access procedure. What level of beam alignment is assumed for a particular system information message has crucial impact on the physical channel design for system information.

Figure 17:
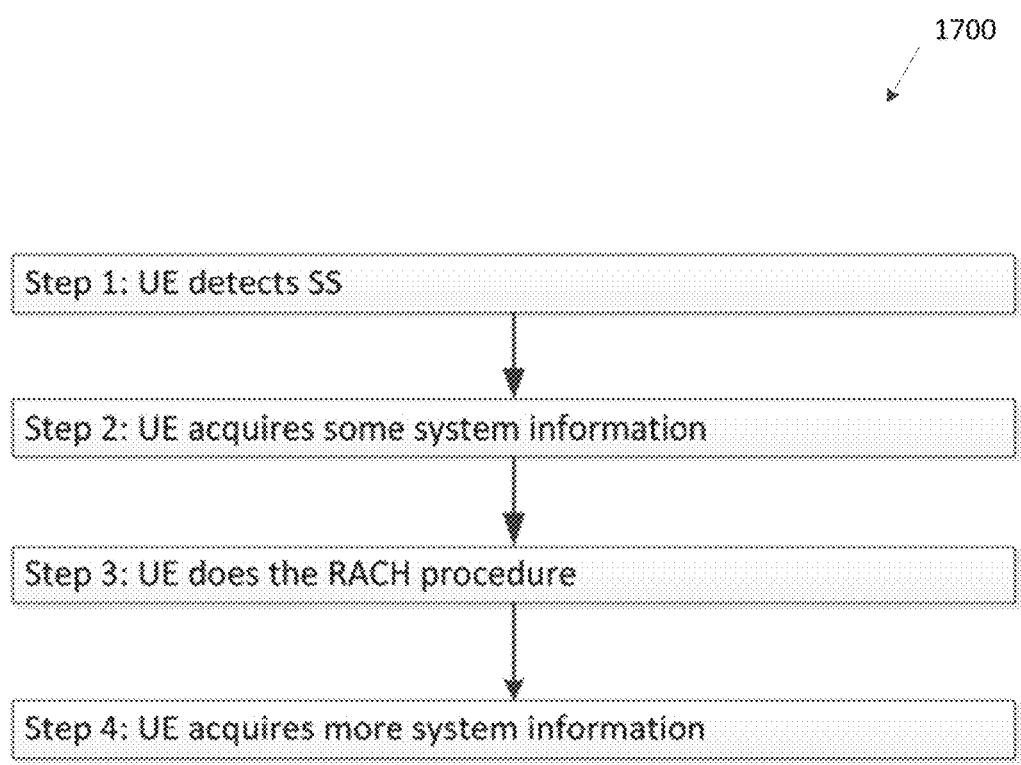
FIG. 17 illustrates a flow chart of an initial access method according to embodiments of the present disclosure.

FIG. 17 illustrates a flow chart of an initial access method 1700 according to embodiments of the present disclosure. An embodiment of the number of digital chains 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

A high level general procedure of initial access to RRC connected state is shown in FIG. 17. The initial access signals (including initial synchronization signals, PBCH and some SIBs before RACH) are the first signals to be detected by the UE. The initial access signals are supposed to be received by all UEs. When transmitting initial access signals, there does not exist any beam alignment between the TRP and the UE. So the initial access signals are transmitted through multiple Tx beams and those Tx beams sweep over multiple OFDM symbols. The TRP beams used for initial access signals are generally wide beam and the number of TRP beams is not large in order to reduce the overhead. From the detection of initial access signals, the UE could obtain the best TRP Tx beam. However, there is no uplink transmission chance so the UE is not able to report the Tx beam ID to the TRP.

After detecting initial access signals, the UE enters RACH procedure. During the RACH procedure, the TRP and the UE could build a beam alignment over the TRP beams used for initial access and RACH procedure. In a general four-step RACH procedure, msg 1 is RACH preamble transmission from the UE, msg 2 is the RAR (RACH access response) to the UE, msg3 is the first uplink transmission scheduled by the RAR and msg4 is contention resolution message sent to the UE. The UE could report one TRP Tx beam ID in (1) msg1 RACH preamble or (3) msg3, the first uplink transmission to the TRP. Through that, the TRP and the UE could build a coarse beam alignment over the beams used for initial access signals. The TRP can use such beam alignment to transmit the rest of the system information messages. Those beams from coarse beam alignment have wide beamwidth. So the coverage is limited and the data rate of transmission using those beams would be limited.

The configuration for the L1/L2 beam management procedure P-1 could be sent in one of those system information messages. In P-1, the TRP and the UE could build a fine beam alignment over narrow beams. The configuration may include at least one of the following: number of antenna ports for DL BRS (beam reference signals) used for P-1; number of antenna ports for UL BRS for P-1, including time-frequency resource for UL BRS; number of beam sweeping units in a beam sweep, i.e., Y.; or B-RSRP reporting configuration—nrPUCCH/nrPUSCH resource to transmit the B-RSRP; number of beams to report in each report; and if periodic reporting is configured, period and offset (in terms of subframes/slots/mini-slots).

During the L1/L2 beam management procedure P-1, the UE is configured to align the TRP/UE Tx/Rx beams relying on DL BRS and UL BRS. It is noted that BRS can be alternatively called as mobility/measurement reference signals (MRS), channel-state information reference signals (CSI-RS) etc. For this procedure, a UE is configured to measure beam-specific RSRPs utilizing BRS, and report B-RSRP(s) on the configured nrPUCCH/nrPUSCH resources. The UE may receive an aperiodic B-SRSRP report trigger to report B-RSRP(s) on a scheduled nrPUSCH resource. In addition, the UE can be indicated with a Tx beam in the L1/L2 signaling—DCI based or MAC CE based—so that the UE can align the Rx beam.

In some embodiments, the BRS can also be used for mobility—in which case the BRS is used for deriving cell-specific measurement quantities, such as cell specific RSRP (RS received power)/RSRQ (RS received quality).

In one example, the configuration for beam management procedure P-1 is sent to the UE after the UE completes the RACH procedure, i.e., during step 4 in FIG. 17. After the P-1 is completed, the TRP and the UE achieve fine beam alignment over the narrow TRP Tx beams.

In another example, the configuration for beam management procedure P-1 is be sent during the initial access. The benefit of this method is that the earlier the P-1 procedure, the earlier the TRP is able to use the narrow beams on the transmission to the UE. The beams in P-1 procedure are narrow and have larger coverage distance. The transmission using those beams is expected to have higher data rate. One solution is to send the P-1 configuration in PBCH or SIBs transmitted before RACH procedure. The UE could measure the beam reference signal of P-1 and then report the TRP Tx beam ID for P-1 to build fine beam alignment. The UE could report TRP Tx beam ID in msg 1 of RACH or msg3 of RACH or some uplink transmission after the RACH procedure. Another solution is to send the P-1 configuration in RAR during RACH procedure. Then the UE could report TRP Tx beam ID in msg3 of RACH or some uplink transmission after RACH procedure. Another solution is to send the P-1 configuration in msg4 of RACH and the UE could report TRP Tx beam ID in one uplink transmission after RACH procedure.

The methods to send configuration of beam management procedure P-1 is summarized in TABLE 4.

TABLE 4

| Configuration of beam management |
| --- |
| Solution 1: After RACH procedure, TRP sends the configuration of P-1 in PDSCH using the coarse beam alignment built during initial access |
| Solution 2: TRP sends the configuration of P-1 in PBCH or SIBs that are sent before RACH procedure |
| Solution 3: TRP sends the configuration of P-1 in RACH RAR. |
| Solution 4: TRP sends the configuration of P-1 in RACH msg4 |

The system information including MIB (PBCH) and some SIBs which are used for initial access and random access procedure to be received by the UE before the RACH procedure. There is no beam alignment between the TRP and the UE. So the transmission of the system information needs to be transmitted by all the beams used for initial access so that any potential UE is able to receive them. One solution for that is the Tx beam sweeping.

The rest of system information can be received by the UE after the RACH procedure is completed. One solution to transmit those system information is Tx beam sweeping. The TRP uses the same beams as used in initial access to broadcast the system information through Tx beam sweeping. Another solution is to transmit the system information in unicast PDSCH to the UE through the beams from the coarse beam alignment. After the beam management procedure P-1 is completed and fine beam alignment is achieved, the TRP could use the beam from the fine beam alignment to transmit system information in unicast PDSCH to the UE. If the beam used for PDSCH transmission is beam selected by multiple UEs, the PDSCH could be multicast. The solution of sending system information in unicast/multicast PDSCH with beams from coarse beam alignment or fine beam alignment is more resource efficient than the solution using Tx beam sweeping.

The optional methods to transmit system information are summarized in TABLE 5.

TABLE 5

Optional method to transmit system information

| System information | The transmission mechanism |
| --- | --- |
| MIB and SIBs containing, e.g., RACH configuration which may be sent before RACH | The gNB may use multiple Tx beam to transmit multiple copies of same system information (Tx beam sweeping) |
| System information sent after RACH | Option 1: Broadcast though TRP Tx beam sweeping<br>Option 2: Sent in unicast/multicast PDSCH using beams of coarse beam management before beam management procedure P-1.<br>Option 3: Sent in unicast/multicast PDSCH using beams of fine beam alignment achieved in beam management procedure P-1. |

In some embodiments, cellular DL communications are considered. However, the same/similar principles and related signaling methods and configurations can also be used for cellular UL and sidelink (SL) communications.

In some embodiments of the present disclosure, two terminologies, "RS for mobility" and "beam reference signals (BRS)" are used interchangeably. In some embodiments of the present disclosure, channel state information (CSI) refers to at least one of CQI, PMI, RI, RSRP and a CSI-related resource index (e.g., beam index, CSI-RS resource index). In some embodiments of the present disclosure, beam state information (BSI) refers to at least one of: (1) beam index that can be derived from CSI-RS port index, beam resource index/time unit index and B-CSI-RS resource index; (2) RSRP and/or RSRQ of the reported beam. In some embodiments of the present disclosure, it is assumed that UE is configured with a reference numerology (comprising OFDM symbol length and subcarrier spacing) at least for PDSCH reception. In some embodiments of the present disclosure, the terminologies, "beam resource," "time unit" and "mini-slot" mean the same thing and are used interchangeably.

In some embodiments, BRS and CSI-RS are used for beam management. In one example, BRS is used for coarse beam alignment and CSI-RS is used for beam selection and/or beam refinement. In another example, a cell comprises a single TRP comprising $N_p$ TXRUs. In this case, BRS is configured for beam sweeping across $X_1$ beams (which could be coarse beams) and the CSI-RS is configured for beam sweeping across $X_2$ fine beams for beam refinement. In yet another example, a cell comprises multiple TRPs. Assume the set of TRPs in a cell is S. There are $N_p(s)$ TXRUs on each TRP s ∈ S. In this case, the RS for mobility or BRS is configured with beam sweeping across $sum_{s \in S}$ ($X_1(s)$) beams and the CSI-RS is used for beam refinement and supports beam sweeping across $sum_{s \in S}(X_2(s))$ fine beams. In yet another example, the CSI-RS is used for both coarse beam alignment and beam refinement.

In some embodiments, the following types of CSI-RS resources are configured for beam management and CSI estimation: a first type of CSI-RS resources for beam management, which is called B-CSI-RS; and a second type of CSI-RS resources for CSI estimation, which is called as A-CSI-RS.

Furthermore, A-CSI-RS may have two sub-types—coverage RS type and UE-specific RS type. In one embodiment, the following types of CSI-RS resources are configured for beam management and CSI estimation: a first type of CSI-RS resources for beam management, which is called B-CSI-RS; a second type of CSI-RS resources (coverage CSI-RS) for CSI estimation, which is called as A1-CSI-RS; and a third type of CSI-RS resources (UE-specific CSI-RS) for CSI estimation, which is called as A2-CSI-RS.

A collection of A1-CSI-RS and A2-CSI-RS may be referred to A-CSI-RS in some embodiments. A CSI-RS configuration includes at least one of: $M_B$ B-CSI-RS resources for measurement of the beam state information (BSI), where $M_B \geq 1$; or $M_A$ A-CSI-RS resources for channel state information (CSI) measurement, where $M_A \geq 1$.

Transmission method of CSI-RS can be periodic, semi-persistent or aperiodic. The transmission method can be configured per CSI-RS resource. A UE can be configured to derive BSI based on the configured B-CSI-RS resources. A UE can be configured to report the information of UE's Rx beams or Rx ports to the gNB, comprising either the number of Rx beams or ports used by the UE in UE Rx beam sweeping, or the number of Rx beams or ports that the UE may train during the beam management.

Figure 18A:
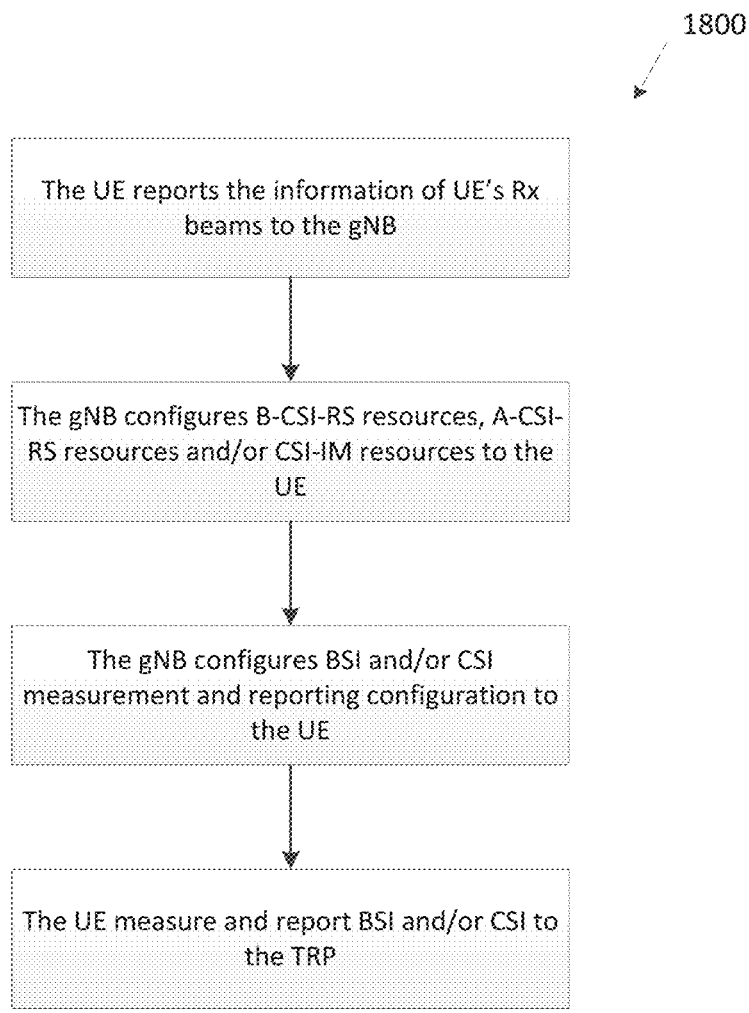
FIG. 18A illustrates a flow chart of beam and channel state information measurement according to embodiments of the present disclosure.

FIG. 18A illustrates a flow chart of a method 1800 for beam and channel state information measurement according to embodiments of the present disclosure. An embodiment of the method 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions. Other embodiments are used without departing from the scope of the present disclosure.

An example of procedure of using CSI-RS for beam state information and channel state information measurement is shown in FIG. 18A. As illustrated in FIG. 18A, the UE reports the information of UE's Rx beams to the gNB, as configured. Then the gNB configures $M_B$ B-CSI-RS resources and/or $M_A$ A-CSI-RS resources and/or CSI-IM. The gNB configures BSI and/or CSI measurement and reporting to the UE. As configured, the UE measures and reports BSI and/or CSI.

Figure 18B:
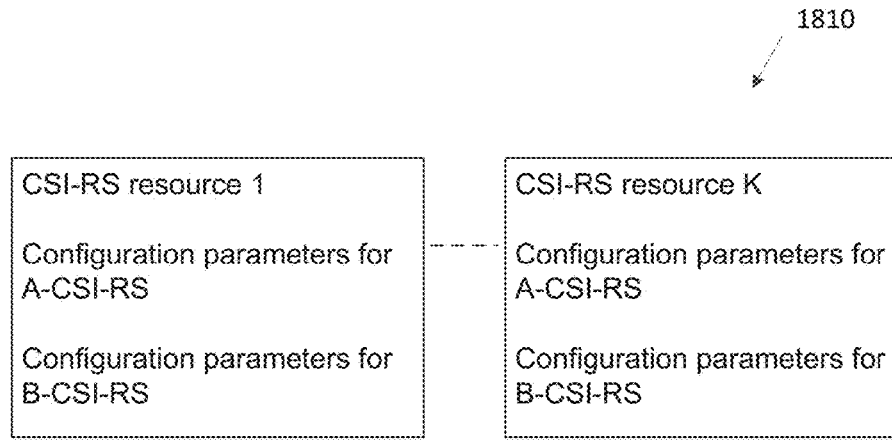
FIG. 18B illustrates an example RRC signaling procedure according to embodiments of the present disclosure.

FIG. 18B illustrates an example RRC signaling procedure 1810 according to embodiments of the present disclosure. An embodiment of the RRC signaling procedure 1810 shown in FIG. 18B is for illustration only. One or more of the components illustrated in FIG. 18B can be implemented in specialized circuitry configured to perform the noted functions or one or more of the components can be implemented by one or more processors executing instructions to perform the noted functions. Other embodiments are used without departing from the scope of the present disclosure.

In one embodiment, the RRC signaling for an RS setting comprises K CSI-RS configurations, each comprising parameters for both A- and B-CSI-RS resources as shown in FIG. 18B. In this case, the UE is configured to use a common number of A- and B-CSI-RS, i.e., $M_A=M_B=K$. The parameters for A- and B-CSI-RS are separately configured for A- and B-CSI-RS, e.g., antenna port count, time-frequency resource mapping, etc. This method may be useful to support TRP specific transmissions of both B-CSI-RS and A-CSI-RS. In an alternative embodiment, two separate configuration parameters are configured for A1-CSI-RS and A2-CSI-RS, in place of A-CSI-RS configuration parameters.

Figure 18C:
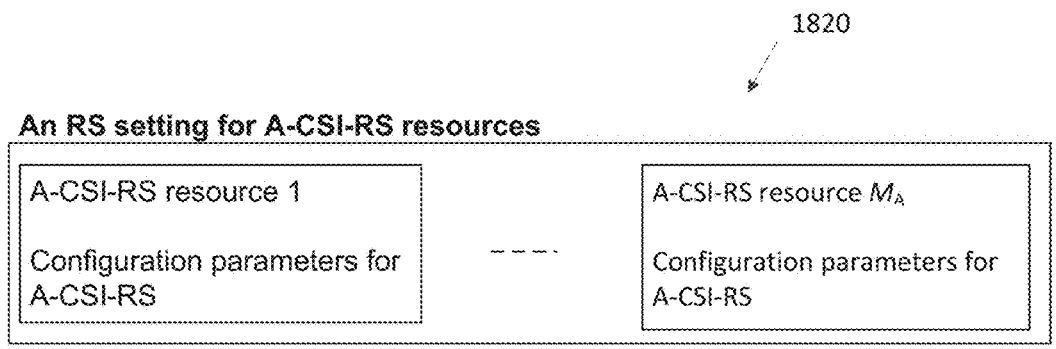
FIG. 18C illustrates another example RRC signaling procedure according to embodiments of the present disclosure.
Figure 18C:
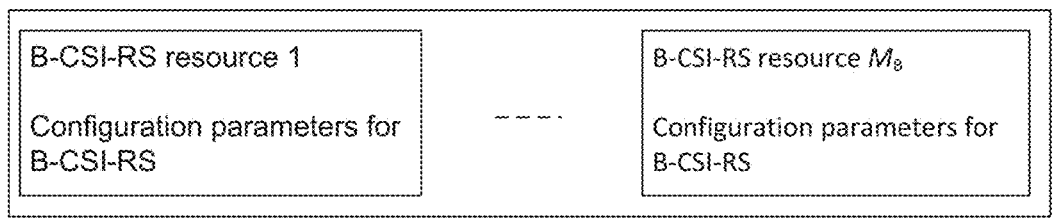

FIG. 18C illustrates another example RRC signaling procedure 1820 according to embodiments of the present disclosure. An embodiment of the RRC signaling procedure 1820 shown in FIG. 18C is for illustration only. One or more of the components illustrated in FIG. 18C can be implemented in specialized circuitry configured to perform the noted functions or one or more of the components can be implemented by one or more processors executing instructions to perform the noted functions. Other embodiments are used without departing from the scope of the present disclosure.

In another embodiment, the RRC signaling for an RS setting configures either A-CSI-RS resources or B-CSI-RS resources, as illustrated in FIG. 18C. In this case, the RS setting configuration can include a parameter to indicate whether the RS setting is for A-CSI-RS or B-CSI-RS. In one example, the UE is configured with $M_A=1$ and $M_B>=1$. In this example, one UE-specific A-CSI-RS is configured and the same CSI-RS resource is used by different TRPs by implementation. In an alternative embodiment, the RS setting configuration can include a parameter to indicate whether the RS setting is for A1-CSI-RS or A2-CSI-RS or B-CSI-RS.

Figure 18D:
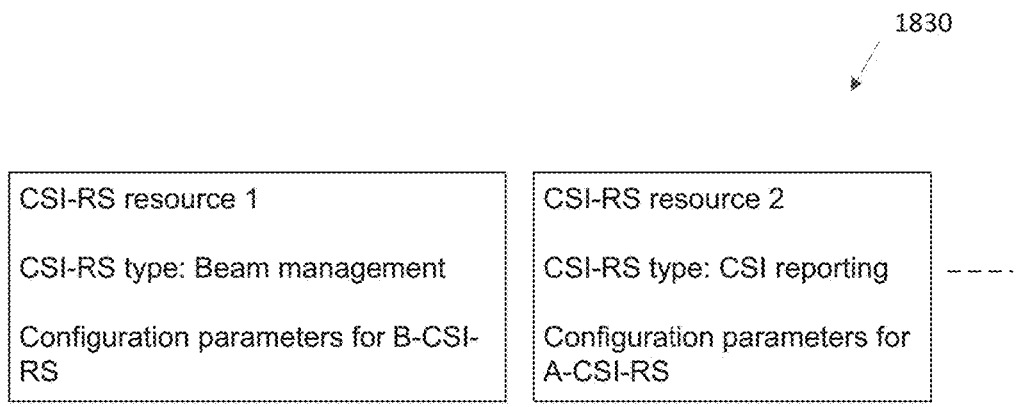
FIG. 18D illustrates yet another example RRC signaling procedure according to embodiments of the present disclosure.

FIG. 18D illustrates yet another example RRC signaling procedure 1830 according to embodiments of the present disclosure. An embodiment of the RRC signaling procedure 1830 shown in FIG. 18D is for illustration only. One or more of the components illustrated in FIG. 18D can be implemented in specialized circuitry configured to perform the noted functions or one or more of the components can be implemented by one or more processors executing instructions to perform the noted functions. Other embodiments are used without departing from the scope of the present disclosure.

In yet another embodiment, the RRC signaling for an RS setting comprises K CSI-RS configurations, each of which comprises a type identifier—A or B CSI-RS; and corresponding parameters. This method is illustrated in FIG. 18D. In another option, more than one type can be indicated. Equivalently, there can be a type identifier corresponding to multiple usages. In the example shown in FIG. 18D, there can be a third type corresponding to both beam management and CSI reporting.

Figure 18E:
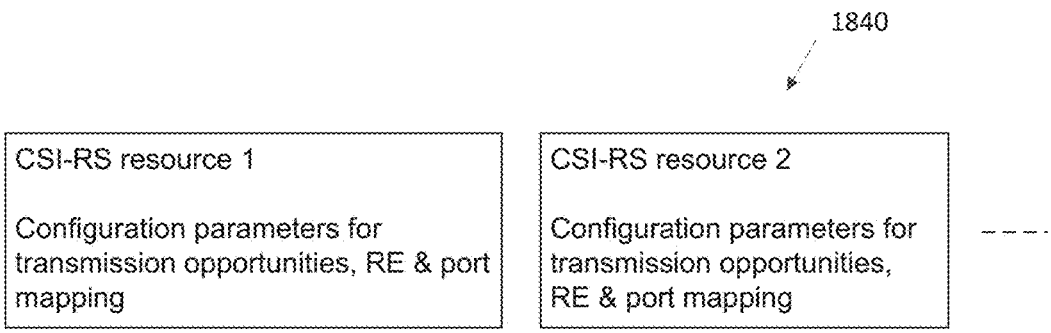
FIG. 18E illustrates yet another example RRC signaling procedure according to embodiments of the present disclosure.

FIG. 18E illustrates yet another example RRC signaling procedure 1840 according to embodiments of the present disclosure. An embodiment of the RRC signaling procedure 1840 shown in FIG. 18E is for illustration only. One or more of the components illustrated in FIG. 18E can be implemented in specialized circuitry configured to perform the noted functions or one or more of the components can be implemented by one or more processors executing instructions to perform the noted functions. Other embodiments are used without departing from the scope of the present disclosure.

In yet another embodiment, the RRC signaling for an RS setting comprises K CSI-RS configurations, each of which comprises CSI-RS configuration parameters that are used to identify CSI-RS transmission opportunities and time-frequency and port mapping. This method is illustrated in FIG. 18E. The UE is not indicated any other information to identify a particular CSI-RS type, i.e., A-CSI-RS or B-CSI-RS.

Figure 18F:
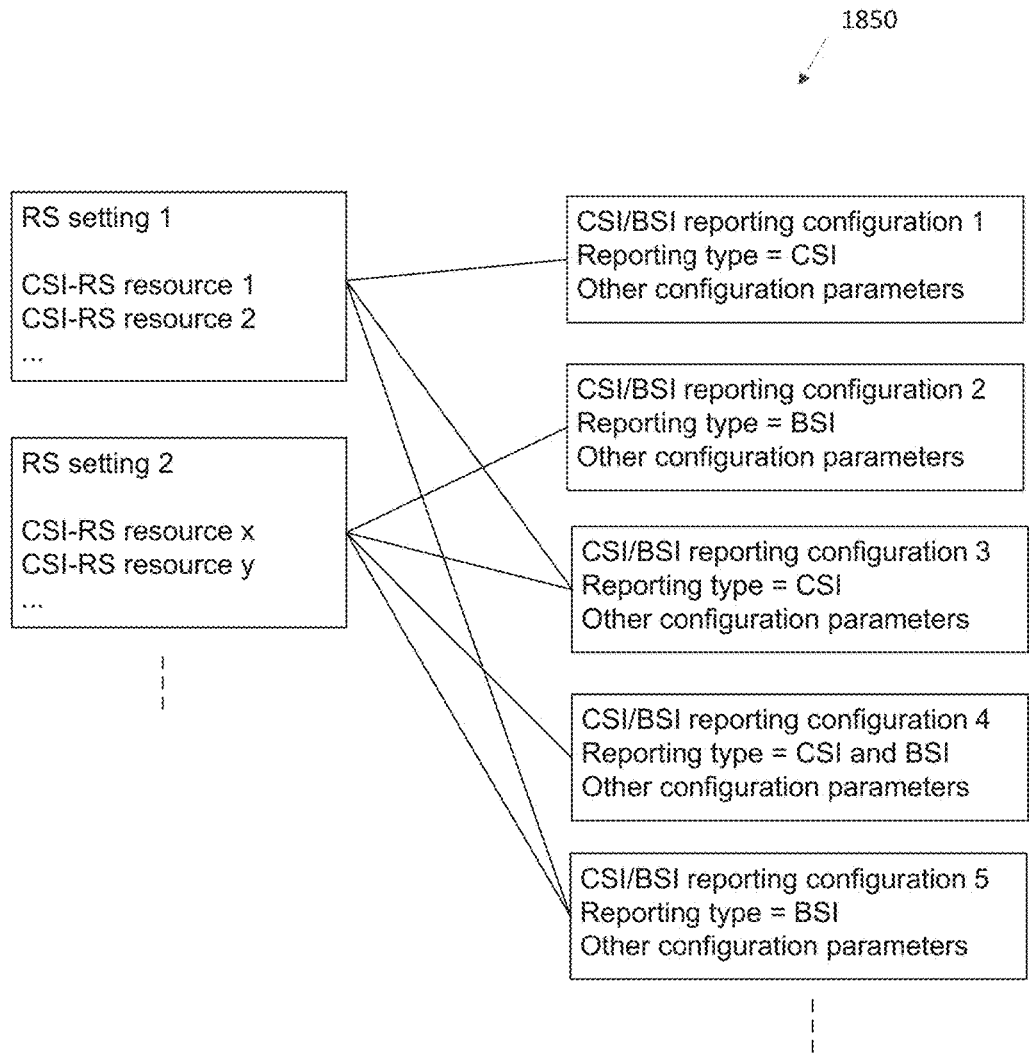
FIG. 18F illustrates yet another example RRC signaling procedure according to embodiments of the present disclosure.

FIG. 18F illustrates yet another example RRC signaling procedure 1850 according to embodiments of the present disclosure. An embodiment of the RRC signaling procedure 1850 shown in FIG. 18F is for illustration only. One or more of the components illustrated in FIG. 18F can be implemented in specialized circuitry configured to perform the noted functions or one or more of the components can be implemented by one or more processors executing instructions to perform the noted functions. Other embodiments are used without departing from the scope of the present disclosure.

The UE can get separate configuration on CSI and/or BSI reporting; and the separate configuration further specify which particular RS setting to be used for the CSI and/or BSI reporting as illustrated in FIG. 18F. CSI/BSI reporting configuration 1 indicates that the reporting type is CSI, and the CSI measurement may be done using RS setting 1. Configuration 2 indicates that the reporting type is BSI, and the BSI measurement may be done using RS setting 2. Configuration 3 indicates that the reporting type is CSI, and the CSI measurement may be done using both RS settings 1 and 2—hybrid CSI-RS. Configuration 4 indicates that the reporting type is both CSI and BSI, and the BSI/CSI measurement may be done using RS setting 2. Configuration 5 indicates that the reporting type is BSI, and the BSI/CSI measurement may be done using RS setting 1 and 2. Here, when CSI reporting is configured, the UE reports CQI/PMI/RI and CSI-RS resource indicator; when BSI reporting is configured; the UE reports RSRP and BI (which can be a resource indicator—e.g., CSI-RS resource indicator, or a combination of CSI-RS resource index, antenna port number, and beam resource index). When both CSI and BSI are configured, the UE is configured to report both CSI and BSI.

In some embodiments, a UE is configured with $M_A \geq 1$ CSI-RS resources for both beam management and CSI estimation. The UE is configured to measure and report the BSI and the CSI.

Figure 18G:
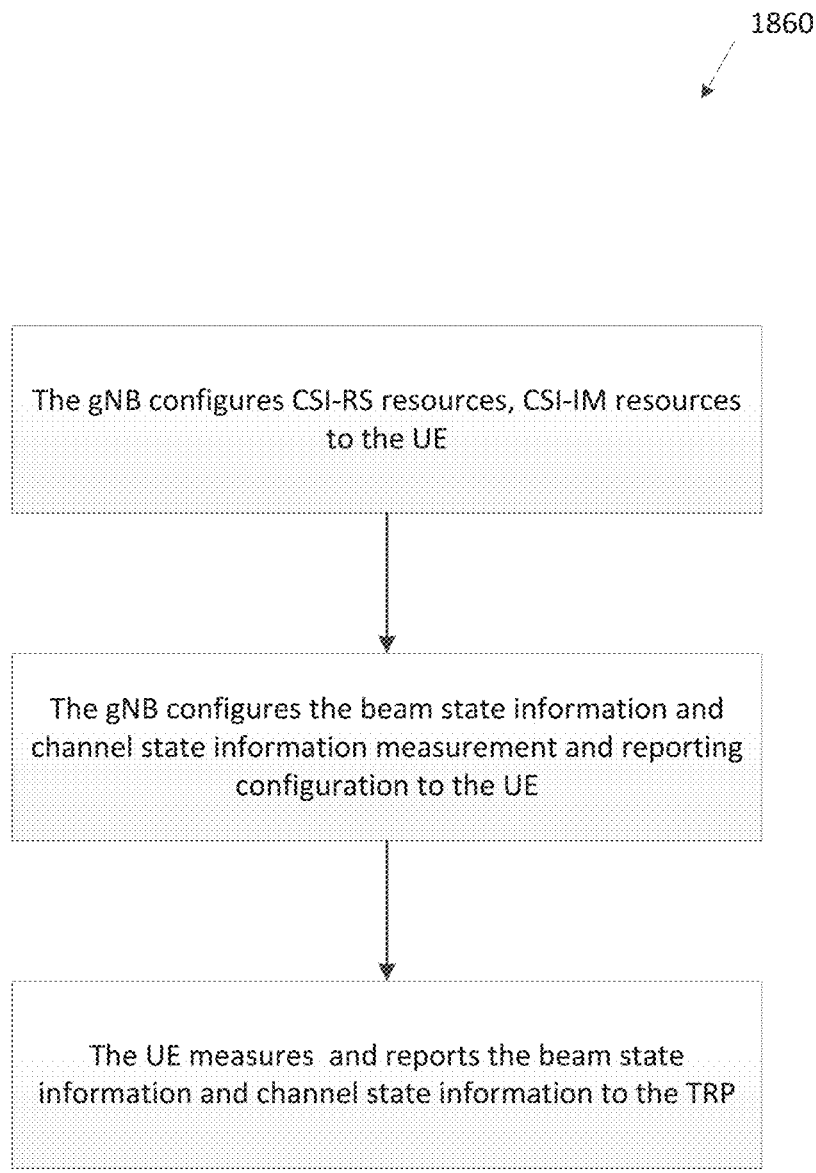
FIG. 18G illustrates a flow chart of measurement according to embodiments of the present disclosure.

FIG. 18G illustrates a flow chart of measurement method 1860 according to embodiments of the present disclosure. An embodiment of the measurement method 1860 shown in FIG. 18G is for illustration only. One or more of the components illustrated in FIG. 18G can be implemented in specialized circuitry configured to perform the noted functions or one or more of the components can be implemented by one or more processors executing instructions to perform the noted functions. Other embodiments are used without departing from the scope of the present disclosure.

An example of procedure of using joint CSI-RS configuration for BSI and CSI is shown in FIG. 18G. As illustrated in FIG. 18G, the UE reports the information of UE's Rx beams to the gNB, as configured. Then the gNB configures $M_A$ CSI-RS resources and $I_A$ CSI-IM resources to the UE. The gNB configures BSI and CSI measurement and reporting to the UE. As configured, the UE measures and reports CSI and BSI.

A flexible CSI-RS resource configuration framework is beneficial for beam management and/or channel state information estimation in advanced wireless communication system such as 5G or NR (new radio).

In some embodiments, a UE is configured with a number of CSI-RS resources each of which includes some or all of the following components. Some components may be grouped and configured as a single component to configure values jointly.

One CSI-RS resource contains one or more than one time units. The gNB or the TRP operates Tx beam sweeping over the time units. Through this configuration, there are Y beam resources (or time units) in a beam sweeping comprising Y time units. In one example, in one cell comprising one or multiple TRPs, each TRP applies one analog beam in one time unit and then sweep different analog beams across the time units.

The Y time units in CSI-RS resource can be multiplexed in time domain. In one example, the time units are consecutive in time-domain. In another example, the time units in one CSI-RS resource can be non-consecutive in time domain. In still other example, some of the time units in one CSI-RS resource can be consecutive in time and other time units in the same CSI-RS resource can be non-consecutive in time.

The Y time units in one CSI-RS resource can be in the same slot/subframe/time interval or in different slot/subframes/time intervals. The time units from different CSI-RS resources can be multiplexed in either in time domain or frequency domain.

In the number of CSI-RS antenna ports, $N_p$. each CSI-RS antenna port in one time unit can correspond to one beam ID. Different CSI-RS antenna port in one time unit can be transmitted from the same TRP or from different TRPs. In one example, each CSI-RS antenna port in one time unit correspond to a different beam transmitted from one or more than one TRPs. In one example, each pair of CSI-RS antenna ports in one time unit correspond to a different beam transmitted from one or more than one TRPs. In one example, each subset of $L_p$ CSI-RS antennas ports in one time unit correspond to a different beam transmitted from one or multiple TRPs and the example of $L_p$ can be $\{1, 2, 4, \ldots\}$. In one example, all the $N_p$ CSI-RS antenna ports in one time unit correspond to a beam transmitted from one or multiple TRPs.

In a number of repetitions within one time unit, X, iIn each time unit (or beam resource), the CSI-RS on the configured antenna ports are repeated in X sub-time units. In one method, a time unit comprises X consecutive sub-time units. From the viewpoint of gNB and TRP, the same subset of beams is repeated X times in one CSI-RS time unit. From the viewpoint of the UE, the same subset of TRP beams are repeated X times in one CSI-RS time unit and the UE is able to apply different UE Rx beams on different repetitions within one CSI-RS time unit. This repetition is able to enable the UE to sweep the UE Rx beams.

In one example, the X repetitions are transmitted on X short-OFDM symbols constructed using an α-times larger subcarrier spacing than that of the reference subcarrier spacing. The CP length for the short-OFDM symbol can also be α-times shorter than that of the OFDM symbol in the reference numerology. In this case, the length of a sub-time unit is equal to 1/α of the reference OFDM symbol length; and the length of a time unit is equal to X/α times an OFDM symbol duration in the reference numerology. Example values for α are 1, 2, 4, and, 8; and example values for X are 1, 2, 4, and, 8.

In another example, the X repetitions are transmitted on X consecutive OFDM symbols in reference numerology. Thus each time unit contains X OFDM symbols and each sub-time unit comprises one OFDM symbol in reference numerology.

In a numerology (subcarrier spacing) scaling factor, α. value α is jointly indicated with X (and not separately signaled). In one example, a UE is configured to use the same value as X, i.e., α=X. In another example, a UE is configured to use α=X/2. In another method, value α is separately indicated from X.

In a starting OFDM index l for mapping CSI-RS resource, each time unit occupies one normal OFDM symbols and the Y time units in one CSI-RS resource are mapped to normal OFDM symbols $\{l, l+1, \ldots, l+Y-1\}$. In one example, each time unit is mapped to X normal OFDM symbols and then Y time units in one CSI-RS resource can be mapped to OFDM symbols $\{l, l+1, \ldots, l+X\times Y-1\}$. In another example, each time unit is mapped to X short OFDM symbols within $L_s$ normal OFDM symbols, the time units in one CSI-RS resource are mapped to normal OFDM symbols $\{l, l+1, \ldots, l+L_s\times Y-1\}$. In some embodiments, the time units in a CSI-RS can be mapped consecutively in time or non-consecutively in time.

In a starting subcarrier index k where to map CSI-RS in frequency domain, the starting subcarrier index can be also referred to as reference subcarrier index; and it may corresponds to the lowest subcarrier index.

In indices of $N_p$ antenna ports of CSI-RS, the content of antenna port indices for a CSI-RS resource can be configured to the UE. In one method, the subset of antenna port indices configured to the UE can be indicated by total number of CSI-RS antenna port $N_p$ and a starting antenna port index $p_A$. Then the UE is configured to measure the CSI-RS antenna port indices $\{p_A, p_A+1, \ldots, p_A+N_p-1\}$. In one method, the subset of antenna port indices configured to the UE can be indicated by the total number of configured CSI-RS antenna ports $N_p$ and a ending antenna port index $p_B$. Then the UE is configured to measure the CSI-RS antenna port indices $\{p_B, p_B-1, \ldots, p_B-N_p+1\}$. In one method, the UE is configured with a list of $N_p$ antenna port indices $\{p_1, p_2, \ldots, p_{Np}\}$.

In information on time-resources to map the Y time units, the Y time units are mapped consecutively in time. The UE can be configured with an index of slot/subframe, $n_s$, on which the first time unit is mapped. Suppose that UE receives a DCI containing CSI/BSI reporting trigger on slot n indicating the UE to measure and report CSI/BSI using the configured CSI-RS; then $n_s$ may correspond to n+k, where k can be 0, 1, 2, 3, 4, .... In one such example, the length of a time unit is equal to an OFDM symbol length of the reference numerology, in which case, Y time units are mapped on Y consecutive OFDM symbols in $n_s$, starting from OFDM symbol l.

In some embodiments, the Y time units are mapped in Y slots/subframes $\{n_1, n_2, \ldots, n_Y\}$. Only a single time unit is mapped per time slot. In this case, the UE is configured with a set of slot indices $\{n_1, n_2, \ldots, n_Y\}$. In a special case, the Y time units are mapped in Y consecutive slots/subframes $\{n_s, n_s+1, \ldots, n_s+Y-1\}$. In this case, the UE is configured with the smallest index of slot/subframe/time interval $n_s$ to map the CSI-RS.

In information on CSI-RS transmission opportunities (in terms of slot/subframe indices), the UE is configured with slot/subframe indices of CSI-RS transmission opportunities of the CSI-RS resource. The UE can be further dynamically indicated in a DCI to measure CSI/BSI using CSI-RS transmitted on at least one of the configured CSI-RS transmission opportunities; the DCI indicates the identity (or identities) of the at least one of the configured CSI-RS transmission opportunities.

In one embodiment, the CSI-RS transmission opportunities correspond to a periodically recurring time instances. These transmission opportunities can be configured in terms of period P and offset O in slot/subframe numbers. In another embodiment, the CSI-RS transmission opportunities are a number of consecutive slots/subframes, i.e., $\{n_s, n_s+1, \ldots, n_s+Z-1\}$. These transmission opportunities can be configured in terms of the starting slot/subframe index, i.e., $n_s$, and number of slots/subframes Z. In yet another embodiment, the CSI-RS transmission opportunities are a set of slot/subframe indices $\{n_1, n_2, \ldots, n_Z\}$, and the configuration can directly indicates the slot/subframe numbers.

Figure 19A:
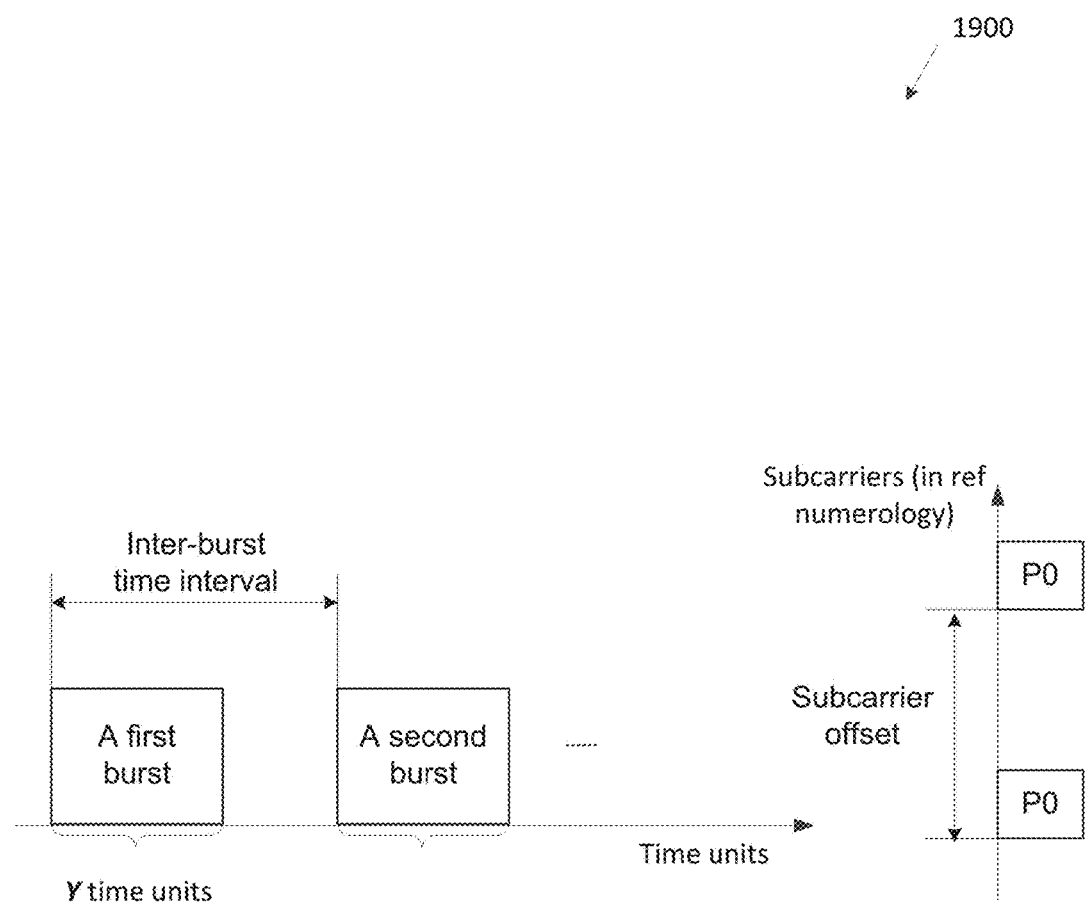
FIG. 19A illustrates an example configuration of frequency domain density according to embodiments of the present disclosure.

FIG. 19A illustrates an example configuration of frequency domain density 1900 according to embodiments of the present disclosure. An embodiment of the configuration of frequency domain density 1900 shown in FIG. 19A is for illustration only. One or more of the components illustrated in FIG. 19A can be implemented in specialized circuitry configured to perform the noted functions or one or more of the components can be implemented by one or more processors executing instructions to perform the noted functions. Other embodiments are used without departing from the scope of the present disclosure.

In configurations related to multiple bursts in a CSI-RS resource, a number of CSI-RS bursts, and the inter-burst time interval. When the number of CSI-RS bursts is 2, for example, the CSI-RS port transmissions are repeated in two bursts of Y time units, wherein the starting time of two bursts are spaced by the configured value of inter-burst time interval. This is illustrated on the left side of FIG. 19A. Multiple bursts can be configured for facilitating UE's measuring Doppler parameters.

In configurations related to frequency domain density of CSI-RS, frequency density of each CSI-RS port can be configured (e.g., in terms of frequency comb factor, or subcarrier number offset between two closest REs used for mapping a same port CSI-RS in reference numerology). This is illustrated on the right side of FIG. 19A for antenna port P0. Close subcarrier offset is beneficial for facilitating UE's measuring delay parameters.

Figure 19B:
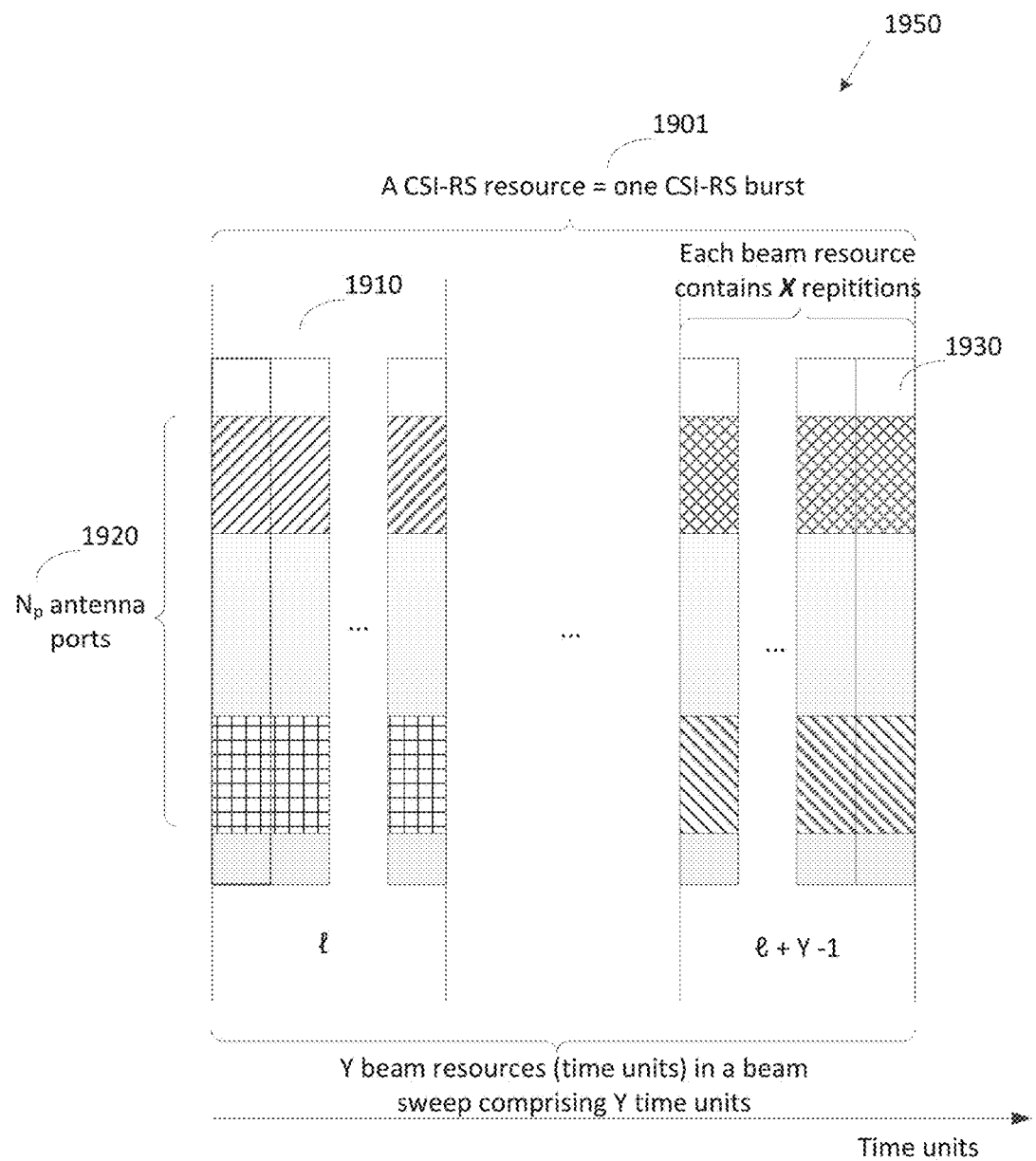
FIG. 19B illustrates an example CSI-RS configuration according to embodiments of the present disclosure.

FIG. 19B illustrates an example CSI-RS configuration 1950 according to embodiments of the present disclosure. An embodiment of the CSI-RS configuration 1950 shown in FIG. 19B is for illustration only. One or more of the components illustrated in FIG. 19B can be implemented in specialized circuitry configured to perform the noted functions or one or more of the components can be implemented by one or more processors executing instructions to perform the noted functions. Other embodiments are used without departing from the scope of the present disclosure.

An example of CSI-RS configuration is shown in FIG. 19B. As illustrated in FIG. 19B, one CSI-RS resource 1901 contains Y time units. The time units are mapped to OFDM symbols $\{l, l+1, \ldots, l+Y+1\}$, as shown in FIG. 19B. In the CSI-RS resource 1901, there are Y beam resources comprising Y time units where the gNB and/or TRP would apply beam sweeping; one beam resource is mapped on one time unit. Within each time unit 1910, there are $N_p$ CSI-RS antenna ports 1920. In each time unit 1910, the $N_p$ antenna ports 1920 are repeated X times. The UE is configured to operate Rx beam sweeping over the X repetitions 1930 within each time unit 1910.

The parameters characterizing the B-CSI-RS resources may comprise two components: (1) cell-specific or UE-group specific components and (2) UE-specific components. In such a case, broadcast signaling (e.g., NR-SIB, NR-MIB, etc.) or UE-group specific signaling in RRC or MAC, or PHY is used to configure a subset of the parameter components corresponding to the cell-specific components; a dynamic UE specific signaling in DCI or in MAC CE is used to further refine configurations corresponding to the UE-specific parameter components.

In one example, UE-specific parameter components include the number of repetitions within a time unit, X. This is because the number of Rx beams is UE-specifically designed. In another example, the cell-specific or UE-group specific signaling contents include $M_B$ B-CSI-RS resource configurations, which specifies a subset or a full set of above information components, for each of the $M_B$ B-CSI-RS resources. The UE-specific signaling contents includes information on a selected subset of $M_B$ B-CSI-RS resources that UE needs to measure in the current and subsequent time slots for beam state information (BSI) reporting; and UE-specific information components for the selected subset.

In some embodiments, the same CSI-RS antenna port and RE mapping pattern is applied across all the time units within a CSI-RS resource configuration. In such embodiments, the $N_P$ CSI-RS antenna ports are multiplexed through FDM in each OFDM symbol containing CSI-RS. Different CSI-RS antenna ports are mapped to different subset of REs. An example is shown in FIG. 19B. As illustrated in FIG. 19A, one time unit 1910 is mapped to one OFDM symbol in reference numerology. The subcarrier spacing for CSI-RS mapping is X times scaled of reference subcarrier spacing. So there are X sub-time units 1930 in one time unit 1910. The CSI-RS port P0 1951 and the CSI-RS port P1 1952 are mapped to different REs. In time unit 1910, the CSI-RS on the port P0 1951 and port P1 1952 are repeated X times 1930.

In some embodiments, the $N_P$ CSI-RS antenna ports are mapped and multiplexed through FDM and CDM in a number of OFDM symbols. In one example, the CSI antenna ports are multiplexed by FDM in frequency domain and CDM in frequency domain. $O_0$ CSI-RS antenna ports are mapped to the same subset of REs in frequency domain and then length $O_0$ of orthogonal codes are applied to different ports mapped to the same subset in frequency domain. In another example, $N_p=8$ CSI-RS ports are multiplexed by FDM and CDM in frequency domain with $O_0=2$. The CSI-RS port subsets $p_0+\{0, 1\}$, $p_0+\{2, 3\}$, $p_0+\{4, 5\}$ and $p_0+\{6, 7\}$ are multiplexed through FDM and they are mapped to different REs. Within each CSI-RS port subset, those two ports are multiplexed through CDM in frequency domain with orthogonal codes [1, 1] and [1, −1]. In yet another example, $N_p=8$ CSI-RS ports are multiplexed by FDM and CDM in frequency domain with $O_0=4$. The CSI-RS port subsets $p_0+\{0, 1, 2, 3\} p_0+\{4, 5, 6, 7\}$ are multiplexed through FDM and they are mapped to different REs. Within each CSI-RS port subset, those two ports are multiplexed through CDM in frequency domain with orthogonal codes [1, 1, 1, 1], [1, 1, −1−1], [1, −1, 1, −1] and [1, −1, −1, 1].

In some embodiments, the CSI antenna ports are multiplexed by FDM and CDM in time domain. In such embodiments, $O_0$ CSI-RS antenna ports are mapped to the same subset of REs in frequency domain and then length $O_0$ of orthogonal codes are applied to different ports mapped to the same subset in time domain. In one example, $N_p=8$ CSI-RS ports are multiplexed by FDM and CDM in frequency domain with O=2. The CSI-RS port subsets $p_0+\{0, 1\}$, $p_0+\{2, 3\}$, $p_0+\{4, 5\}$ and $p_0+\{6, 7\}$ are multiplexed through FDM and they are mapped to different REs. Within each CSI-RS port subset, those two ports are multiplexed through CDM in time domain with orthogonal codes [1, 1] and [1, −1]. In one example, $N_p=8$ CSI-RS ports are multiplexed by FDM and CDM in time domain with $O_0=4$. The CSI-RS port subsets $p_0+\{0, 1, 2, 3\} p_0+\{4, 5, 6, 7\}$ are multiplexed through FDM and they are mapped to different REs. Within each CSI-RS port subset, those two ports are multiplexed through CDM in time domain with orthogonal codes [1, 1, 1, 1], [1, 1, −1−1], [1, −1, 1, −1] and [1, −1, −1, 1].

Figure 19C:
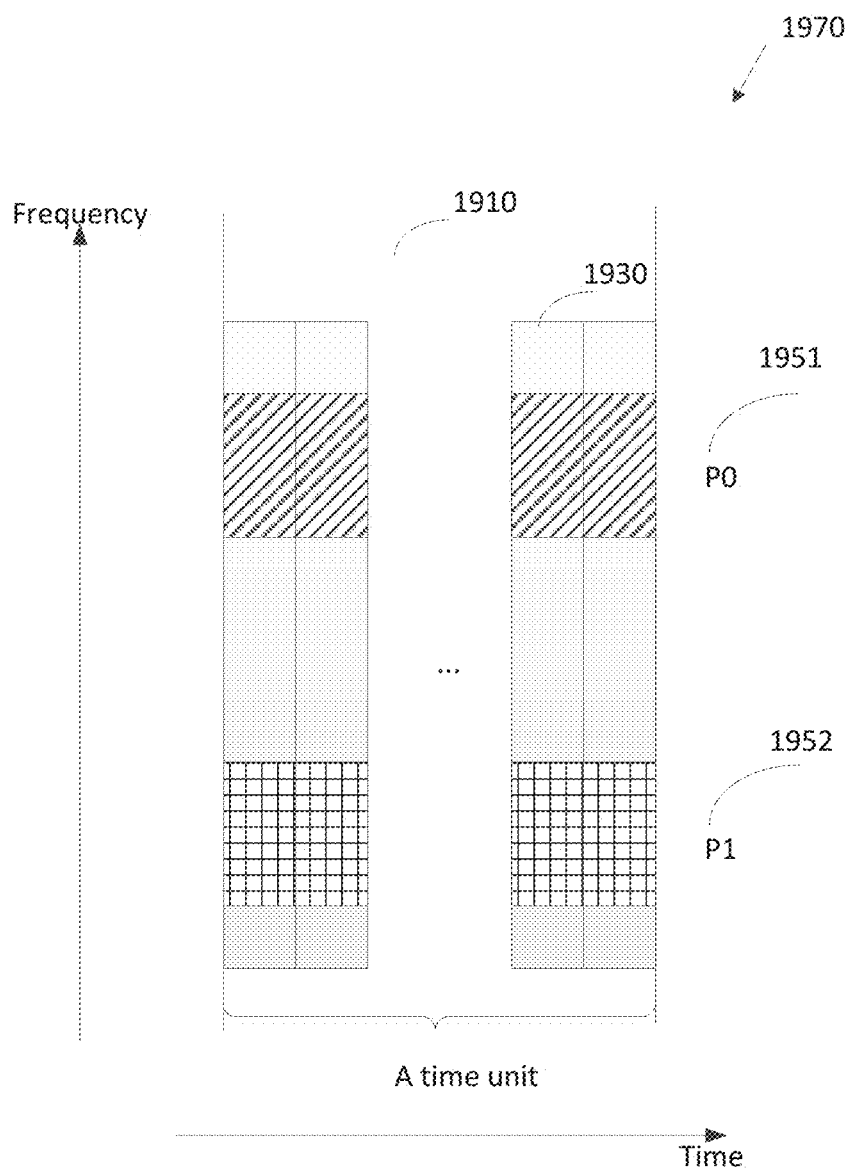
FIG. 19C illustrates an example CSI-RS port and RE mapping according to embodiments of the present disclosure.

FIG. 19C illustrates an example CSI-RS port and RE mapping 1970 according to embodiments of the present disclosure. An embodiment of the CSI-RS port and RE mapping 1970 shown in FIG. 19C is for illustration only. One or more of the components illustrated in FIG. 19C can be implemented in specialized circuitry configured to perform the noted functions or one or more of the components can be implemented by one or more processors executing instructions to perform the noted functions. Other embodiments are used without departing from the scope of the present disclosure.

Figure 19D:
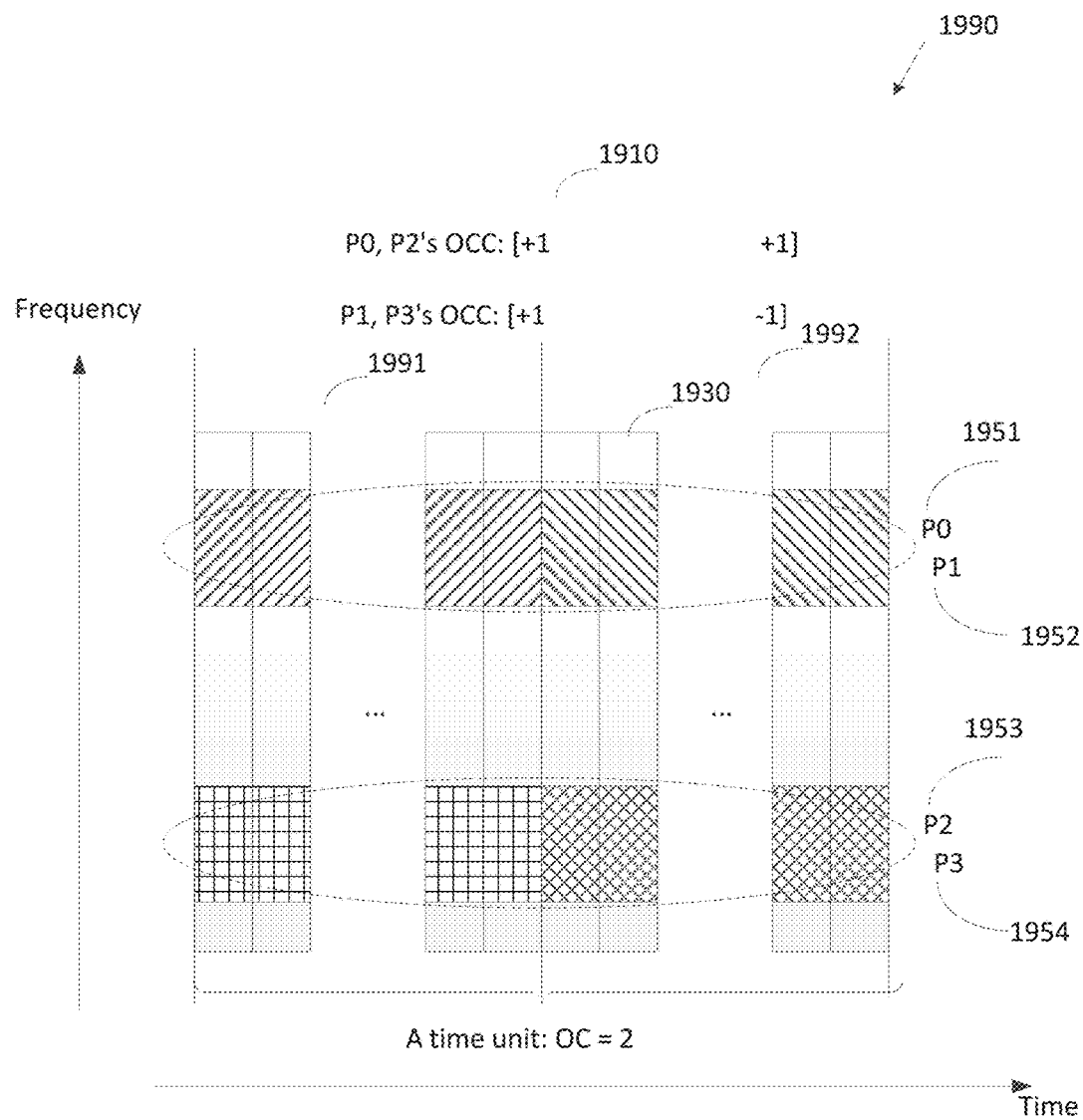
FIG. 19D illustrates an example CSI-RS configuration in FDM and CDM according to embodiments of the present disclosure.

FIG. 19D illustrates an example CSI-RS configuration 1990 in FDM and CDM according to embodiments of the present disclosure. An embodiment of the CSI-RS configuration 1990 shown in FIG. 19D is for illustration only. One or more of the components illustrated in FIG. 19D can be implemented in specialized circuitry configured to perform the noted functions or one or more of the components can be implemented by one or more processors executing instructions to perform the noted functions. Other embodiments are used without departing from the scope of the present disclosure.

An example of multiplexing CSI-RS through FDM and CDM is shown in FIG. 19D. As shown in FIG. 19D, there are four antenna ports P0 1951, P1 1952, P2 1953 and P3 1954, which are multiplexed by FDM and CDM with length-2 orthogonal code in time domain. As shown in FIG. 19B, the time unit 1910 occupies two reference OFDM symbols (normal OFDM symbols) and the subcarrier spacing used by CSI-RS OFDM symbols is X times of the subcarrier spacing of reference OFDM symbol. So in both the first OFDM symbol 1991 and the second OFDM symbol 1992, there are X sub-time units 1930. The CSI-RS ports P0 1951 and P1 1952 are mapped to the same subset of REs. The CSI-RS ports P2 1953 and P3 1954 are mapped to the same subset of REs.

For mapping each CSI-RS port, A length-2 orthogonal code is applied; (1) Alt 1: on a time unit in the first OFDM symbol and on a time unit in the second OFDM symbol; (2) Alt 2: on two consecutive sub-time units in a given OFDM symbol, in which case the sub-time units in each OFDM symbol are partitioned into groups of two consecutive sub-time units, and OCC is applied across the two consecutive sub-time units in each group. The orthogonal cover code (OCC) applied to port P0 351 is [+1, +1] and the orthogonal code applied to port P1 1952 is [+1, −1]. The orthogonal code applied to port P2 1953 is [+1, +1] and the orthogonal code applied to port P3 1954 is [+1, −1].

In some embodiments, a beam ID is allocated to across all the repetitions of each antenna port in each beam resource. In one example, in the B-CSI-RS configuration with Ybeam resources, X repetitions in each beam resource and $N_p$ antenna ports in each beam resource, there are totally $Y \times N_p$ beam ID carried in this B-CSI-RS. A few example methods to determine the beam ID b are explained below. In the examples, p corresponds to an antenna port index in B-CSI-RS: a method 1: $b=(p-p_0)+n \times N_p$, where $p_0$ is the index of initial antenna port of B-CSI-RS and n is the index of beam resource n=0, . . . , Y−1. In this method, the beam ID is allocated first along antenna port index and then the beam resource; and a method 2: $b=(p-p_0) \times Y+n$, where $p_0$ is the index of initial antenna port of B-CSI-RS and n is the index of beam resource n=0, . . . , Y−1. In this method, the beam ID is allocated first along the beam resource index and then antenna port index. The UE could apply different Rx beam on the different repetitions within one beam resource.

In some embodiments, a beam ID is allocated to each pair of antenna ports across all the repetitions in each beam resource. In one example, in the B-CSI-RS configuration with Ybeam resources, X repetitions in each beam resource and $N_p$ antenna ports in each beam resource, there are totally $Y \times N_p/2$ beam ID carried in this B-CSI-RS. A few example methods to determine the beam ID b are explained below. In the examples, p corresponds to an antenna port index in B-CSI-RS: a method 1:

$$b = \left\lfloor \frac{p - p_0}{2} \right\rfloor + n \times \frac{N_p}{2},$$

where $p_0$ is the index of initial antenna port of B-CSI-RS and n is the index of beam resource n=0, . . . , Y−1. In this method, the beam ID is allocated first along antenna port index and then the beam resource index; a method 2:

$$b = \left\lfloor \frac{p - p_0}{2} \right\rfloor \times Y + n,$$

where $p_0$ is the index of initial antenna port of B-CSI-RS and n is the index of beam resource n=0, . . . , Y−1. In this method, the beam ID is allocated first along the beam resource index and then antenna port index; a method 3:

$$b = \mathrm{mod}\!\left(p - p_0, \frac{N_p}{2}\right) + n \times \frac{N_p}{2}.$$

In this method, the antenna ports corresponding to the same beam ID are scattered and the beam ID is first allocated along antenna port index and then the beam resource index; and a method 4:

$$b = \mathrm{mod}\!\left(p - p_0, \frac{N_p}{2}\right) \times Y + n.$$

In this method, the antenna ports corresponding to the same beam ID are scattered and the beam ID is first allocated along the beam resource index and then antenna port index.

In some embodiments, a beam ID is allocated to each group of four antenna ports across all the repetitions within each beam resource. In one example, in the B-CSI-RS configuration with Ybeam resources, X repetitions in each beam resource and $N_p$ antenna ports in each beam resource, there are totally $Y \times N_p/4$ beam ID carried in this B-CSI-RS. A few example methods to determine the beam ID b are explained below. In the examples, p corresponds to an antenna port index in B-CSI-RS: a method 1:

$$b = \left\lfloor \frac{p - p_0}{4} \right\rfloor + n \times \frac{N_p}{4},$$

where $p_0$ is the index of initial antenna port of B-CSI-RS and n is the index of beam resource n=0, . . . , Y−1. In this method, the beam ID is allocated first along antenna port index and then the beam resource; a method 2:

$$b = \left\lfloor \frac{p - p_0}{4} \right\rfloor \times Y + n,$$

where $p_0$ is the index of initial antenna port of B-CSI-RS and n is the index of beam resource n=0, ..., Y−1. In this method, the beam ID is allocated first along the beam resource index and then antenna port index; a method 3:

$$b = \mathrm{mod}\left(p - p_0, \frac{N_p}{4}\right) + n \times \frac{N_p}{4}.$$

In this method, the antenna ports corresponding to the same beam ID are scattered and the beam ID is first allocated along antenna port index and then the beam resource index; and a method 4:

$$b = \mathrm{mod}\left(p - p_0, \frac{N_p}{4}\right) + n \times \frac{N_p}{4}.$$

In this method, the antenna ports corresponding to the same beam ID are scattered and the beam ID is first allocated along beam resource index and then the antenna port index.

In some embodiments, the same antenna port and RE mapping pattern is applied over all the allocated beam resources in one CSI-RS resource.

In some embodiments, the UE is configured with M CSI-RS resources for beam management. In one example, in a cell comprising with multiple TRPs, different TRPs' beams are transmitted on different CSI-RS resources.

The beam grouping over multiple CSI-RS resources would be useful to the following scenarios. In one example of scenario, to deal with blockage. The gNB is able to track beams from multiple different TRPs for each UE. When a blockage between the UE and one TRP is detected, the system could switch to another TRP quickly. In another example of scenario, to support non-coherent JT (joint transmission). Through beam grouping and corresponding measurement, the gNB is able to be aware of beam combinations from multiple different TRPs which are QCLed to the same UE Rx beam. It implies that those beams can be received the UE with the same Rx beam at the same time. In yet another example of scenario, to support spatial multiplexing MIMO transmission from multiple TRPs. Through beam grouping and corresponding measurement, the gNB is able to know the beam combination from multiple different TRPs which are able to be received by the UE with same Rx beam at the same time.

In some embodiments, the UE is configured with one of the following beam grouping configuration for M CSI-RS resources. In one example of method 1, the UE is configured to report the information on N beams per CSI-RS resource. The information the UE reports could include: the CSI-RS resource index; the beam ID; the RSRP that is measured from the CSI-RS port carrying this beam ID; and/or the UE Rx beam ID.

In another example of method 2, the UE is configured to report information on M beams for the M configured CSI-RS resources, which are QCLed to the same UE Rx beams. The information the UE reports could include: the beam IDs from M CSI-RS resources; the UE Rx beam ID that those beam IDs are QCLed to; and/or the sum RSRP that are measured from the CSI-RS ports that carry those beam ID.

The UE can be configured to report N sets of the above information with N largest sum RSRP. The beam grouping configuration can be signaled to the UE through two parameters: one bit information to indicate the method from the above two methods for beam grouping; and the number of reports, N.

In some embodiments, beam IDs carried in one CSI-RS resource are partitioned into one or more than one groups. The UE is configured with the beam grouping configuration. In one method, the beam grouping configuration is through the CSI-RS port index partition. In one example, the configured beam group number is 1. Then all the beam ID carried in one CSI-RS resource belongs to the same beam group.

In another example, the configured beam group number is 2. The following example can be used to calculate the CSI-RS port indices that corresponding to the beam ID belonging to beam group #0 and beam group #1. In one example of method 1, all the beam IDs carried by CSI-RS ports $\{p_0, p_0+2, p_0+4, \ldots\}$ are in beam group #0 and all the beam IDs carried by CSI-RS ports $\{p_0+1, p_0+3, \ldots\}$ are in beam group #1. In another example of method 2, all the beam IDs carried by CSI-RS ports $\{p_0, p_0+1, p_0+2, \ldots, p_0+N_p/2-1\}$ are in beam group #0 and all the beam IDs carried by CSI-RS ports $\{p_0+N_p/2, \ldots, p_0+N_p-1\}$ are in beam group #1. In yet another example of method 3, a bitmap is used to indicate the CSI-RS port index that carries beam IDs in beam group #0. For example, a bitmap $b_0 b_1 \ldots b_{N_p-1}$ is used to indicate the CSI-RS port index that carries beam IDs in beam group #0. The value of $b_i$ being 1 indicates that the beam IDs carried by this port belong to beam group #0. The value of $b_i$ being 0 indicates that the beam IDs carried by this port belong to beam group #1.

In some embodiments, the configured beam group number is 4. The following methods can be used to calculate the CSI-RS port indices that corresponding to the beam ID belonging to beam groups $\{\#0, \#1, \#2, \#3\}$. In one example of method 1, all the beam IDs carried by CSI-RS ports $\{p_0, p_0+4, p_0+8, \ldots\}$ are in beam group #0, all the beam IDs carried by CSI-RS ports $\{p_0+1, p_0+5, \ldots\}$ are in beam group #1, all the beam IDs carried by CSI-RS ports $\{p_0+2, p_0+6, \ldots\}$ are in beam group #2 and all the beam IDs carried by CSI-RS ports $\{p_0+3, p_0+7, \ldots\}$ are in beam group #3. In another example of method 2, all the beam IDs carried by CSI-RS ports $\{p_0, p_0+1, p_0+2, \ldots, p_0+N_p/4-1\}$ are in beam group #0, all the beam IDs carried by CSI-RS ports $\{p_0+N_p/4, \ldots, p_0+N_p/2-1\}$ are in beam group #1, all the beam IDs carried by CSI-RS ports $\{p_0+N_p/2, \ldots, p_0+N_p3/4-1\}$ are in beam group #2, all the beam IDs carried by CSI-RS ports $\{p_0+N_p3/4, \ldots, p_0+N_p-1\}$ are in beam group #3.

In some embodiments, the beam grouping configuration for one CSI-RS resource can be signaled through one beam grouping configuration index and the UE is configured to calculate the beam grouping configuration based on the received beam grouping configuration index. An example of the beam grouping configuration index is shown in TABLE 6.

As illustrated in the example of TABLE 6, the UE is configured to calculate the number of beam group and the beam group partition over CSI-RS ports based on the received beam grouping configuration index.

TABLE 6

Beam grouping configuration

| Beam grouping Configuration Index | Number of beam groups | Beam group partitions over CSI-RS ports |
|---|---|---|
| 0 | 1 | Group #0: $p_0 + \{0, 1, \ldots, N_p - 1\}$ |
| 1 | 2 | Group #0: $p_0 + \{0, 2, \ldots, N_p - 1\}$ |
|   |   | Group #1: $p_0 + \{1, 3, \ldots, N_p - 1\}$ |
| 2 | 2 | Group #0: $p_0 + \{0, 1, \ldots, N_p/2 - 1\}$, |
|   |   | Group #1: $p_0 + \{N_p/2, \ldots, N_p - 1\}$ |
| 3 | 4 | Group #0: $p_0 + \{0, 4, \ldots\}$, |
|   |   | Group #1: $p_0 + \{1, 5, \ldots\}$, |
|   |   | Group #2: $p_0 + \{2, 6, \ldots\}$, |
|   |   | Group #3: $p_0 + \{3, 7, \ldots\}$ |
| 4 | 4 | Group #0: $\{p1, p2, \ldots\}$, |
|   |   | Group #1: $\{p3, p4, \ldots\}$, |
|   |   | Group #2: $\{p5, p6, \ldots\}$, |
|   |   | Group #3: $\{p7, p8, \ldots\}$, |

In some embodiments, the UE is configured with the beam measurement/reporting method for the B-CSI-RS. In one example, the UE is configured to report information of beam ID from each beam group. The reporting information from the UE could include: the beam ID, the UE Rx beam ID that this beam ID is QCLed to and the RSRP measured from the CSI-RS port which carries this beam ID.

In some embodiments, the UE is configured to report the information of M beams for the M configured beam groups in one CSI-RS resource and those beams are QCLed to the same UE Rx beam. This measurement method is useful for spatial multiplexing and non-coherent JT transmission mode. The reporting information from the UE could include: the beam IDs; the UE Rx beam ID that those beam IDs are QCLed to; and the sum of RSRP measured from the CSI-RS ports which carries the above beam IDs.

In some embodiments, the UE is configured with the transmission of B-CSI-RS resource(s) and triggering of BSI reporting through L1 signaling (e.g., DCI) and/or L2 signaling (MAC-CE). In one example, the UE is configured by a DCI or a MAC-CE that configures the transmission of one or more than one B-CSI-RS resources in slot/subframe $n_0$ and also triggering the reporting of BSI in slot/subframe $n_1$, where $n_1 \geq n_0$.

In another example, the UE is configured through a first DCI that configures the transmission of one or more than one B-CSI-RS resources in slot/subframe $n_0$ or in s subset of slots/subframes $\{n_0, n_1, \ldots\}$. And then the UE is configured by a second DCI to trigger the reporting of BSI in slot/subframe $n_1$. This DCI can also indicate a B-CSI-RS resource index to configure the UE to measure and report the BSI based on a subset or all configured CSI-RS resources indicated in a first DCI. In one method, the gNB and/or TRP can send multiple second DCI to trigger the UE to measure and report the BSI based on a subset or all configured CSI-RS resources indicated in a first DCI.

In some embodiments, the UE is configured to report the BSI in PUSCH and/or PUCCH. In one method, in the DCI configuring the triggering of reporting BSI also includes the schedule of a PUSCH or PUCCH. The UE is configured to report the BSI in the scheduled PUSCH or PUCCH. In one example, the DCI indicating the reporting of BSI implicitly schedules a PUSCH or PUCCH for the UE to report the BSI. The configuration of PUSCH or PUCCH can be semi-statically configured by a DCI, MAC-CE or RRC message. The configuration of PUSCH or PUCCH includes at least the location of resource, the MCS and the transmission scheme.

In some embodiments, the BSI can include the information of gNB or TRP beam and the information of beam strength. In one example, a beam ID is indicated and the UE is configured to calculate the beam ID based on the time unit index and CSI-RS antenna port number as described in some previous embodiment.

In some embodiments, the UE is configured to calculate the bit width for beam resource indicator (or beam ID) for reporting dynamically based on configuration of the indicated CSI-RS for beam management. In one example, $M_B$ B-CSI-RS resources are configured to the UE and there are $Y(m)$ time units (beam resources) and $N_p(m)$ CSI-RS antenna ports in m-th configured B-CSI-RS resource for $m=1, 2, \ldots, M_B$. In one example, a beam ID is generated for each indicated B-CSI-RS resource. For m-th B-CSI-RS, the UE is configured to calculate the bit width as $\text{ceill}(\log_2(Y(m) \times N_p(m)))$ and the beam ID is sequentially generated with the combination of time unit (beam resource) and antenna port, as described in some previous embodiment.

In another example, a beam resource ID and an antenna port ID are generated separately for BSI reporting per B-CSI-RS resource. For the m-th B-CSI-RS resource, the UE is configured to calculate the bit width as $\text{ceill}(\log_2(Y(m))) + \text{ceill}(\log_2(N_p(m)))$.

In yet another example, the UE is configured to calculate the global beam ID over the subset $\Phi$ of B-CSI-RS resource that is indicated for the CSI-RS transmission and reporting BSI. The UE is configured to calculate the bit width as $\text{ceill}(\log_2(\Sigma_{m \in \Phi} Y(m) \times N_p(m)))$. The subset $\Phi$ of B-CSI-RS could be just one of $M_B$ configured B-CSI-RS resources, some or all $M_B$ configured B-CSI-RS resources. Then the beam ID is generated sequentially with combinations of time unit (beam resource), antenna port and indicated B-CSI-RS resource index.

In yet another example, the UE is configured to report the antenna port index and a global beam resource ID over the subset $\Phi$ of B-CSI-RS resource that is indicated for the CSI-RS transmission and reporting BSI. The UE is configured to calculate the bit width as $\text{ceill}(\log_2(\Sigma_{m \in \Phi} Y(m))) + \text{ceill}(\log_2(\max_{m \in \Phi} N_p(m)))$. The beam resource ID is generated sequentially along the time units in indicated B-CSI-RS resources for BSI reporting and the antenna port is just the CSI-RS antenna port index in one time unit.

Figure 20:
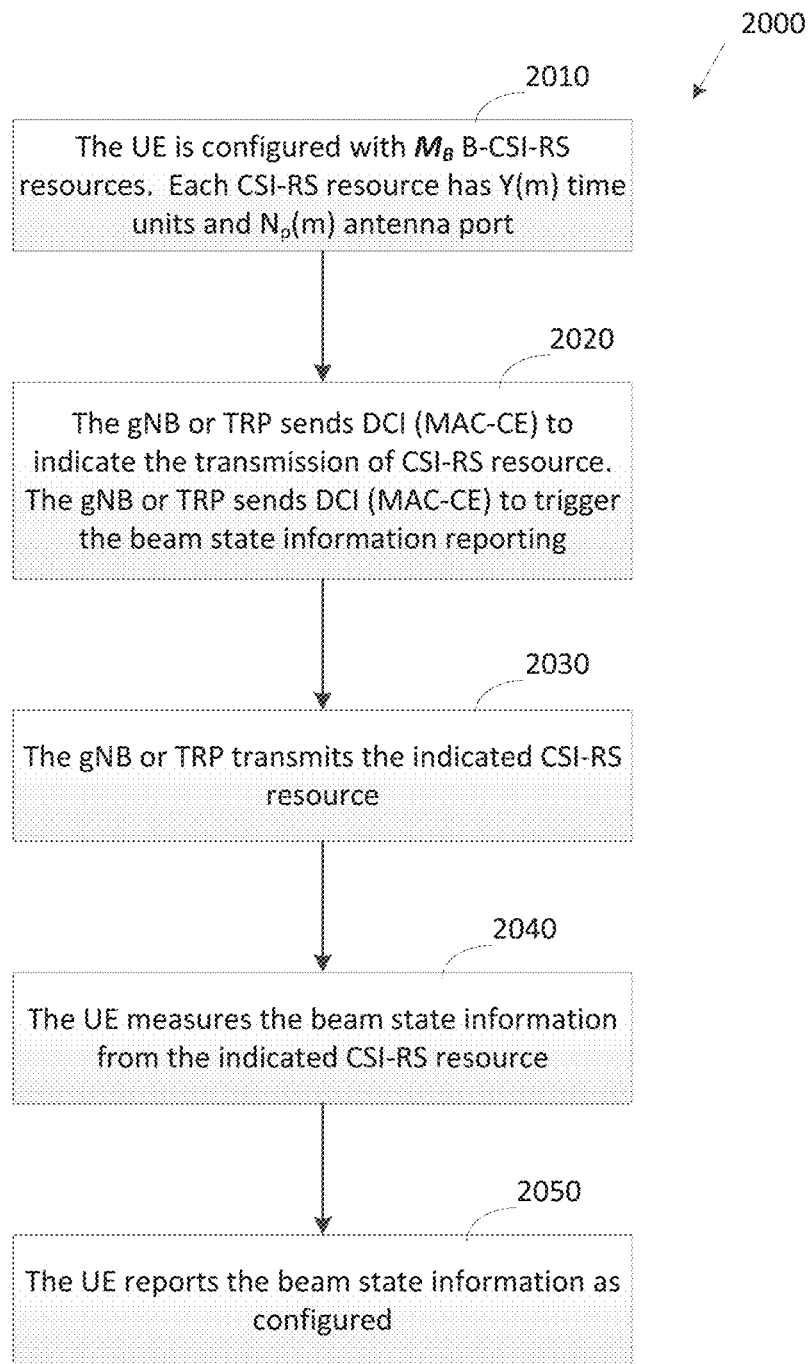
FIG. 20 illustrates a flow chart of BSI reporting method according to embodiments of the present disclosure.

FIG. 20 illustrates a flow chart of BSI reporting method 2000 according to embodiments of the present disclosure. An embodiment of the BSI reporting method 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions. Other embodiments are used without departing from the scope of the present disclosure.

In some embodiments, the beam strength can be the RSRP of beams and/or RSRQ of beams. An example of BSI reporting procedure is shown in FIG. 20. As illustrated in FIG. 20, the UE is first configured with $M_B$ B-CSI-RS resources in step 2010. The configuration could be semi-static through RRC message. In step 2020, the gNB or TRP sends DCI to indicate the transmission of one or more B-CSI-RS resources to the UE. The gNB also sends DCI to the UE to indicate the reporting of BSI. In step 2030, the gNB transmits the CSI-RS in the indicated CSI-RS resources. In step 2040, the UE measures and calculates the BSI from the CSI-RS in the indicated CSI-RS resources. In step 2050, the UE reports the BSI as configured.

In some embodiments, one time unit comprises one or more OFDM symbols in reference/configured subcarrier spacing; and the sub-time units comprising one time unit are formulated through various methods below. In one example, the sub-time units are formulated through IFDMA, in which the B-CSI-RS signals are mapped on every R REs. In this manner, there are R same repetitions in each OFDM symbol with reference/configured subcarrier spacing. When $N_P$ ports are configured for the CSI-RS resource, CSI-RS for antenna ports 1, 2, . . . , $N_P$ are sequentially mapped and cycled across the CSI-RS REs in the frequency domain. In such a case, CSI-RS antenna port p is mapped on subcarrier $Rp+kN_P$, where p=0, 1, . . . , $N_P$, and k=0, 1 . . . .

Figure 21A:
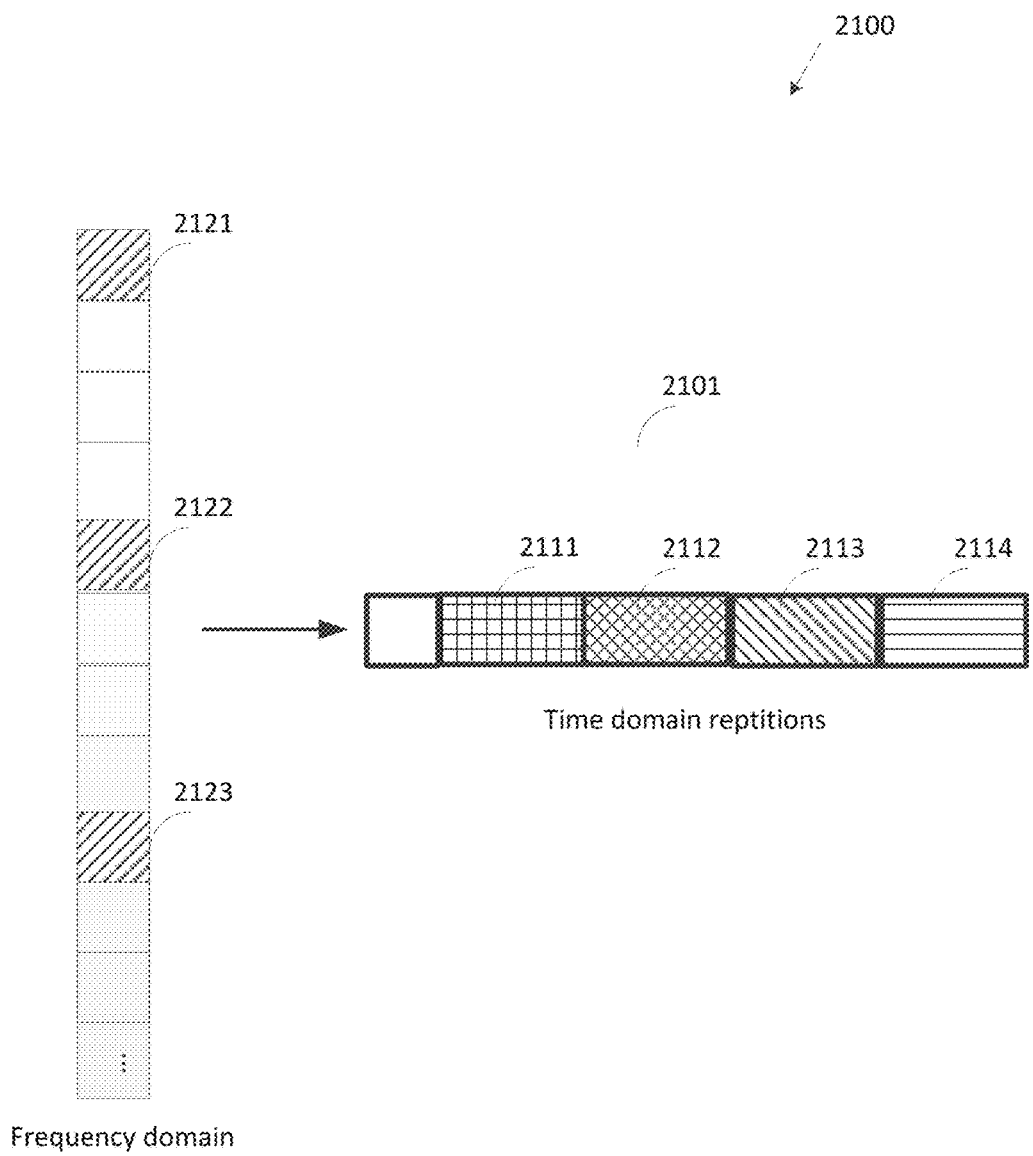
FIG. 21A illustrates an example time unit over OFDM symbol according to embodiments of the present disclosure.

FIG. 21A illustrates an example time unit over OFDM symbol 2100 according to embodiments of the present disclosure. An embodiment of the number of digital chains 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 21A, one time unit is equal to one OFDM symbol 2101. In frequency domain, the B-CSI-RS signals are mapped on every R=4 REs, on REs 2121, 2122, 2123; and the rest of REs are muted (UE may assume zero-power transmissions on the rest of REs). Antenna ports p, (p+1) mod $N_P$, (p+2) mod $N_P$ can be mapped across CSI-RS REs 2121, 2122, 2123 where p=0, 1, . . . , $N_P$. In time domain, there are 4 repetitions within the OFDM symbol 2101 and they are 2111, 2112, 2113, and 2114. The UE can apply different Rx beams to receive those R=4 repetitions. In this example, OFDM symbol 2101 is one time unit and the repetitions 2111, 2112, 2113, and 2114 are four sub-time units in that time unit.

Figure 21B:
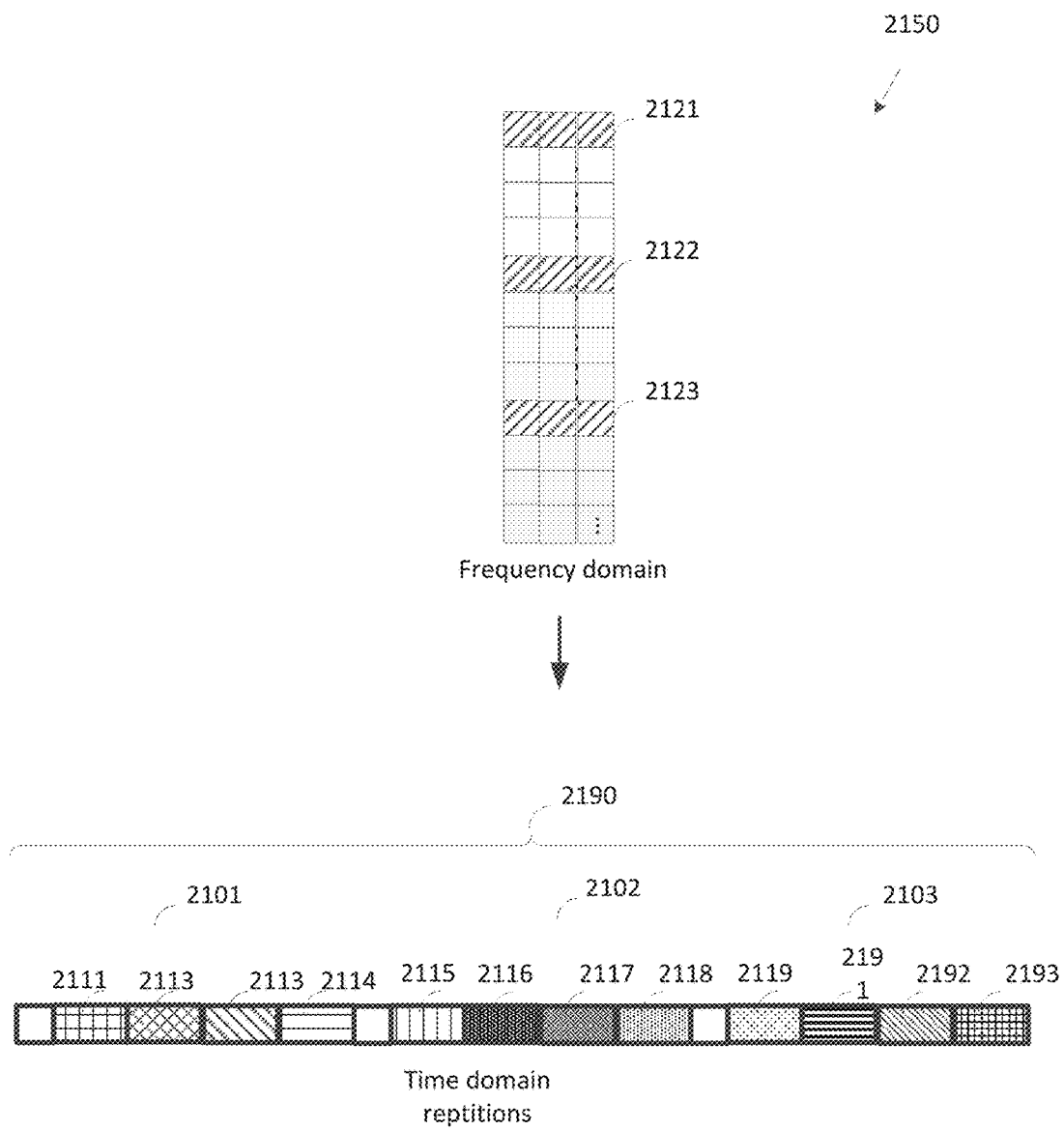
FIG. 21B illustrates another example time unit over OFDM symbol according to embodiments of the present disclosure.

FIG. 21B illustrates another example time unit over OFDM symbol 2150 according to embodiments of the present disclosure. An embodiment of the time unit over OFDM symbol 2150 shown in FIG. 21B is for illustration only. One or more of the components illustrated in FIG. 21B can be implemented in specialized circuitry configured to perform the noted functions or one or more of the components can be implemented by one or more processors executing instructions to perform the noted functions. Other embodiments are used without departing from the scope of the present disclosure.

On example of one time unit being three OFDM symbol is shown in FIG. 21B. As illustrated in FIG. 21B, one time unit 2190 is comprised with three OFDM symbols 2101, 2102 and 2103. In frequency domain, the B-CSI-RS signals are mapped on every 4 REs and they are mapped onto REs 2121, 2122 and 2123 on all three OFDM symbols 2101, 2102 and 2103. Then in time domain, there are four repetitions in each OFDM symbols. If the same B-CSI-RS signals are mapped onto those three OFDM symbols with the same TRP Tx beam(s), there are totally 12 repetitions within those three OFDM symbols. In this example, OFDM symbols 2101, 2102 and 2103 are one time unit and there are 12 sub-time units in one time unit.

In some embodiments, the configuration of B-CSI-RS can include: the number of reference OFDM symbols in one time unit $N_O$; and/or IFDMA mapping/repetition factor R; Then each time unit has $N_O \times R$ sub-time units.

The limitation of this method to formulate sub-time unit is that the transmitted signal are repeated R times within each OFDM symbol so that the Rx beam sweeping can only be supported over those R sub-time units. The advantage of this method is that the cyclic prefix of OFDM symbols for time unit/sub-time unit is equal to the cyclic prefix of normal OFDM symbols. So the B-CSI-RS signals does not suffer more inter-symbol interference than other signals.

In one example, the sub-time units are formulated through shorter OFDM symbol with larger subcarrier spacing. The OFDM symbol for each sub-time unit has subcarrier spacing X times of reference subcarrier spacing. The configuration of B-CSI-RS can include: the number of reference OFDM symbols in one time unit, $N_O$; the subcarrier spacing factor X; and/or the length of cyclic prefix; in one example, the length of cyclic prefix of sub-time unit can be 1/X of the length of cyclic prefix of reference OFDM symbol. In one example, the length of cyclic prefix of sub-time unit can be explicitly indicated. The advantage of this method is that both Tx beam sweeping and Rx beam sweeping can be supported over the sub-time units within one time unit. On the other hand, the B-CSI-RS signal in this method would suffer more inter-symbol interference due to shorter cyclic prefix.

In one example, the time unit and sub-time unit of B-CSI-RS resource use the OFDM numerology (including subcarrier spacing and cyclic prefix) that can be same or different from the OFDM numerology used by OFDM symbols for other downlink signal transmission, e.g., PDSCH and PDCCH. The configuration of B-CSI-RS can include: the subcarrier spacing used by B-CSI-RS OFDM symbol; the cyclic prefix length used by B-CSI-RS OFDM symbol; and/or the number of B-CSI-RS OFDM symbol in one time unit, X; In this manner, there are X sub-time units in one time unit.

In one embodiment, the time unit and sub-time unit of B-CSI-RS are formulated through a combination of IFDMA and different subcarrier spacing method. In this method, one time unit can be one OFDM symbol with subcarrier spacing that can be different from the reference/configured subcarrier spacing and can be configured explicitly. The configuration of B-CSI-RS can include: the subcarrier spacing used by B-CSI-RS OFDM symbol, where that can be specified as Z times of the reference subcarrier spacing and Z can be less than 1 or more than 1. Examples of Z can be ½, ¼, 1, 2 and 4; and/or IFDMA mapping/repetition factor R; Then each time unit has R sub-time units. In such embodiment, one time unit is one OFDM symbol with length being 1/Z times of the length of reference OFDM symbol. In frequency domain, the B-CSI-RS signals are mapped by every R REs based on the configured subcarrier spacing.

In some embodiments, the method to formulate sub-time units in different time units within one B-CSI-RS resource can be same or different. In one method, the time unit and sub-time unit configuration is signaled for all the time unit in one B-CSI-RS resource. In one method, each time unit in one B-CSI-RS resource is configured with the configuration of time unit and sub-time unit partition configuration. The time units can be configured with same or different Tx beam sweeping and Rx beam sweeping.

The UE needs to do rate matching of PDSCH or PUSCH to the OFDM symbols used by the B-CSI-RS. Generally, Tx beam sweeping and/or Rx beam sweeping would be applied to the OFDM symbols occupied by B-CSI-RS. The REs not used by B-CSI-RS signal in the B-CSI-RS symbol are not available for normal data transmission. So the UE may skip the OFDM symbols used by B-CSI-RS in the transmission of PUSCH and the reception of PDSCH. To achieve this, the UE can be configured with one or more zero-power B-CSI-RS resources and the UE can be configured to skip the OFDM symbols indicated in the zero-power B-CSI-RS resource for the PDSCH and/or PUSCH transmission.

The configuration of zero-power B-CSI-RS resource can include: the index of starting OFDM symbol of one B-CSI-RS resource; and/or the index of ending OFDM symbol of one B-CSI-RS resource.

Figure 22:
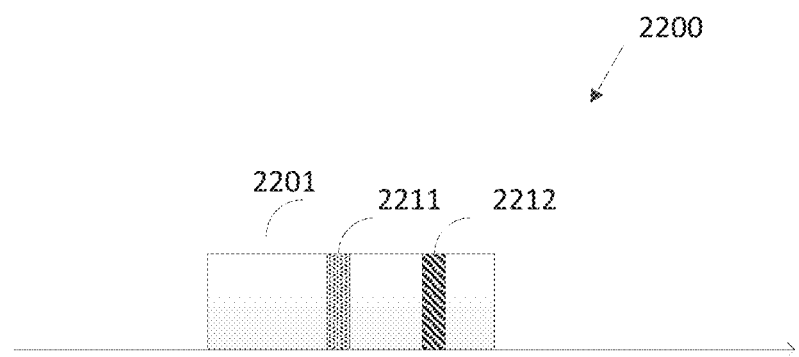
FIG. 22 illustrates an example configuration zero-power B-CSI-RS resource symbol according to embodiments of the present disclosure.

FIG. 22 illustrates an example configuration zero-power B-CSI-RS resource symbol 2200 according to embodiments of the present disclosure. An embodiment of the configuration zero-power B-CSI-RS resource symbol 2200 shown in FIG. 22 is for illustration only. One or more of the components illustrated in FIG. 22 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 22, the UE is configured with the information of one zero-power B-CSI-RS resource in slot/subframe 2101. The zero-power B-CSI-RS resource has starting OFDM symbol 2211 and ending OFDM symbol 2212. In one example, the UE is indicated with the index of OFDM symbols 2211 and 2212. The UE would skip the OFDMs from 2211 to 2212 in the transmission of PDSCH and/or PUSCH. In another example, the zero-power B-CSI-RS resource is configured in the same way as the non-zero-power B-CSI-RS resource as described before but the UE determines the B-CSI-RS resource as zero-powered via an additional indication. For example, a control signaling can be indicated by the gNB on whether a B-CSI-RS resource is activated or configured to the UE for measurement. If a B-CSI-RS resource is not activated or configured to the UE for measurement, the B CSI-RS resource is assumed by the UE to be zero-power B-CSI-RS resource. The control signaling can be included as part of the control signaling for measurement and reporting, or can be included as part of the configuration message for B-CSI-RS resource.

In one example, the configuration of zero-power B-CSI-RS resource can include the index of starting OFDM symbol in one B-CSI-RS and the number of OFDM symbols used by that B-CSI-RS resource. In another example, the configuration of zero-power B-CSI-RS resource can include the index of ending OFDM symbol in one B-CSI-RS and the number of OFDM symbols used by that B-CSI-RS resource. In yet another example, the configuration of zero-power B-CSI-RS resource can include a list of OFDM symbols which are occupied by a B-CSI-RS resource.

Suppose that a UE is configured with a number of CSI-RS resources whose transmission opportunities include a time slot. A DCI may be used to indicate UE behaviors on what to expect related to those CSI-RS resources in the time slot. In one example, for each CSI-RS resource, the DCI indicates one of the following states. In one example of state 0, the UE may measure CSI/BSI using the configured CSI-RS transmitted in the time slot. In another example of state 1, the UE may rate match around the configured CSI-RS resource elements in the time slot for the scheduled PDSCH reception. In yet another example of state 2, the UE may assume the configured CSI-RS resource elements are available for PDSCH modulation symbol mapping. This information can be conveyed by a 2-bit field in the DCI.

A UE is configured with a number of CSI-RS resources whose transmission opportunities include a time slot. For each CSI-RS resource, the UE is further configured with a BW, and OFDM symbol numbers to map CSI-RS, etc. On the rest of REs on the OFDM symbols in the BW on which CSI-RS are mapped, a gNB may choose to map PDSCH or intentionally mute other signal transmissions. When the gNB mute other signal transmissions, the UE may apply Rx beam sweeping in time domain exploiting an FFT duality property—regular zero insertion in frequency domain is transformed to signal repetition in time domain. The property does not hold if the gNB transmits other signals in the rest of the REs. When the UE Rx beam sweeping is not necessary, the gNB may choose to map PDSCH on the rest of REs to increase system throughput. When the UE Rx beam sweeping is desired, the gNB may choose to mute the rest of REs. This information needs to be conveyed from the gNB to UE so that the UE can properly perform Rx beam sweeping or PDSCH reception on the rest of the REs.

In some embodiments, for each CSI-RS resource UE may be indicated an assumption for the rest of REs in OFDM symbols with the CSI-RS (also denoted as CSI-RS OFDM symbols). A UE may be indicated one out of the following states. In one example of state 1, a UE may assume the rest of REs (in the CSI-RS BW) are muted (or transmitted with zero power); when this state is signaled, the UE can apply Rx beam sweeping. In another example of state 2, a UE may assume that the rest of REs may contain non-zero-power signals. This information can be conveyed in an RRC signaling, MAC-CE or DCI. In case of RRC signaling, this information is included in each CSI-RS resource configuration. The information may also be implicitly indicated.

In one example, if the CSI-RS type is B-CSI-RS, the UE is configured to assume state 1 (the rest of REs are muted); if the CSI-RS type is A-CSI-RS, the UE is configured to assume state 2 (the rest of REs may contain non-zero-power signals).

In another example, if the IFDMA repetition factor is 2 or more, the UE is configured to assume state 1, otherwise, the UE is configured to assume state 2. For each CSI-RS resource UE (configured with a CSI-RS BW) may be indicated an assumption for the CSI-RS REs and the rest of REs in CSI-RS OFDM symbols. In one example of state 0, the scheduled PDSCH may be transmitted on all the REs configured for CSI-RS in the scheduled PDSCH BW. In another example of state 1, the scheduled PDSCH may rate match around the CSI-RS OFDM symbols. In other words, the UE treat the CSI-RS REs as zero-power CSI-RS. In yet another example of state 2, a UE may assume that the CSI-RS is transmitted for UE's CSI/BSI measurement, and UE may also assume that the transmission on the rest of REs in the CSI-RS BW in the CSI-RS OFDM symbols are muted (i.e., transmitted with zero power). The UE may rate match around the rest of REs in the CSI-RS BW for PDSCH demodulation. In this case, the UE can apply Rx beam sweeping exploiting the Fourier transform property. In yet another example of state 3, a UE may assume that the CSI-RS is transmitted for UE's CSI/BSI measurement. UE may assume that the rest of REs may be used for PDSCH transmission.

One out of these states is indicated for each CSI-RS resource, dynamically via DCI (2-bit indication), semi-statically by RRC, or semi-dynamically by MAC-CE.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A base station (BS) for a random access operation in a wireless communication system, the BS comprising:
   a transceiver configured to:
      transmit, to a user equipment (UE), configuration information comprising (i) a random access channel (RACH) occasion that includes at least one RACH chunk that includes at least one RACH symbol and (ii) information indicating an association between a transmit (Tx) beam identification (ID) and a set of RACH preambles; and
      receive, from the UE, a RACH preamble over the at least one RACH chunk, wherein the RACH preamble is determined from the set of RACH preambles and a RACH chunk from the at least one RACH chunk based on the configuration information; and
   at least one processor is configured to configure a RACH response corresponding to the RACH preamble,
   wherein the transceiver is further configured to transmit, to the UE, the RACH response over the RACH chunk.

2. The BS of claim 1, wherein the at least one processor is further configured to configure a RACH structure including the RACH occasion that includes RACH chunks each of which includes RACH symbols.

3. The BS of claim 1, wherein:
   the at least one processor is further configured to identify dedicated resources to receive a beam from the UE; and
   the transceiver is further configured to receive the RACH preamble using the dedicated resources.

4. The BS of claim 1, wherein the transceiver is further configured to receive the RACH preamble on RACH symbols in the RACH chunk.

5. The BS of claim 1, wherein the configuration information comprises at least one of resource partitioning information, beam sweeping information, a preamble type, or a RACH chunk selection scheme for retransmission information.

6. The BS of claim 1, wherein:
   the at least one processor is further configured to map, based on the configuration information, initial synchronization signals with RACH chunks according to measured reference signal received power (RSRP); and
   the transceiver is further configured to receive the RACH preamble on the RACH symbol contained in a RACH chunk that is associated with one selected initial synchronization signal.

7. The BS of claim 1, wherein the transceiver is further configured to receive a RACH preamble retransmission including the RACH preamble on a retransmission RACH chunk that is determined for the RACH preamble retransmission and different than the RACH chunk used for the received RACH preamble, which is an initial RACH preamble transmission by the UE.

8. A user equipment (UE) for random access operation in a wireless communication system, the UE comprising:
   at least one transceiver configured to:
      receive, from a base station (BS), configuration information comprising (i) a random access channel (RACH) occasion that includes at least one RACH chunk that includes at least one RACH symbol and (ii) information indicating an association between a transmit (Tx) beam identification (ID) and a set of RACH preambles; and
   at least one processor configured to:
      determine a RACH preamble from the set of RACH preambles and a RACH chunk from the at least one RACH chunk based on the configuration information received from the BS,
   wherein the transceiver is further configured to:
      transmit, to the BS, the RACH preamble over the RACH chunk; and
      receive, from the BS, a RACH response corresponding to the RACH preamble sent over the RACH chunk.

9. The UE of claim 8, wherein the at least one processor is further configured to configure the RACH occasion including RACH chunks each of which includes RACH symbols based on the configuration information, and wherein the configuration information comprises at least one of resource partitioning information, beam sweeping information, a preamble type, or a RACH chunk selection scheme for retransmission information.

10. The UE of claim 8, wherein:
    the at least one processor is further configured to:
       measure a reference signal received power (RSRP) of at least one initial synchronization signal;
       select one initial synchronization signal based on the measured RSRP;
       identify one Tx beam ID corresponding to the selected initial synchronization signal; and
       determine one RACH preamble from the RACH preamble set associated with the identified Tx beam ID.

11. The UE of claim 9, wherein:
    the at least one processor is further configured to:
       control BS beam sweeping over the RACH symbols in the RACH chunk;
       assume that the BS applies a first Rx beam to receive a first RACH symbol in the RACH chunk; and
       apply a second Rx beam to receive a second RACH symbol in the RACH chunk; and
    the transceiver is further configured to repeat transmission of the determined RACH preamble on the RACH symbols in the RACH chunk.

12. The UE of claim 8, wherein:
    the at least one processor is further configured to associate, based on the configuration information, initial synchronization signals with RACH chunks according to measured RSRP; and
    the transceiver is further configured to transmit the determined RACH preamble on the RACH symbol contained in a RACH chunk that is associated with one selected initial synchronization signal.

13. The UE of claim 8, wherein:
    the at least one processor is further configured to:
       switch the RACH chunk for a RACH preamble retransmission; and
       determine a retransmission RACH chunk for the RACH preamble retransmission that is different from the RACH chunk used for the transmission of the RACH preamble, which was an initial RACH preamble transmission; and
    the transceiver is further configured to transmit the RACH preamble on the retransmission RACH chunk determined for the RACH preamble retransmission.

14. A method of a user equipment (UE) for random access operation in a wireless communication system, the method comprising:
   receiving, from a base station (BS), configuration information comprising (i) a random access channel (RACH) occasion that includes at least one RACH chunk that includes at least one RACH symbol and (ii)

information indicating an association between a transmit (Tx) beam identification (ID) and a set of RACH preambles;
determining a RACH preamble from the set of RACH preambles and a RACH chunk from the at least one RACH chunk based on the configuration information received from the BS;
transmitting, to the BS, the RACH preamble over the RACH chunk; and
receiving, from the BS, a RACH response corresponding to the RACH preamble sent over the RACH chunk.

15. The method of claim 14, further comprising configuring the RACH occasion including RACH chunks each of which includes RACH symbols based on the configuration information, and wherein the configuration information comprises at least one of resource partitioning information, beam sweeping information, a preamble type, or a RACH chunk selection scheme for retransmission information.

16. The method of claim 14, further comprising:
measuring a reference signal received power (RSRP) of at least one initial synchronization signal;
selecting one initial synchronization signal based on the measured RSRP;
identifying one Tx beam ID corresponding to the selected initial synchronization signal; and
determining one RACH preamble from the RACH preamble set associated with the identified Tx beam ID.

17. The method of claim 15, further comprising:
controlling BS beam sweeping over the RACH symbols in the RACH chunk;
assuming that the BS applies a first Rx beam to receive a first RACH symbol in the RACH chunk;
applying a second Rx beam to receive a second RACH symbol in the RACH chunk; and
repeating transmission of the determined RACH preamble on RACH symbols in the RACH chunk.

18. The method of claim 14, further comprising:
associating, based on the configuration information, initial synchronization signals with RACH chunks according to measured RSRP; and
transmitting the determined RACH preamble on the RACH symbol contained in a RACH chunk that is associated with one selected initial synchronization signal.

19. The method of claim 14, further comprising:
switching the RACH chunk for a RACH preamble retransmission;
determining a retransmission RACH chunk for the RACH preamble retransmission that is different from the RACH chunk used for the transmission of the RACH preamble, which was an initial RACH preamble transmission; and
transmitting the RACH preamble on the retransmission RACH chunk determined for the RACH preamble retransmission.

* * * * *